US012141495B2

(12) United States Patent
Zhang

(10) Patent No.: US 12,141,495 B2
(45) Date of Patent: Nov. 12, 2024

(54) SCREEN MIRRORING METHOD, APPARATUS, DEVICE, AND STORAGE MEDIUM

(71) Applicant: HONOR DEVICE CO., LTD., Guangdong (CN)

(72) Inventor: Jiping Zhang, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 18/247,956

(22) PCT Filed: Jan. 21, 2022

(86) PCT No.: PCT/CN2022/073193
§ 371 (c)(1),
(2) Date: Apr. 5, 2023

(87) PCT Pub. No.: WO2022/267467
PCT Pub. Date: Dec. 29, 2022

(65) Prior Publication Data
US 2024/0111475 A1      Apr. 4, 2024

(30) Foreign Application Priority Data

Jun. 22, 2021    (CN) .................. 202110693641.X

(51) Int. Cl.
*G06F 3/14*       (2006.01)
*G06F 9/451*      (2018.01)

(52) U.S. Cl.
CPC ............ *G06F 3/1454* (2013.01); *G06F 9/451* (2018.02)

(58) Field of Classification Search
CPC ... G06F 3/1454; G06F 9/451; H04N 21/4122; H04N 21/41407; H04N 21/4307;
(Continued)

(56) References Cited

U.S. PATENT DOCUMENTS

| 4,162,130 A | 7/1979 | Grier et al. |
| 7,653,903 B2 | 1/2010 | Purkeypile et al. |

(Continued)

FOREIGN PATENT DOCUMENTS

| CN | 101501637 A | 8/2009 |
| CN | 103974025 A | 8/2014 |

(Continued)

OTHER PUBLICATIONS

Zhang, "Research on Media Popularity Prediction and Caching under Radio Access Network," Dissertation for the Master Degree, University of Science and Technology of China, May 2016, 72 pages (with English abstract).

(Continued)

*Primary Examiner* — Nelson M Rosario
(74) *Attorney, Agent, or Firm* — Fish & Richardson P.C.

(57) ABSTRACT

Embodiments of this application are applied to the field of terminal technologies, and provide a screen mirroring method, an apparatus, a device, and a storage medium. A mirroring suspension operation of a user is received, and to-be-encoded data is discarded in response to the mirroring suspension operation, so that when the user needs to suspend the screen mirroring service between a screen casting device and a display device, the to-be-encoded data can be discarded by simply performing the mirroring suspension operation on the screen casting device.

19 Claims, 39 Drawing Sheets

(58) Field of Classification Search
CPC ............. H04N 21/4312; H04N 21/435; H04N 21/43615; H04N 21/4363; H04N 21/472; H04N 21/8173; H04N 21/4333; G09G 2320/0626; G09G 2360/144
See application file for complete search history.

(56) References Cited

U.S. PATENT DOCUMENTS

| | | | |
|---|---|---|---|
| 10,353,661 | B2 | 7/2019 | Choi et al. |
| 2004/0264925 | A1* | 12/2004 | Harumoto ............ G11B 27/105 386/E9.013 |
| 2016/0092154 | A1 | 3/2016 | Bourlier et al. |
| 2016/0110152 | A1 | 4/2016 | Choi et al. |
| 2016/0269254 | A1 | 9/2016 | Forney et al. |
| 2017/0237930 | A1 | 8/2017 | Kim et al. |
| 2023/0046971 | A1* | 2/2023 | Hu ........................ H04N 19/42 |
| 2023/0409273 | A1 | 12/2023 | He et al. |

FOREIGN PATENT DOCUMENTS

| | | |
|---|---|---|
| CN | 105635831 A | 6/2016 |
| CN | 105872673 A | 8/2016 |
| CN | 107430723 A | 12/2017 |
| CN | 107707972 A | 2/2018 |
| CN | 107852527 A | 3/2018 |
| CN | 108282677 A | 7/2018 |
| CN | 109547628 A | 3/2019 |
| CN | 109756366 A | 5/2019 |
| CN | 109788265 A | 5/2019 |
| CN | 111061445 A | 4/2020 |
| CN | 112367542 A | 2/2021 |
| CN | 112653913 A | 4/2021 |
| CN | 112839238 A | 5/2021 |
| CN | 112905289 A | 6/2021 |
| EP | 3825838 A1 | 5/2021 |
| JP | 2004185344 A | 7/2004 |

OTHER PUBLICATIONS

Zignani, "Geo-CoMM A Geo-Community based Mobility Model," 2012 9th Annual Conference on Wireless on- Demand Network Systems and Services, Feb. 16, 2012, 8 pages.

Han, "Research and Implementation of High-Speed Cache Mirroring Technology in Dual Controller RAID System," Dissertation for the Master Degree in Engineering, The Second Academy of China Aerospace Science and Technology Corporation, May 2017, 74 pages (with English abstract).

Extended European Search Report in European Appln. No. 22826976.7, mailed on May 17, 2024, 9 pages.

* cited by examiner

☐ Empty input buffer

■ Input buffer that carries to-be-encoded data

SCREEN MIRRORING METHOD, APPARATUS, DEVICE, AND STORAGE MEDIUM

CROSS-REFERENCE TO RELATED APPLICATIONS

This application is a national stage of International Application No. PCT/CN2022/073193, filed on Jan. 21, 2022, which claims priority to Chinese Patent Application Ser. No. 20/211,0693641.X, filed on Jun. 22, 2021. The disclosures of both of the aforementioned applications are hereby incorporated by reference in their entireties.

TECHNICAL FIELD

This application relates to the field of terminal technologies, and in particular, to a screen mirroring method, an apparatus, a device, and a storage medium.

BACKGROUND

Screen mirroring is usually to synchronize content displayed on a screen of a screen casting device to a display device in real time. As a convenient screen mirroring method, screen mirroring is widely used in various scenarios. For example, content displayed on a screen of a mobile phone (a screen casting device) is mirrored on a screen of a TV (a display device) for displaying, so as to obtain a more comfortable viewing experience.

In a screen mirroring process, when a user temporarily needs to perform an operation on a screen casting device but does not want to display the operation on a display device, screen mirroring between the screen casting device and the display device usually needs to be terminated first, and after the operation performed on the screen casting device is completed, the content displayed on the screen casting device needs to be mirrored to the display device again.

The foregoing process includes many operation steps, and a process of suspending the screen mirroring is relatively complex.

SUMMARY

Embodiments of this application provide a screen mirroring method, apparatus, device, and storage medium, so as to provide a mirroring suspension function for a screen mirroring service between a screen casting device and a display device.

According to a first aspect, a screen mirroring method is provided, where the method is applied to a screen casting device, and the screen casting device performs a screen mirroring service with a display device, and the method includes: receiving a mirroring suspension operation of a user; and discarding, in response to the mirroring suspension operation, to-be-encoded data, where the encoder is configured to perform encoding processing on the to-be-encoded data, and the to-be-encoded data is obtained based on updated data when data displayed on the screen casting device is updated.

In an embodiment, after the foregoing response to the mirroring suspension operation, the method further includes: setting a value of the first parameter to a first value, where the value of the first parameter is used to indicate whether to discard the to-be-encoded data; and before the discarding to-be-encoded data that is to be input to the encoder, the method further includes: determining that the value of the first parameter is the first value.

The value of the first parameter that indicates whether to discard the to-be-encoded data is set to the first value, so that it can be automatically determined, based on the value of the first parameter, whether to discard the to-be-encoded data, thereby improving intelligence of discarding the to-be-encoded data.

In an embodiment, the receiving a mirroring suspension operation of a user includes: receiving the mirroring suspension operation performed by the user on a first control on a current display interface of the screen casting device.

In an embodiment, the method further includes: determining whether the to-be-encoded data is discarded successfully; if it is determined that the discarding succeeds, changing a display status of the first control on the current display interface of the screen casting device from a first state to a second state, where the first state is used to indicate to suspend the screen mirroring service, and the second state is used to indicate to resume the screen mirroring service; and if it is determined that the discarding fails, outputting suspension failure prompt information.

In an embodiment, before the discarding to-be-encoded data that is to be input to an encoder, the method further includes: backing up the to-be-encoded data.

In an embodiment, after the foregoing response to the mirroring suspension operation, the method further includes: setting a value of a second parameter to a second value, where the value of the second parameter is used to indicate whether to back up the to-be-encoded data; and before the backing up to-be-encoded data, the method further includes: determining that the value of the second parameter is the second value.

In response to the mirroring suspension operation, the value of the second parameter that indicates whether to hack up the to-be-encoded data is set to the second value, so that it can be automatically determined, based on the value of the second parameter, whether to back up the to-be-encoded data, thereby improving intelligence of backing up the to-be-encoded data.

In an embodiment, the discarding to-be-encoded data that is to be input to an encoder includes: determining whether backup of the to-be-encoded data succeeds; and if it is determined that the backup succeeds, discarding the to-be-encoded data.

The to-be-encoded data is discarded, so that the encoder has no to-be-encoded data, and then the encoder suspends encoding, and suspends sending a data stream including the to-be-mirrored data to the display device, so that in a screen mirroring suspension service, a function of suspending the screen mirroring service can be implemented only by using the screen casting device, and no processing needs to be performed by the display device, thereby reducing a requirement on a processing capability of the display device. In addition, because the encoder suspends encoding, in a process of suspending the screen mirroring, to-be-mirrored data that needs to be sent to the display device is not generated, and there is no need for a large quantity of data interactions between the screen casting device and the display device, thereby reducing power consumption of the screen casting device and the display device in the process of suspending the screen mirroring.

In an embodiment, the method further includes: if it is determined that the backup fails, outputting suspension failure prompt information.

When the to-be-encoded data fails to be discarded or the to-be-encoded fails to be backed up, that is, the screen mirroring service fails to be suspended, and the suspension failure prompt information is output to alert the user, thereby avoiding a case in which the display device displays content that the user does not want to display, thereby further protecting privacy of the user.

In an embodiment, the method further includes: receiving a mirroring resumption operation of the user; and stopping, in response to the mirroring resumption operation, discarding the to-be-encoded data.

Discarding of the to-be-encoded data is stopped, so that the encoder can encode the to-be-encoded data to obtain a data stream that includes the to-be-mirrored data and that is sent to the display device; and further, after the screen mirroring service is suspended, a suspended screen mirroring service between the screen casting device and the display device can be resumed by performing a simple mirroring resumption operation, and a mirroring resumption process is simple, thereby improving user experience.

In an embodiment, after the foregoing response to the mirroring resumption operation, the method further includes: setting the value of the first parameter to a third value, where the value of the first parameter is used to indicate whether to discard the to-be-encoded data; and before the stopping discarding the to-be-encoded data, the method further includes: determining that the value of the first parameter is the third value.

The value of the first parameter that indicates whether to discard the to-be-encoded data is set to the third value, so that it can be automatically determined, based on the value of the first parameter, whether to discard the to-be-encoded data, thereby improving intelligence of stopping discarding the to-be-encoded data.

In an embodiment, the receiving a mirroring resumption operation of the user includes: receiving the mirroring resumption operation performed by the user on the first control on the current display interface of the screen casting device.

In an embodiment, the method further includes: determining whether discarding of the to-be-encoded data is stopped successfully; and if the discarding is stopped successfully, changing a display status of the first control on the current display interface of the screen casting device from a second state to a first state, where the first state is used to indicate to suspend the screen mirroring service, and the second state is used to indicate to resume the screen mirroring service; or if the discarding fails to be stopped, outputting resumption failure prompt information.

When discarding of the to-be-encoded data is stopped successfully, the encoder resumes encoding, and the screen mirroring service between the display device and the screen casting device is resumed. In this case, the display status of the first control on the current display interface of the screen casting device may be changed from the second state to the first state, so that the user can perform the mirroring suspension operation on the first control again.

In an embodiment, before the stopping discarding the to-be-encoded data that is to be input to an encoder, the method further includes: stopping backing up the to-be-encoded data.

Backup of the to-be-encoded data is stopped, so that after the mirroring resumption operation input by the user is received, the encoder does not need to continue to back up the to-be-encoded data, thereby reducing a requirement of memory space that is used by the encoder to store data during the screen mirroring.

In an embodiment, after the foregoing response to the mirroring resumption operation, the method further includes: setting the value of the second parameter to a fourth value, where the value of the second parameter is used to indicate whether to back up the to-be-encoded data that is to be input to an encoder; and before the stopping backing up the to-be-encoded data, the method further includes: determining that the value of the second parameter is the fourth value.

In response to the mirroring resumption operation, the value of the second parameter that indicates whether to back up the to-be-encoded data is set to the fourth value, so that it can be automatically determined, based on the value of the second parameter, whether to stop backing up the to-be-encoded data, thereby improving intelligence of stopping backing up the to-be-encoded data.

In an embodiment, the stopping, in response to the mirroring resumption operation, discarding the to-be-encoded data that is to be input to the encoder includes: determining whether the backup of the to-be-encoded data is stopped successfully; and if the backup is stopped successfully, stopping discarding the to-be-encoded data.

In an embodiment, the method further includes: if the backup fails to be stopped, outputting the resumption failure prompt information.

In an embodiment, there are at least two display devices, there are at least two groups of to-be-encoded data, and the at least two groups of to-be-encoded data are in a one-to-one correspondence with the at least two display devices; and the receiving a mirroring suspension operation of a user includes: receiving a mirroring suspension operation performed by the user on the first display device in the at least two display devices; and the discarding, in response to the mirroring suspension operation, to-be-encoded data that is to be input to an encoder includes: discarding, in response to the mirroring suspension operation on the first display device, the first to-be-encoded data corresponding to the first display device.

The mirroring suspension operation performed by the user on the first display device in the at least two display devices is received, and the first to-be-encoded data corresponding to the first display device is discarded in response to the mirroring suspension operation on the first display device, so that a screen mirroring service between the screen casting device and the first display device can be suspended. That is, this embodiment of this application may further provide a function of suspending mirroring between the screen casting device and some display devices.

In an embodiment, the receiving the mirroring suspension operation performed by the user on the first display device in the at least two display devices includes: receiving the mirroring suspension operation performed by the user on a first sub-control in the first control on the current display interface of the screen casting device, where the first control includes at least two sub-controls, and the at least two sub-controls are in a one-to-one correspondence with the at least two display devices.

In an embodiment, there are at least two display devices, there are at least two groups of to-be-encoded data, and the at least two groups of to-be-encoded data are in a one-to-one correspondence with the at least two display devices; and the receiving a mirroring resumption operation of a user includes: receiving the mirroring resumption operation performed by the user on the second display device in the at least two display devices; and the stopping, in response to the mirroring resumption operation, discarding the to-be-encoded data includes: stopping, in response to the mirroring resumption operation performed by the user on the second display device, discarding the second to-be-encoded data corresponding to the second display device.

The mirroring resumption operation performed by the user on the second display device in the at least two display devices is received, and discarding of the second to-be-encoded data corresponding to the second display device is stopped in response to the mirroring resumption operation performed by the user on the second display device, so that a screen mirroring function between the screen casting device and the second display device can be resumed. That is, this embodiment of this application may further provide a function of resuming mirroring between the screen casting device and some display devices.

In an embodiment, the receiving the mirroring resumption operation performed by the user on the second display device in the at least two display devices includes: receiving the mirroring suspension operation performed by the user on a second sub-control in the first control on the current display interface of the screen casting device, where the first control includes at least two sub-controls, and the at least two sib-controls are in a one-to-one correspondence with the at least two display devices.

In an embodiment, the method is applied to an electronic device, and the electronic device includes a screen mirroring application, a virtual display module, a layer composition module, a Codec module, and an encoder. When receiving the mirroring suspension operation of the user, the screen mirroring application sets the value of the first parameter to the first value, sets the value of the second parameter to the second value, and creates the virtual display module, where the value of the first parameter is used to indicate whether to discard the to-be-encoded data, and the value of the second parameter is used to indicate whether to back up the to-be-encoded data. When an image displayed by the screen casting device changes, the layer composition module obtains drawn and rendered image data from the virtual display module, and performs image composition based on a fixed period. The Codec module determines whether the value of the first parameter is the first value and whether the value of the second parameter is the second value; and when the value of the first parameter is the first value, discards the to-be-encoded data; or when the value of the second parameter is the second value, backs up the to-be-encoded data.

In an embodiment, the method further includes: when the screen mirroring application receives the mirroring resumption operation of the user, setting the value of the first parameter to the third value, and setting the value of the second parameter to the fourth value; and when the image displayed by the screen casting device changes, obtaining, by the layer composition module, drawn and rendered image data from the virtual display module, and performing image composition based on a fixed period; determining, by the Codec module, whether the value of the first parameter is the third value and whether the value of the second parameter is the fourth value; and when the value of the first parameter is the third value, stopping discarding the to-be-encoded data; or when the value of the second parameter is the fourth value, stopping hacking up the to-be-encoded data.

According to a second aspect, a screen mirroring method is provided, where the method is applied to a screen casting device, the screen casting device is communicatively connected to a display device, and the method includes: receiving a mirroring suspension operation performed by a user on a mirroring suspension control on a current display interface; and discarding, in response to the mirroring suspension operation, to-be-encoded data that is to be input to an encoder, so that when an image on a screen casting device is updated, the display device continuously displays an image that is displayed at a moment previous to a moment at which the user performs the mirroring suspension operation on an image control on the current display interface, where the encoder is configured to perform encoding processing on the to-be-encoded data, and the to-be-encoded data is obtained based on updated data when data displayed on a screen casting device is updated.

In an embodiment, after the receiving a mirroring suspension operation performed by a user on a mirroring suspension control on a current display interface, the method further includes: displaying the mirroring resumption control on the current display interface.

In an embodiment, the method further includes: receiving a mirroring resumption operation performed by the user on a mirroring resumption control on a current display interface; and stopping, in response to the mirroring resumption operation, discarding the to-be-encoded data, so that an image displayed on the screen casting device is the same as an image displayed on the display device.

In an embodiment, after the receiving a mirroring resumption operation performed by the user on a mirroring resumption control on a current display interface, the method further includes: displaying the mirroring resumption control on the current display interface.

According to a third aspect, an electronic device is provided, where the electronic device includes a processor, and the processor is configured to be coupled to a memory, and read an instruction in the memory to enable the electronic device to perform the method according to the first aspect based on the instruction, or read the instruction in the memory to enable the electronic device to perform the method according to the second aspect based on the instruction.

According to a fourth aspect, a computer readable storage medium is provided, where the computer readable storage medium stores an instruction; and when the instruction is run on a computer or a processor, the method according to the first aspect is implemented, or the method according to the second aspect is implemented.

According to a fifth aspect, a chip is provided, where the chip includes a processor, the processor is configured to be coupled to a memory, and execute a computer program in the memory, so as to perform the method according to the first aspect or perform the method according to the second aspect.

According to a sixth aspect, a computer program product including an instruction is provided, where when the computer program product runs on an electronic device, the electronic device is enabled to perform the method according to the first aspect, or the electronic device is enabled to perform the method according to the second aspect.

According to the foregoing screen mirroring method, apparatus, device, and storage medium, the mirroring suspension operation of the user is received, and the to-be-encoded data that is to be input to the encoder is discarded in response to the mirroring suspension operation, so that when the user needs to suspend the screen mirroring service between the screen casting device and the display device, the to-be-encoded data that is to be input to the encoder can be discarded by simply performing the mirroring suspension operation on the screen casting device. This avoids a case, in a conventional method, in which a connection between the display device and the screen casting device needs to be disconnected, then an operation is performed on the screen casting device, and then the connection between the display device and the screen casting device is re-established after the operation is completed, thereby providing a convenient mirroring suspension function for the screen mirroring service between the screen casting device and the display device.

DESCRIPTION OF EMBODIMENTS

The following describes technical solutions in embodiments of this application clearly and in detail with reference to accompanying drawings. In the descriptions of the embodiments of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, bath A and B exist, and only B exists. In addition, in the descriptions of the embodiments of this application, "a plurality of" means two or more than two.

The terms "first" and "second" in the following are merely intended for a purpose of description, and shall not be understood as an indication or implication of relative importance or an implicit indication of a quantity of indicated technical features. Therefore, features defined with "first" and "second" may explicitly or implicitly include one or more of such features. In the descriptions of the embodiments of this application, unless otherwise stated, "a plurality of" means two or more.

Figure 1A:
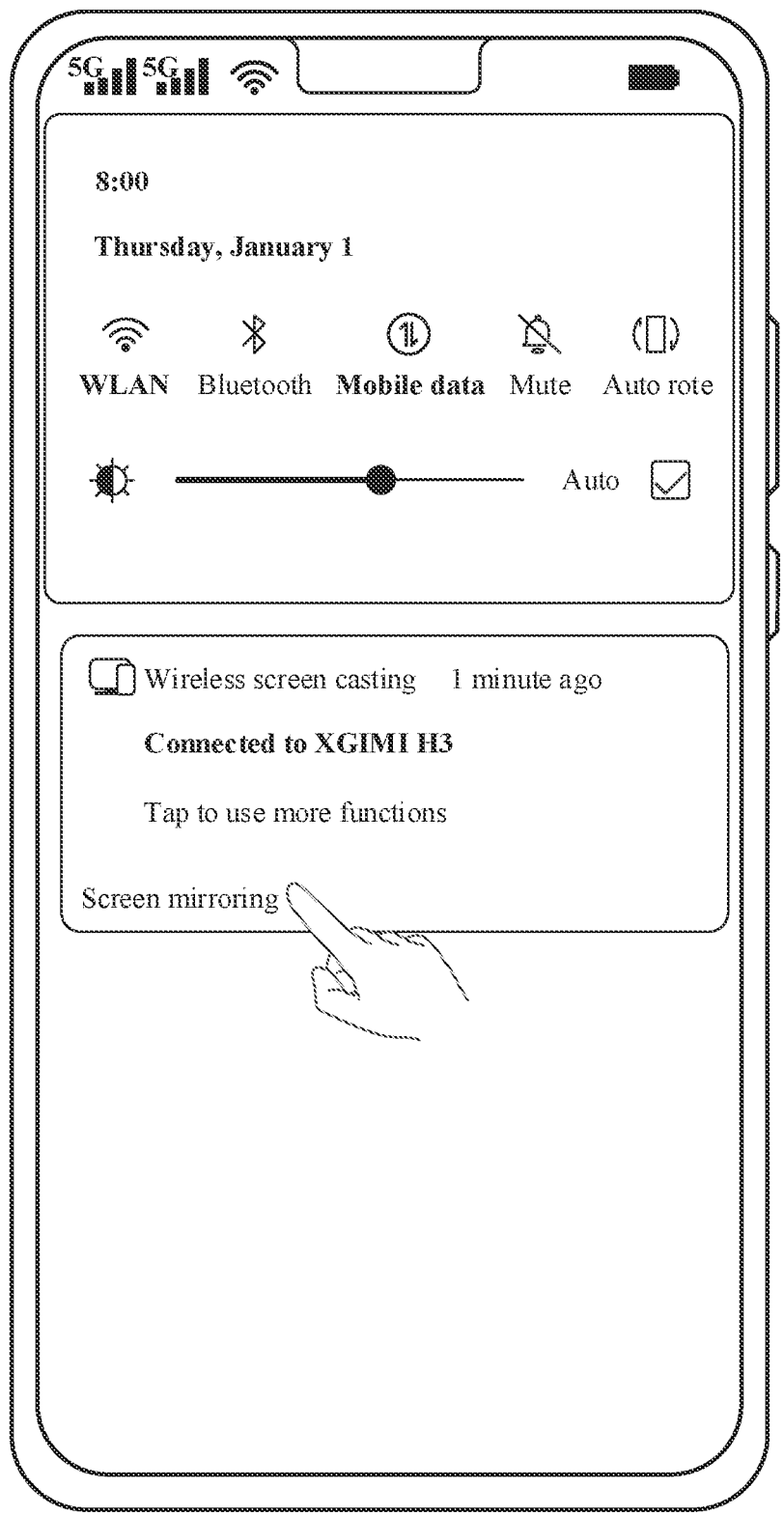
FIG. 1 is a schematic diagram of an application scenario to which an embodiment of this application is applied.
Figure 1B:
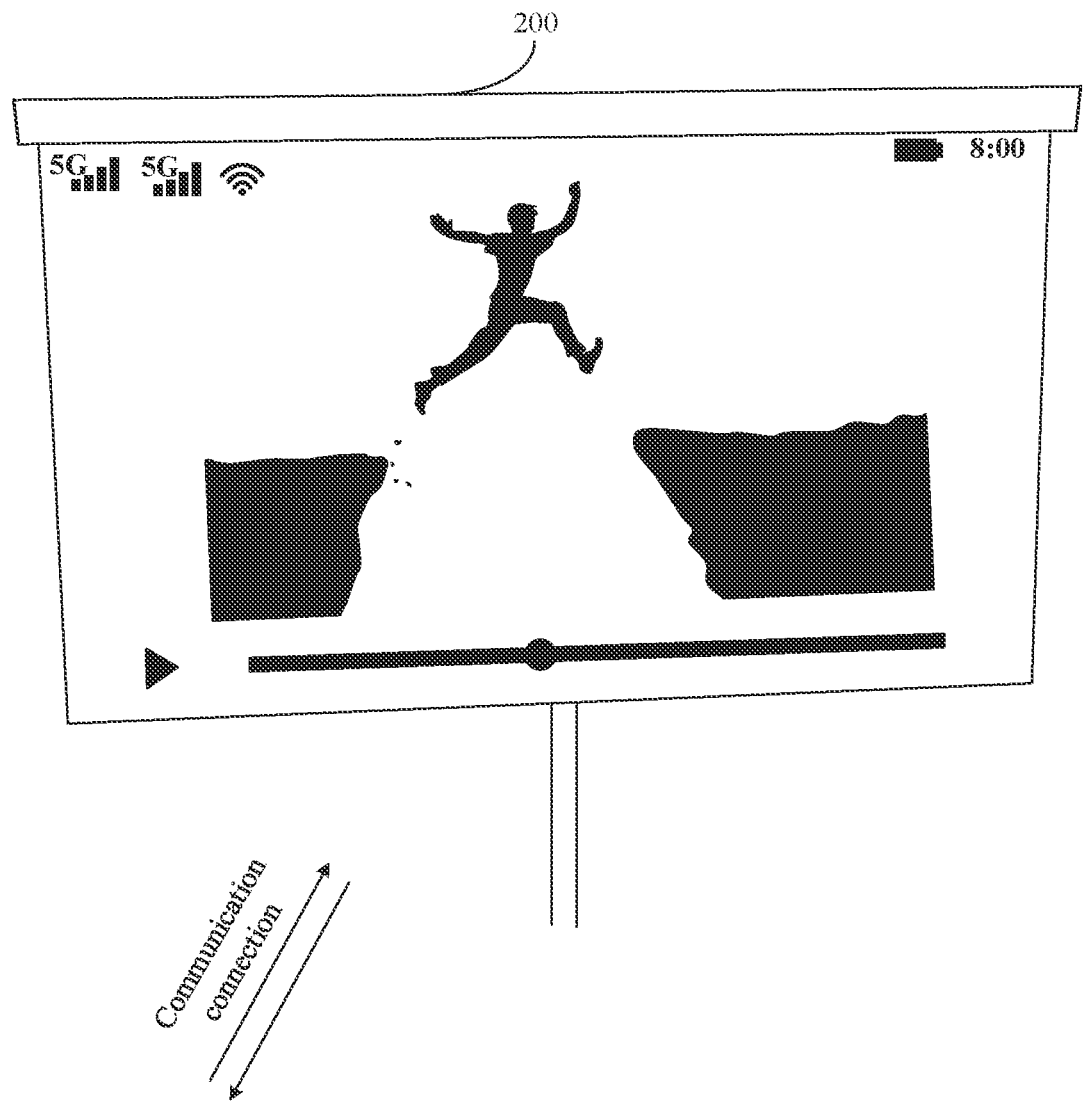
Figure 1B:
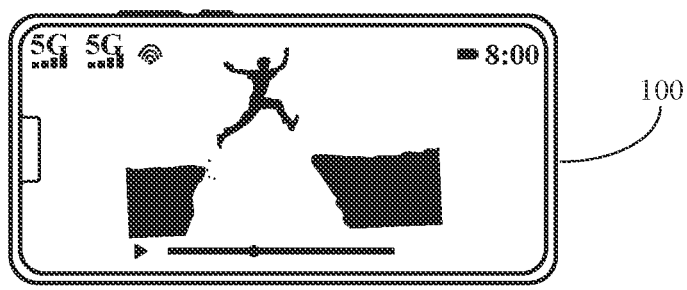

The screen mirroring method provided in this embodiment of this application is applied to a scenario in which a screen mirroring service is performed by using a screen casting device and a display device. For example, as shown in FIG. 1, the screen casting device 100 is communicatively connected to the display device 200. An application (application, APP) is installed on the screen casting device 100. A name and a developer of the application are not limited in this embodiment of this application. In a possible case, the APP used for screen mirroring may be an APP built into a system of the screen casting device 100. By enabling the screen mirroring APP, content displayed on the screen casting device 100 is mirrored to the display device 200.

A type of the screen casting device 100 is not limited in this embodiment of this application. For example, some examples of the screen casting device are as follows: a mobile phone, a tablet computer, a notebook computer, a palmtop computer, a wearable device, and the like. A type of the display device 200 is not limited in this embodiment of this application. For example, some examples of the display device are as follows: a projector, a smart TV, and the like. For ease of description, in some embodiments of this application, an example in which the screen casting device is a mobile phone and the display device is a smart TV, or the display devices are a smart TV and a projector is used for description.

It should be noted that, different from a screen casting in a video application, the screen mirroring described in this embodiment of this application means that all content displayed on the screen casting device 100 is cast to the display device 200 for displaying. However, the screen casting in a video application usually means that a link address of a video that is being played by the screen casting device 100 is sent to the display device 200, and the display device 200 plays, by accessing the link address, a video that is the same as a video that is being played by the screen casting device 100.

Figure 2A:
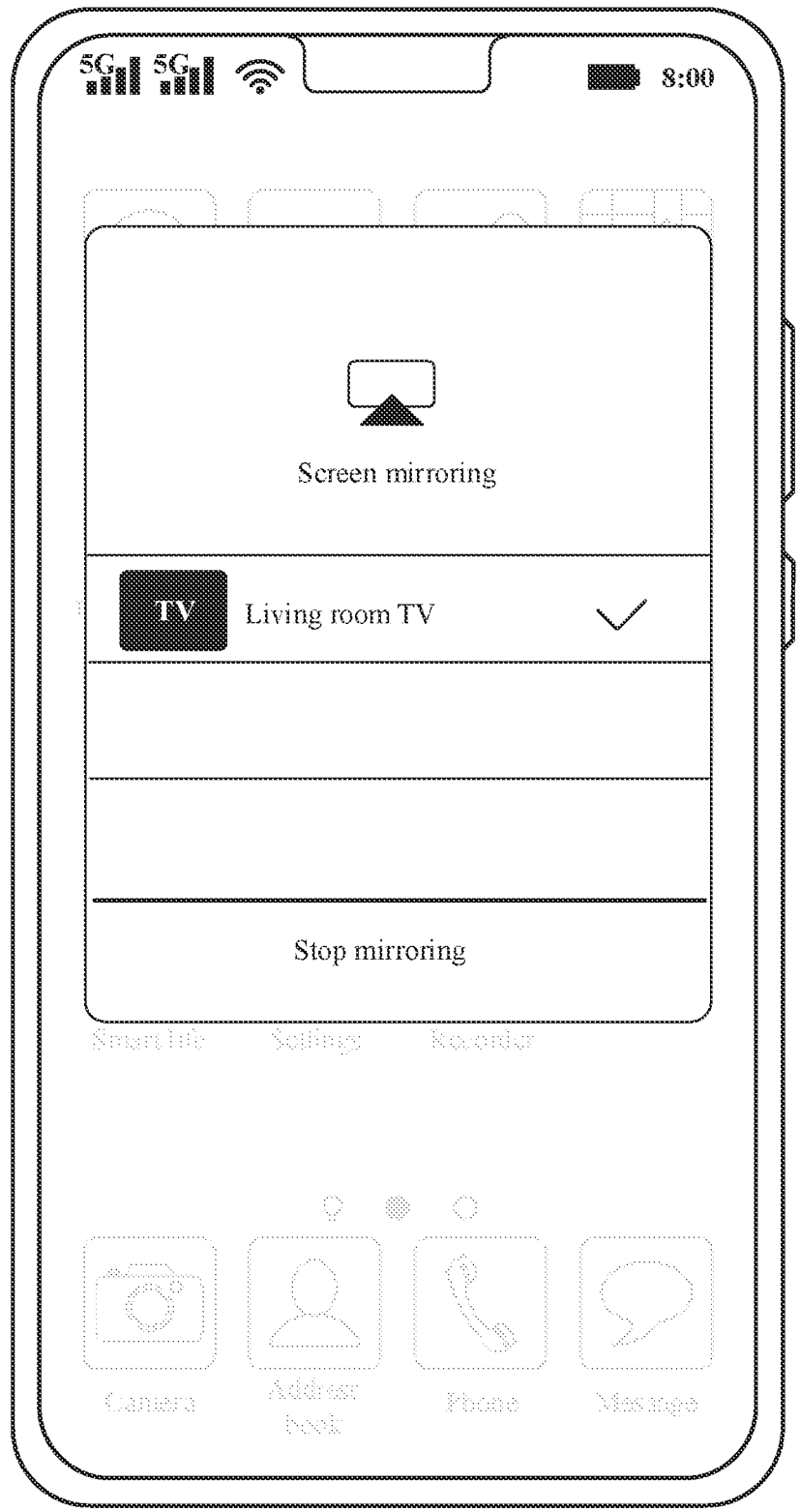
FIG. 2 is a schematic diagram of an interface for performing screen mirroring by a screen casting device according to an embodiment of this application.
Figure 2B:
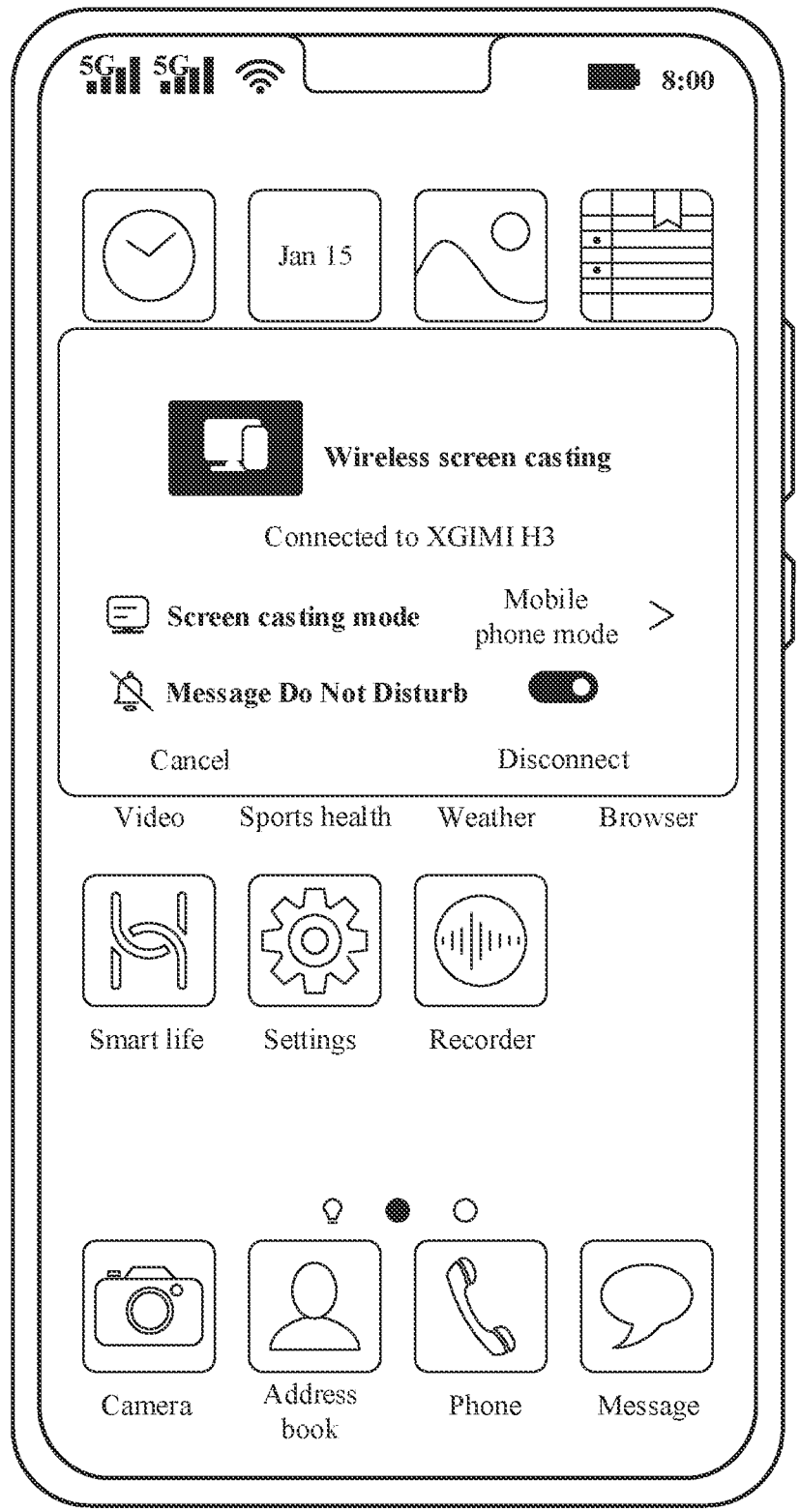
Figure 2C:
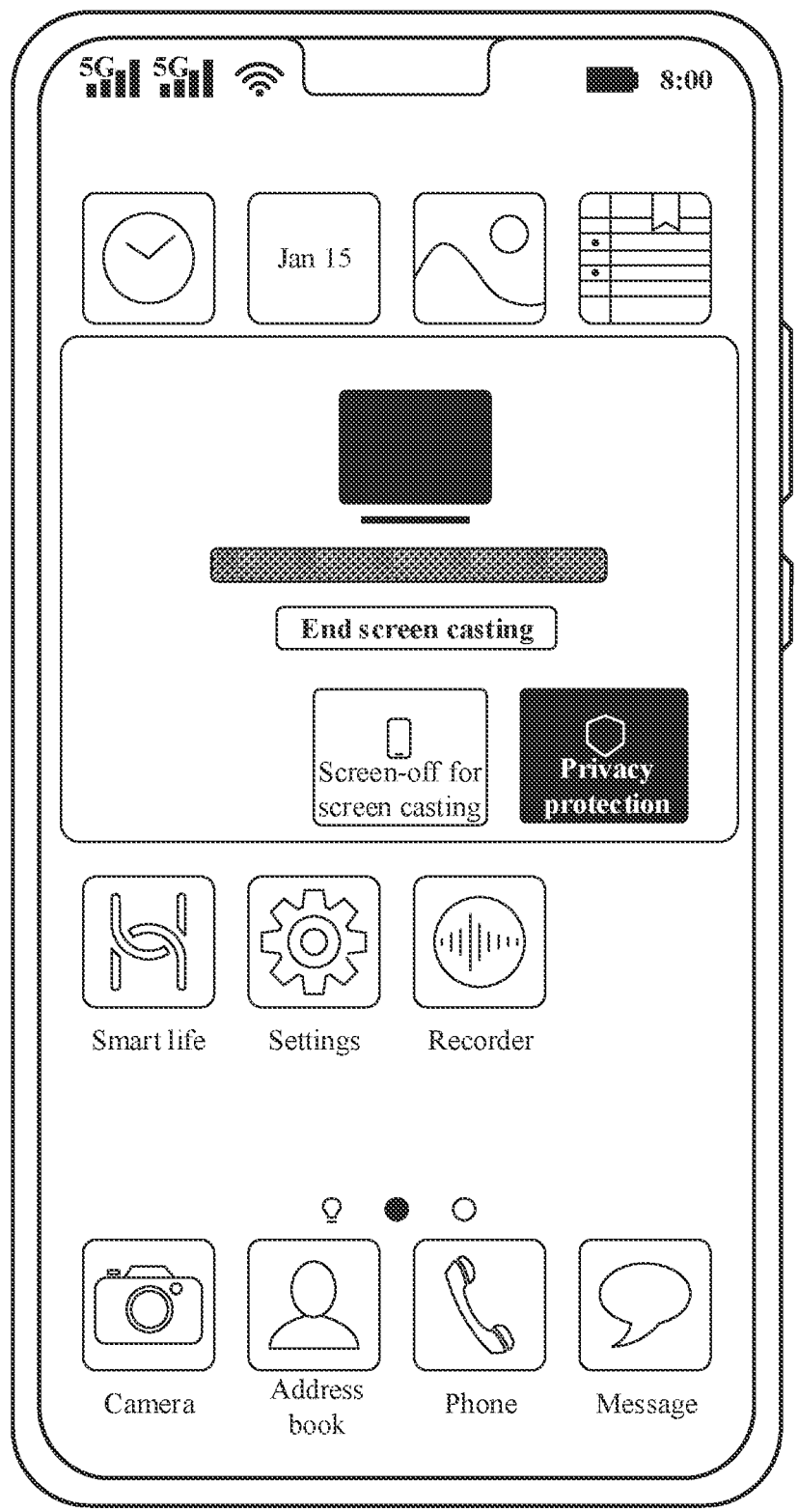

In some scenarios in which a screen of a mobile phone is mirrored to a smart TV, a display interface on the mobile phone may be shown in FIG. 2.

In a possible case, as shown in FIG. 2(*a*), after the user taps the screen mirroring APP in the mobile phone, a list of display devices that can perform screen mirroring is displayed in a drop-down list, such as "Living room TV" in FIG. 2(*a*). After the user taps "Living room TV", "√" appears behind the "Living room TV" option, and the screen of the mobile phone is mirrored to a living room TV. When the screen mirroring needs to be ended, the user can disconnect the connection between the mobile phone and the living room TV by tapping a "Stop mirroring" button below to end the screen mirroring.

In a possible case, after the user taps the screen mirroring APP in the mobile phone, the display interface on the mobile phone may be shown in FIG. 2(*b*). When the screen casting mode on the mobile phone is "Mobile phone mode", the screen of the mobile phone is mirrored to the smart TV. The user can also modify a status of a "Message Do Not Disturb?" control to select whether to not receive other messages during screen mirroring. When the screen mirroring needs to be ended, the user can tap a "Disconnect" button below to disconnect the connection between the mobile phone and the smart TV, so as to end the screen mirroring.

In a possible case, after the user taps the screen mirroring APP in the mobile phone, the display interface on the mobile phone may be shown in FIG. 2(*c*). When the screen mirroring of the mobile phone is mirrored to the smart TV, an "End screen" control is displayed on the screen of the mobile phone. Optionally, the user may perform an operation on a "Screen-off screen casting" control, so that the content that is mirrored by the screen of the mobile phone is normally displayed on the smart TV, and the screen of the mobile phone turns off. Certainly, the user may further perform an operation on a "Privacy protection" option to implement security protection on the mobile phone. When the screen mirroring needs to be ended, the user can tap a "End screen casting" button below to disconnect the connection between the mobile phone and the smart TV, so as to end the screen mirroring.

As shown in FIG. 2, in the screen mirroring process, when the user needs to temporarily process a task on a mobile phone but does not want to display the task on a smart TV, the user can only disconnect a connection between the mobile phone and the smart TV, complete the task processing on the mobile phone, and then re-establish the connection between the mobile phone and the smart TV, so as to implement a screen mirroring between the mobile phone and the smart TV again.

In a possible case, when the user needs to temporarily process a task on the mobile phone but does not want to display the task on the smart TV, this embodiment of this application may provide a function of suspending screen mirroring between the mobile phone and the smart TV. In this case, an interface shown in FIG. 3(*a*) may be displayed on the mobile phone. The user taps a "Suspend screen casting" control, so that the smart TV display an image that is displayed before the user taps the "Suspend screen casting", but does not display the image currently displayed on the mobile phone, as shown in FIG. 3(*b*). After the user completes the operation on the mobile phone, a display interface shown in FIG. 4(*a*) may be displayed on the mobile phone. The user can tap a "Resume screen casting" control, so that content displayed on the mobile phone is re-mirrored to the smart TV, as shown in FIG. 4(*b*).

In a possible case, the mobile phone may perform the screen mirroring service with the at least two display devices. For example, the mobile phone may perform the screen mirroring service with a projector while performing the screen mirroring service with the smart TV, as shown in FIG. 5(*a*). In this case, the same image is displayed on the mobile phone, the smart TV, and the projector. When a screen mirroring service needs to be simultaneously performed between the mobile phone and the smartphone and between the mobile phone the projector, an interface shown in FIG. 5(*b*) may be displayed on the mobile phone. When the user taps a "Screen mirroring" control, the mobile phone may jump to a screen mirroring setting interface, and the screen mirroring setting interface may be shown in FIG. 5(*c*), including a list that includes a "Smart TV" control and a "Projector" control. A screen mirroring operation is performed on the control corresponding to the smart TV, and/or a screen mirroring operation is performed on the control corresponding to the projector, so that when the mobile phone a screen mirroring service with the smart TV, the mobile phone also perform a screen mirroring service with the projector. In a possible case, the screen mirroring setting interface may be shown in FIG. 5(*d*), and further includes a "Select all" control. The user can tap the "Select all" control, so that the mobile phone may perform the screen mirroring service with the projector while performing the screen mirroring service with the smart TV.

Figure 6A:
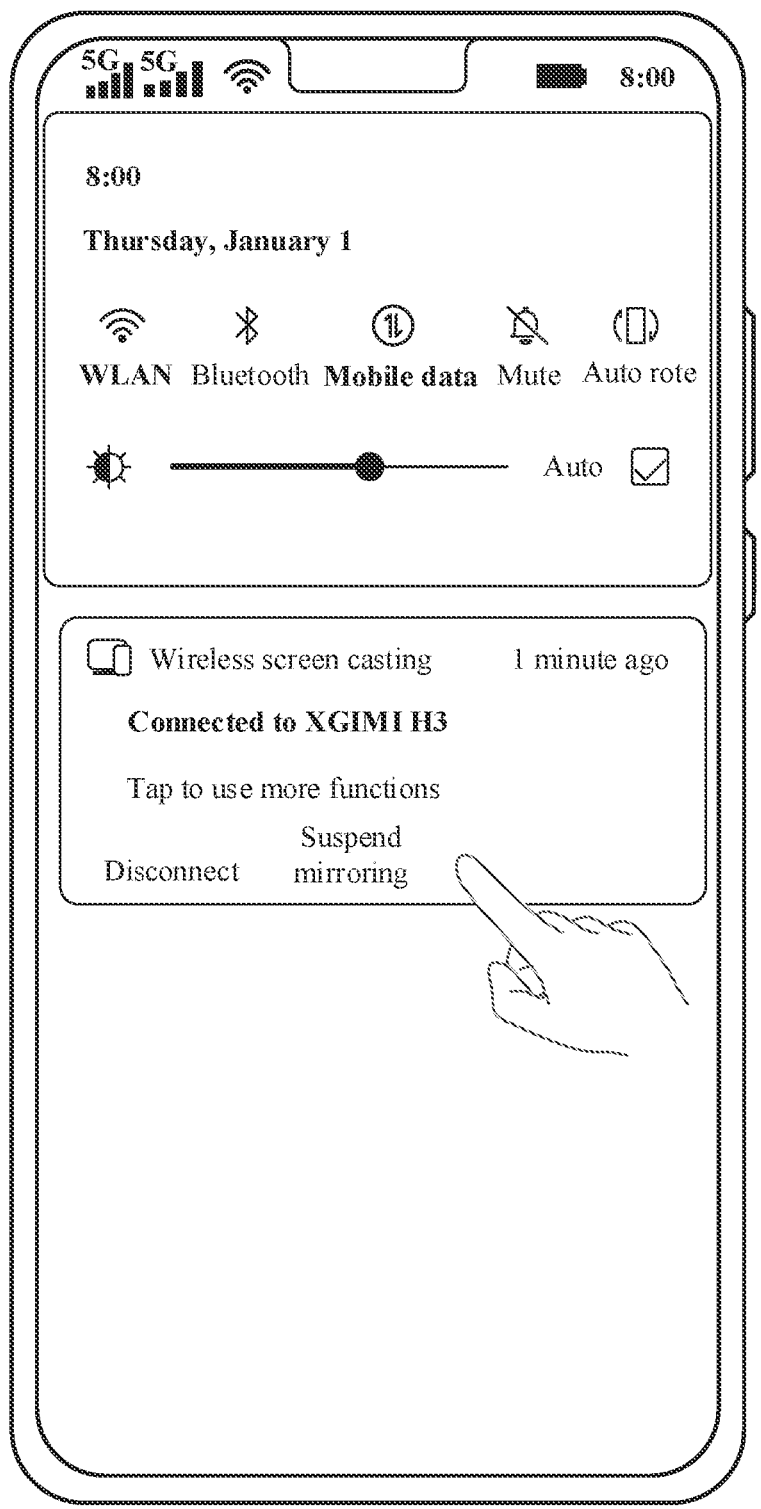
FIG. 6 is a schematic diagram of an interface for suspending screen mirroring by a screen casting device according to an embodiment of this application.
Figure 6B:
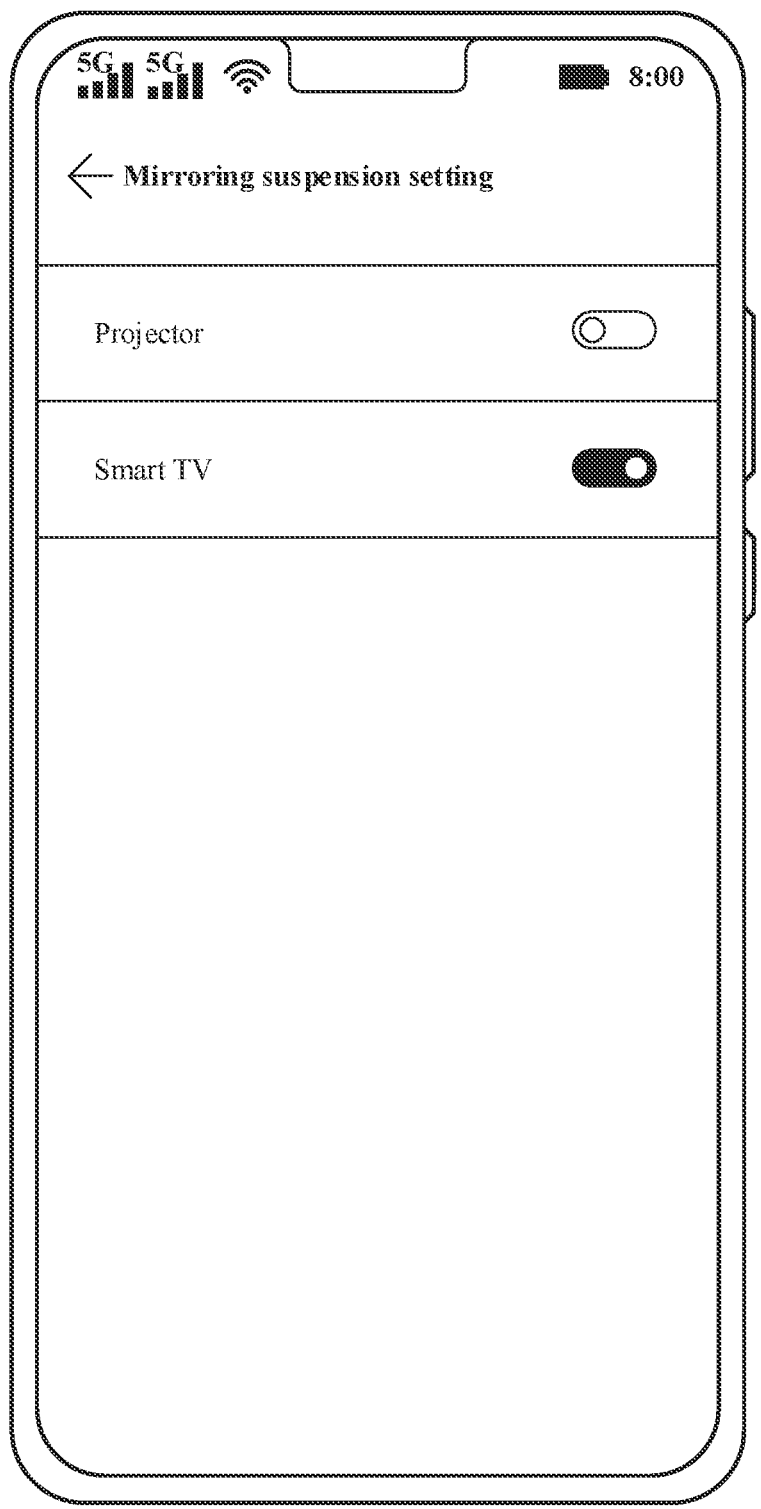
Figure 6C:
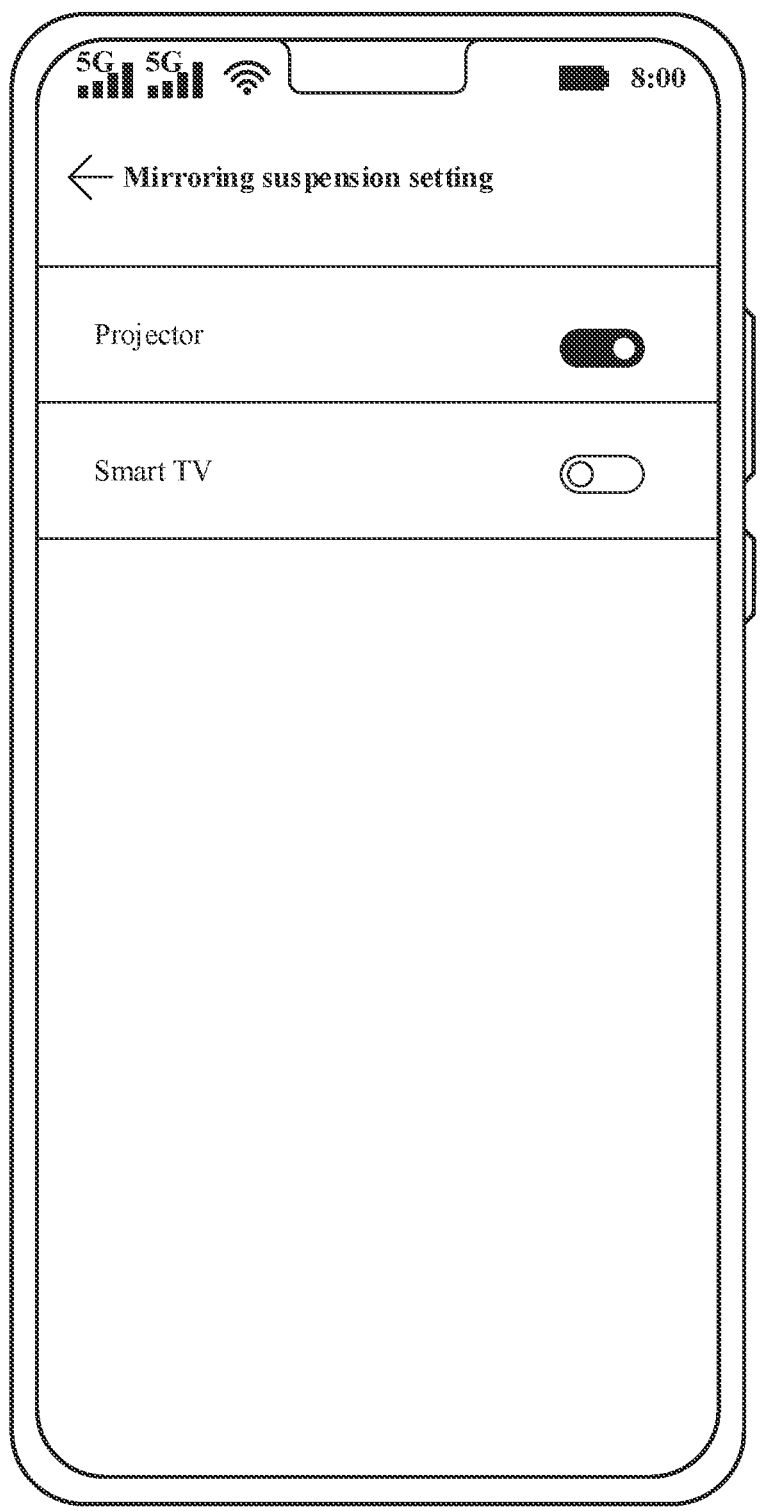
Figure 6D:
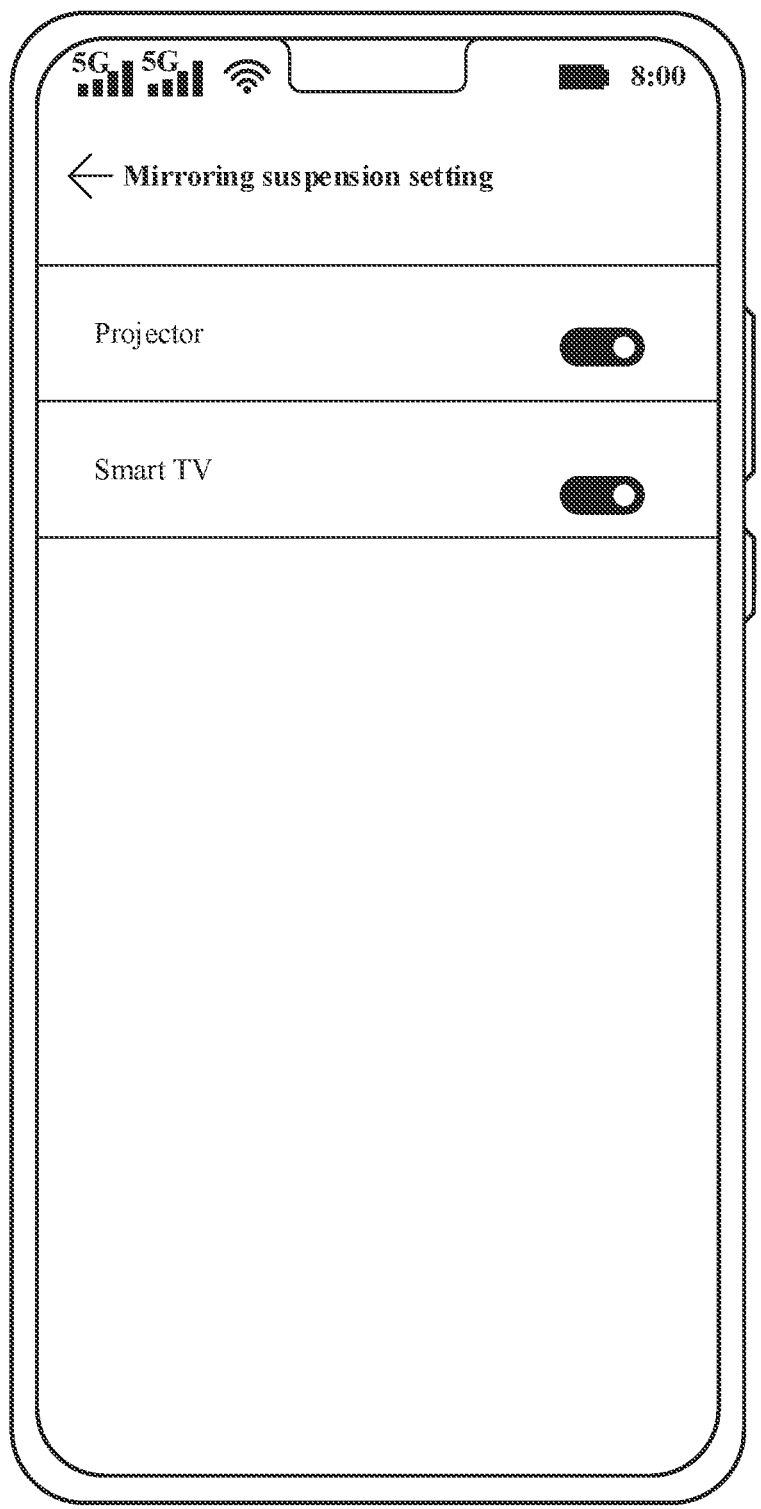
Figure 6E:
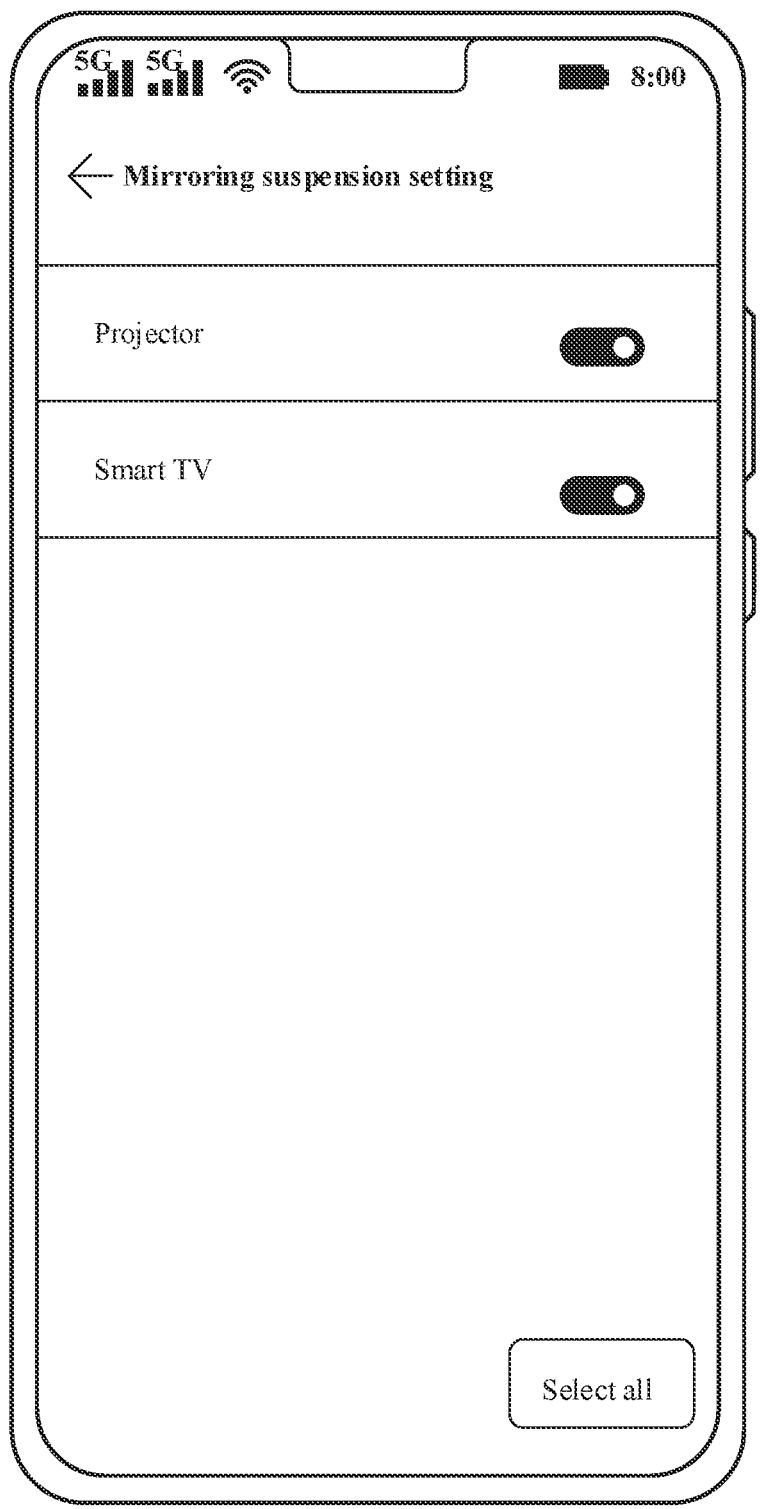
Figure 7A:
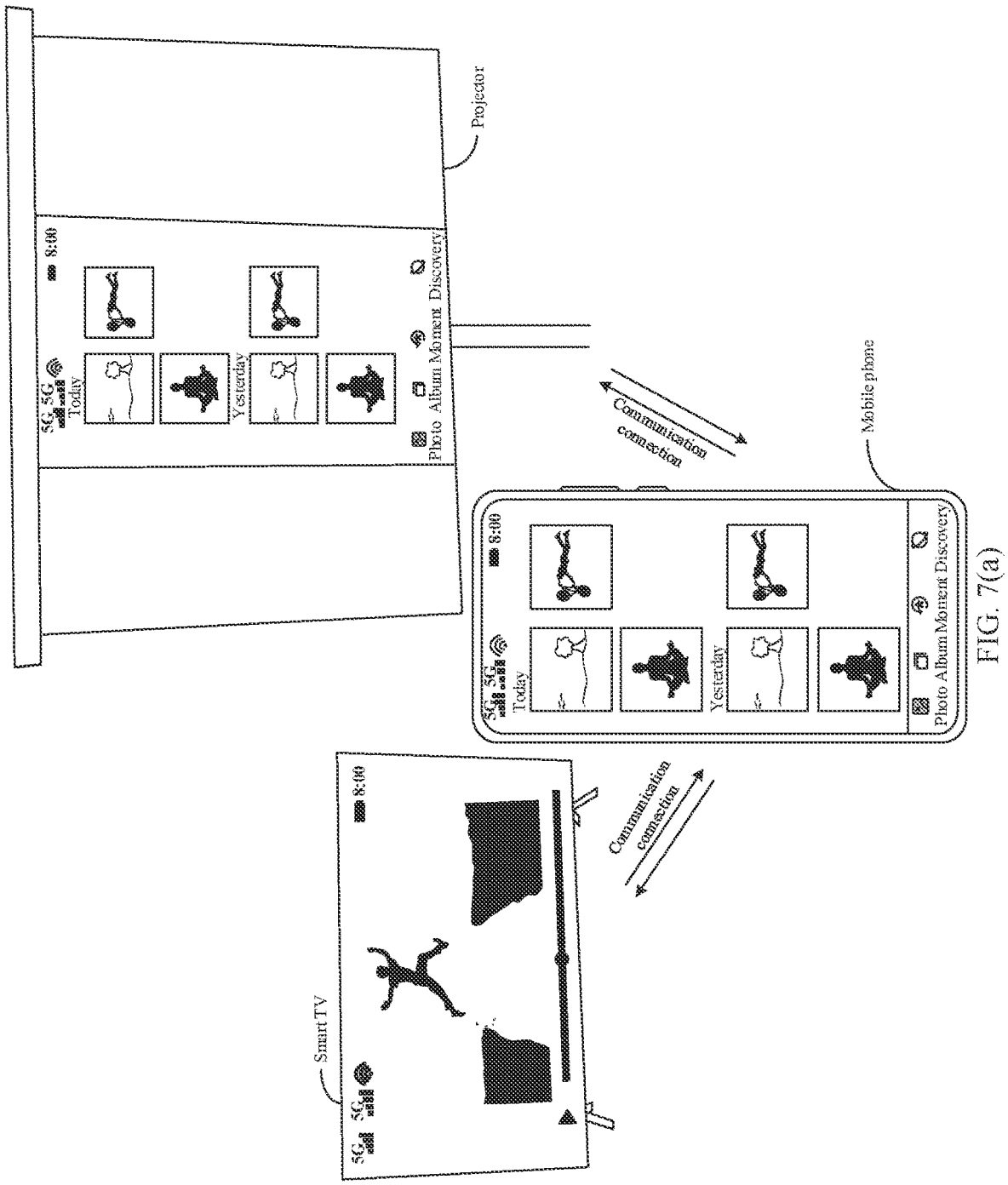
FIG. 7(a) is a schematic diagram of a scenario in which a screen casting device suspends screen mirroring according to an embodiment.
Figure 7B:
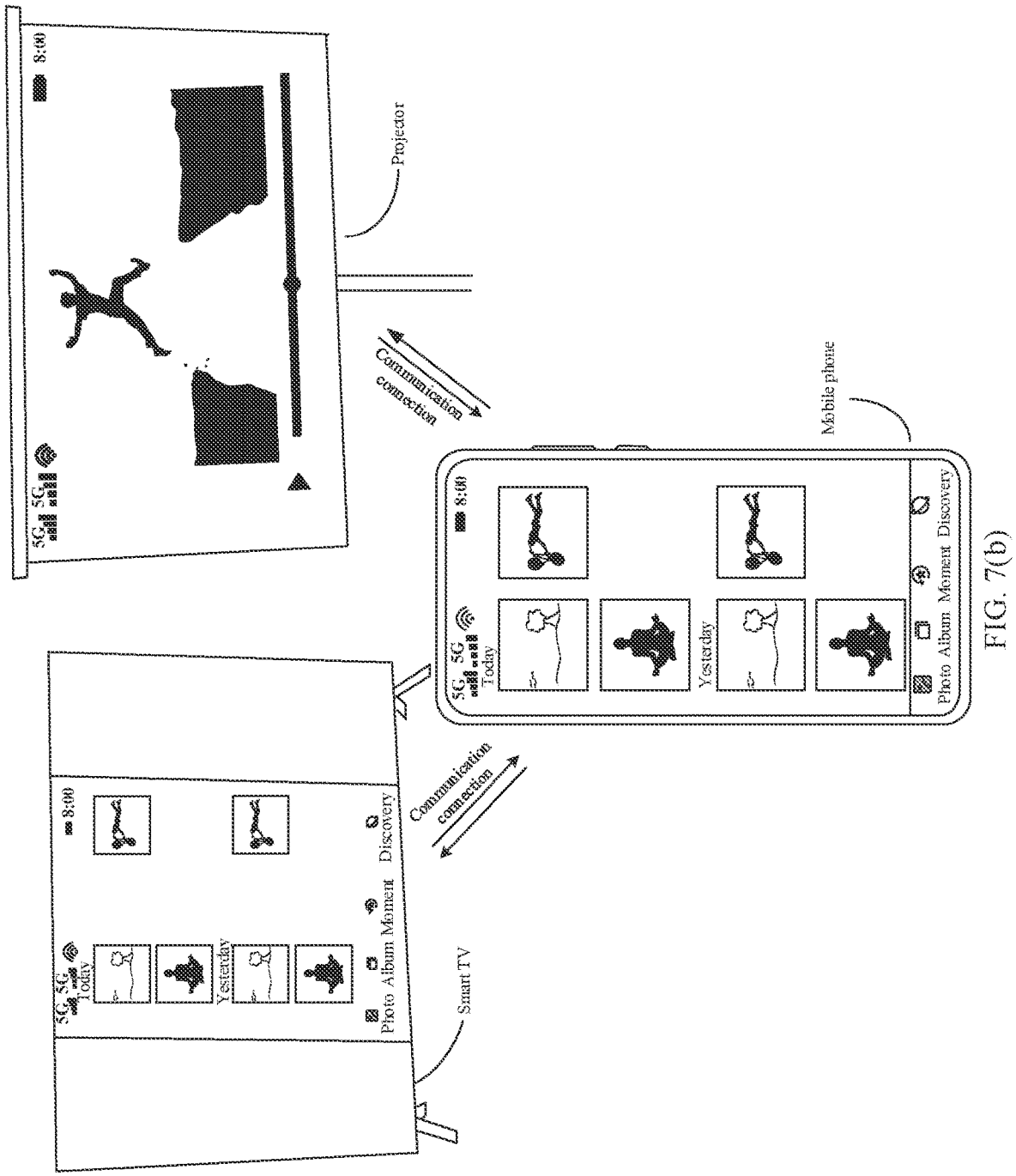
FIG. 7(b) is a schematic diagram of a scenario in which a screen casting device suspends screen mirroring according to another embodiment.
Figure 7C:
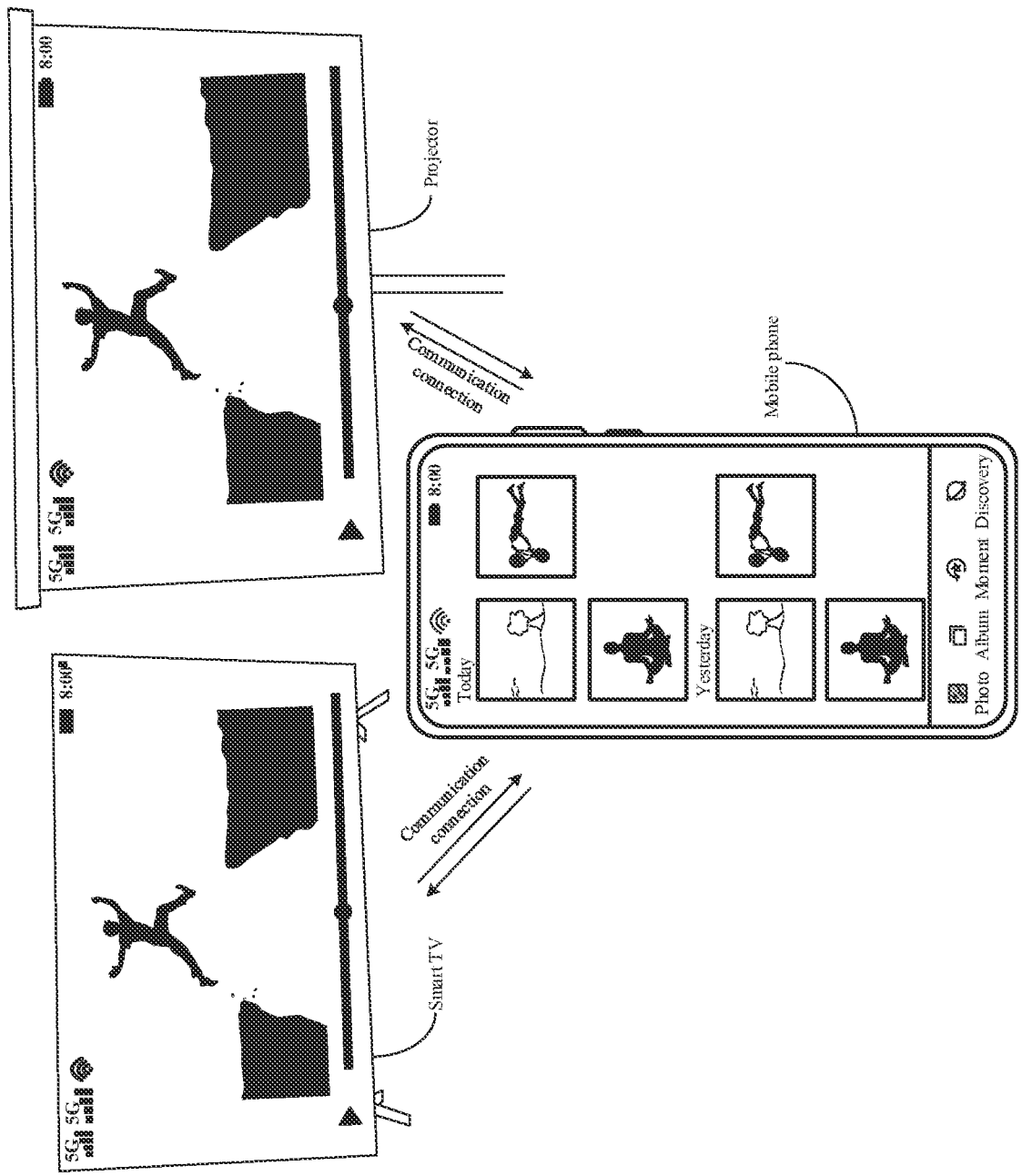
FIG. 7(c) is a schematic diagram of a scenario in which a screen casting device suspends screen mirroring in another embodiment.

When the user needs to suspend the screen mirroring, the user may suspend only the screen mirroring service between the mobile phone and the smart TV, or suspend only the screen mirroring service between the mobile phone and the projector, or suspend both the screen mirroring service between the mobile phone and the smart TV and the screen mirroring service between mobile phone and the projector. When the user tapes a "Suspend screen casting" option shown in FIG. 6(*a*) that is displayed on the interface of the mobile phone, the mobile phone may jump to the mirroring suspension setting interface shown in FIG. 6(*b*). The mirroring suspension setting interface includes a list that includes a "Smart TV" control and a "Projector" control. A screen mirroring suspension operation is performed on the control corresponding to the smart TV, and/or a screen mirroring suspension operation is performed on the control corresponding to the projector, so that the mobile phone can select to suspend the screen mirroring service between the mobile phone and the smart TV, or suspend the screen mirroring service between the mobile phone and the projector, or suspend both the screen mirroring service between the mobile phone and the smart TV and the screen mirroring service between mobile phone and the projector. For example, if the control corresponding to the smart TV is selected on the mirroring suspension setting interface shown in FIG. 6(*b*), the screen mirroring service between the mobile phone and the smart TV is suspended, but the screen mirroring service between the mobile phone and the projector is maintained. A display effect of the screen mirroring is shown in FIG. 7(*a*). For another example, if the control corresponding to the projector is selected on the mirroring suspension selling interface shown in FIG. 6(*c*), the screen mirroring service between the mobile phone and the projector is suspended, but the screen mirroring service between the mobile phone and the smart TV is maintained. A display effect of the screen mirroring is shown in FIG. 7(b). For another example, if both the control corresponding to the projector and the control corresponding to the smart TV are selected on the mirroring suspension setting interface shown in FIG. 6(d), both the screen mirroring service between the mobile phone and the projector and the screen mirroring service between the mobile phone and the smart TV are suspended. A display effect of the screen mirroring is shown in FIG. 7(c). In a possible case, the mirroring suspension setting interface may further include a "Select all" control, as shown in FIG. 6(e). The user may tap the "Select all" control to suspend both the screen mirroring service between the mobile phone and the projector and the screen mirroring service between the mobile phone and the smart TV.

Figure 8A:
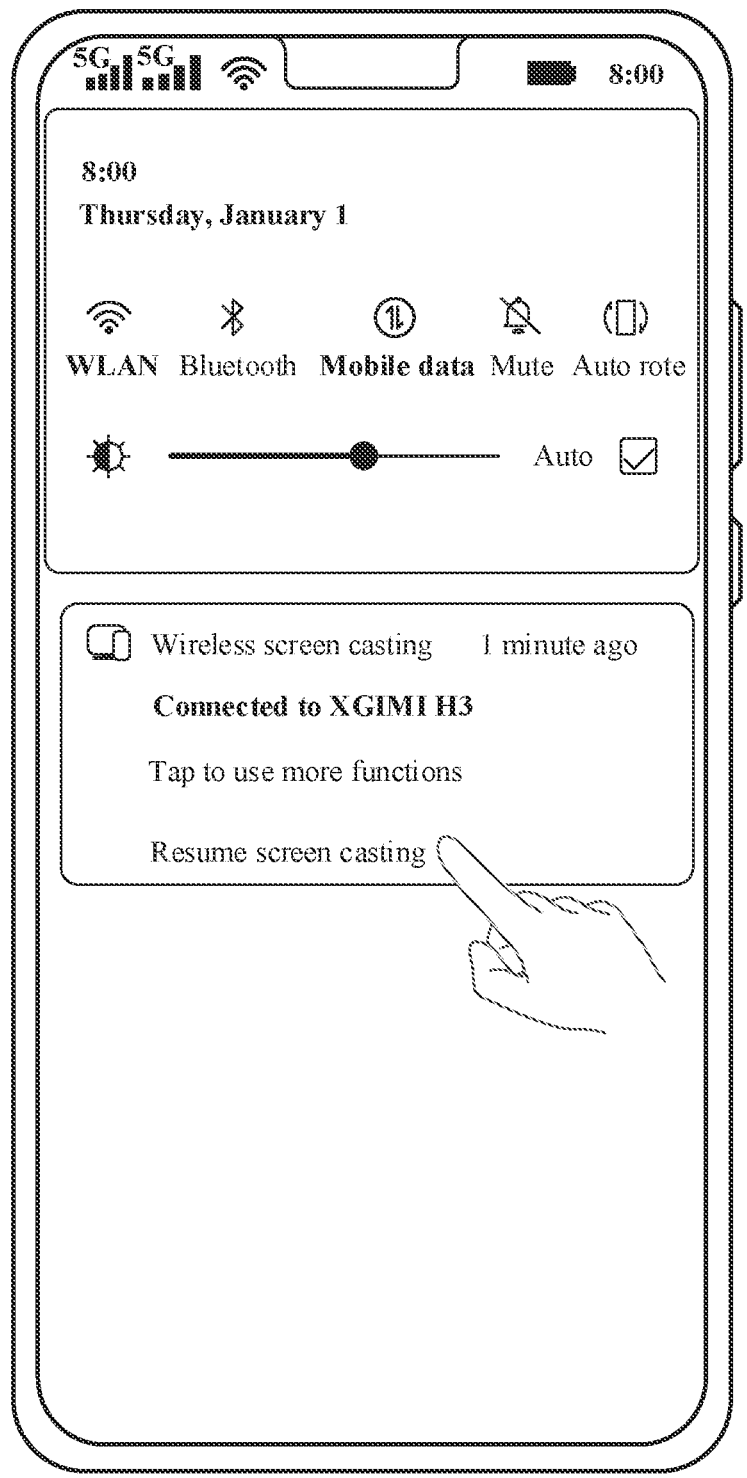
FIG. 8 is a schematic diagram of resuming screen mirroring by a screen casting device according to an embodiment of this application.
Figure 8B:
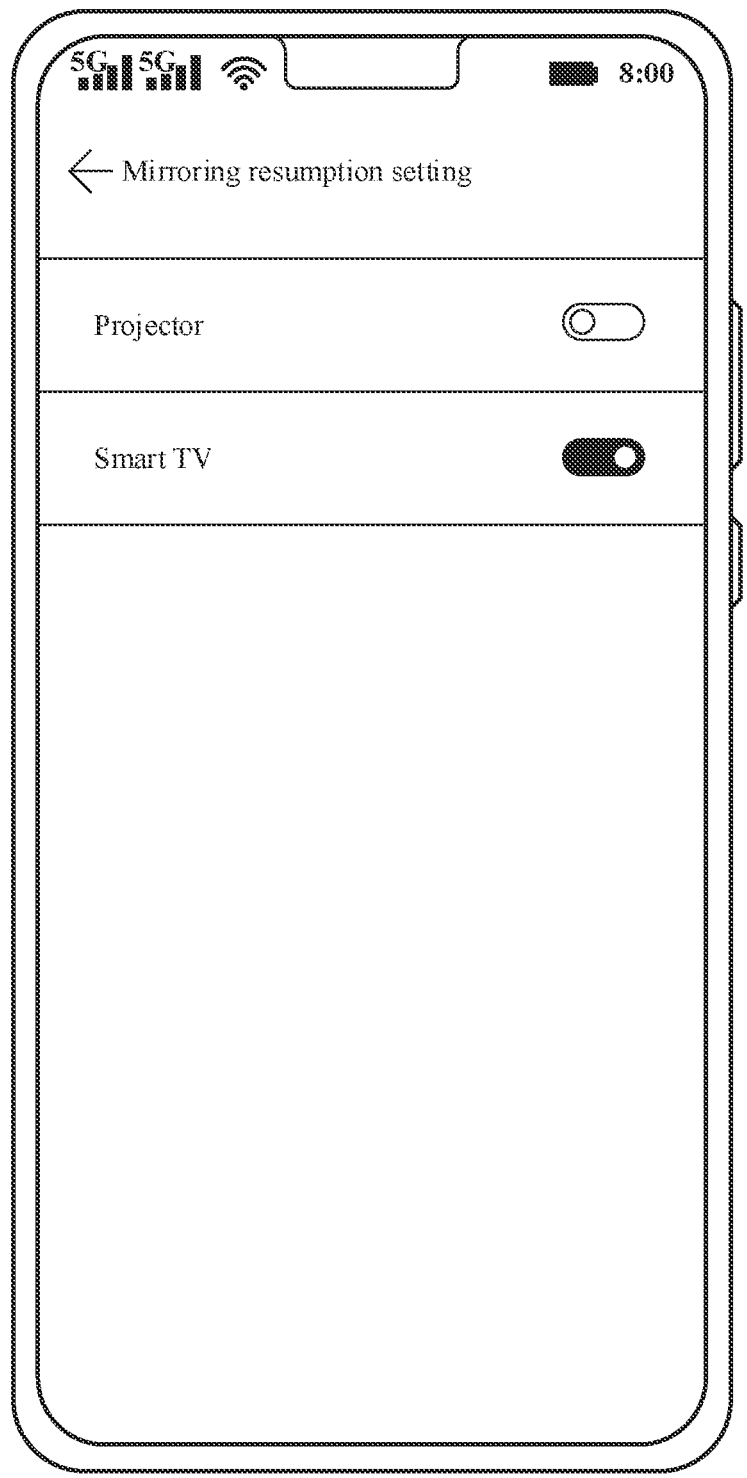
Figure 8C:
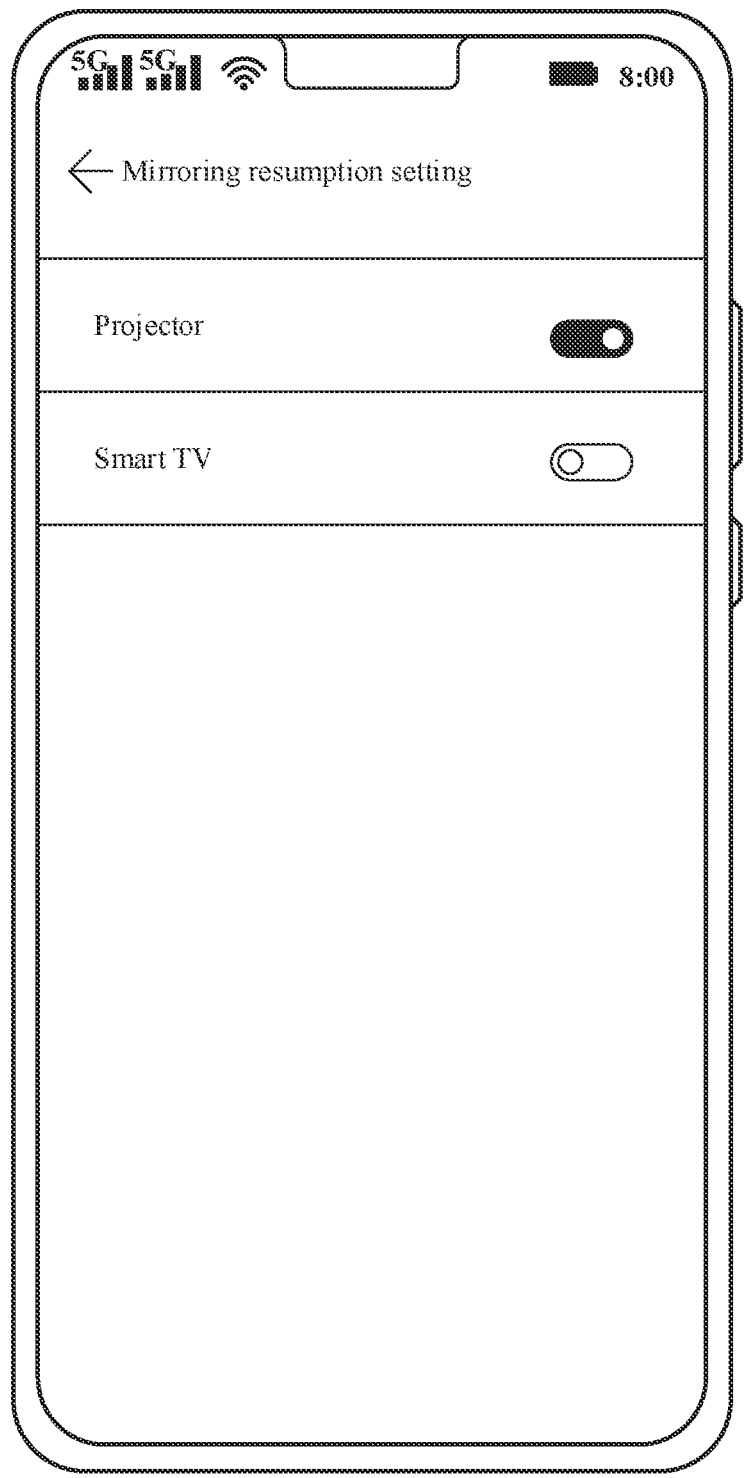
Figure 8D:
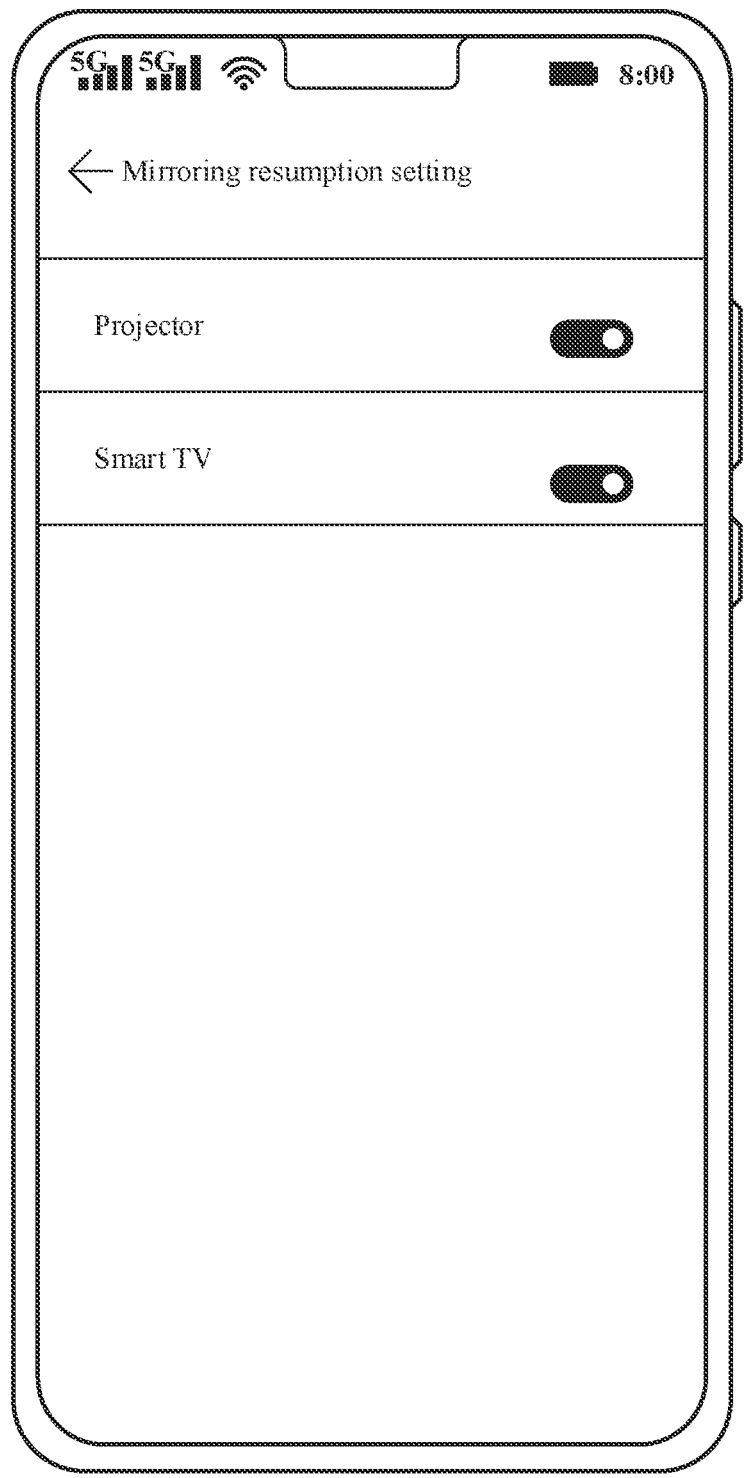
Figure 8E:
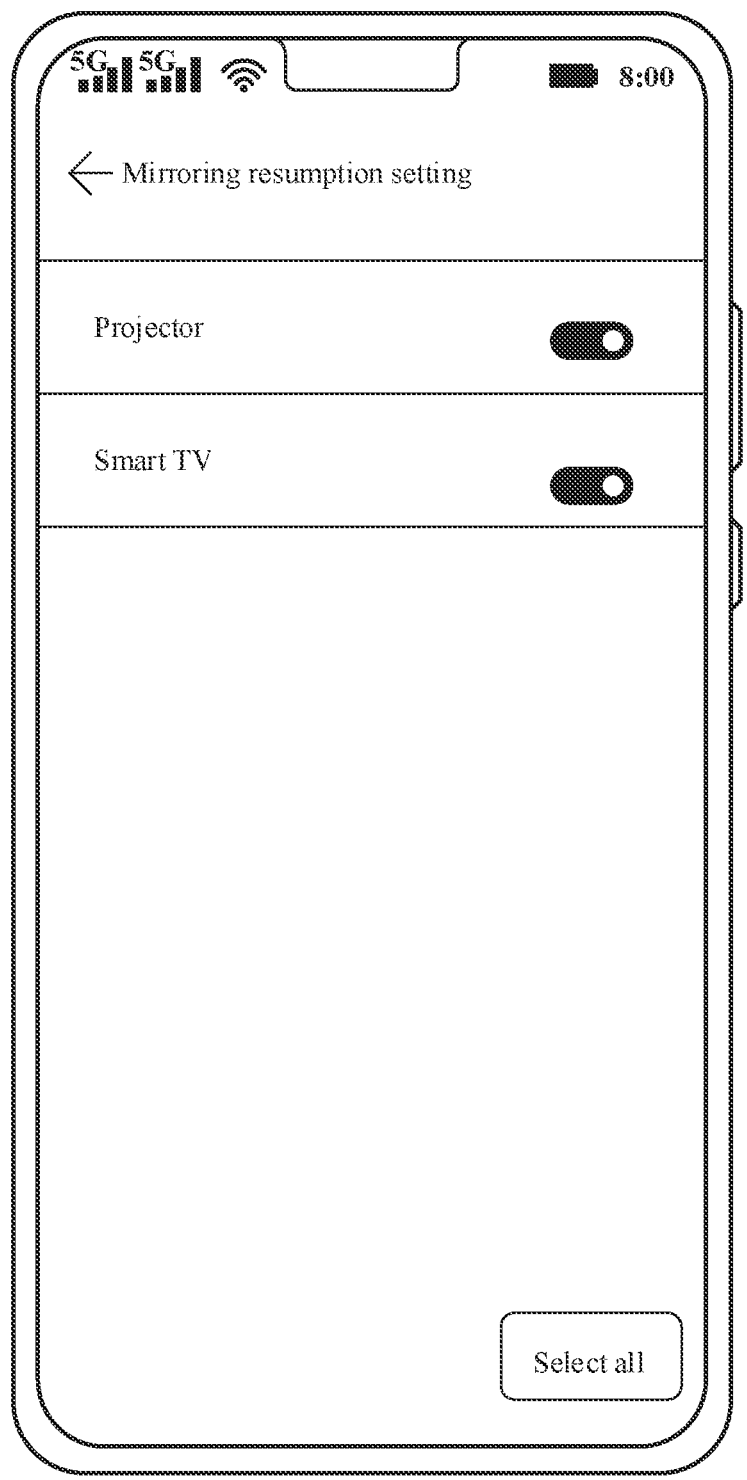
Figure 9A:
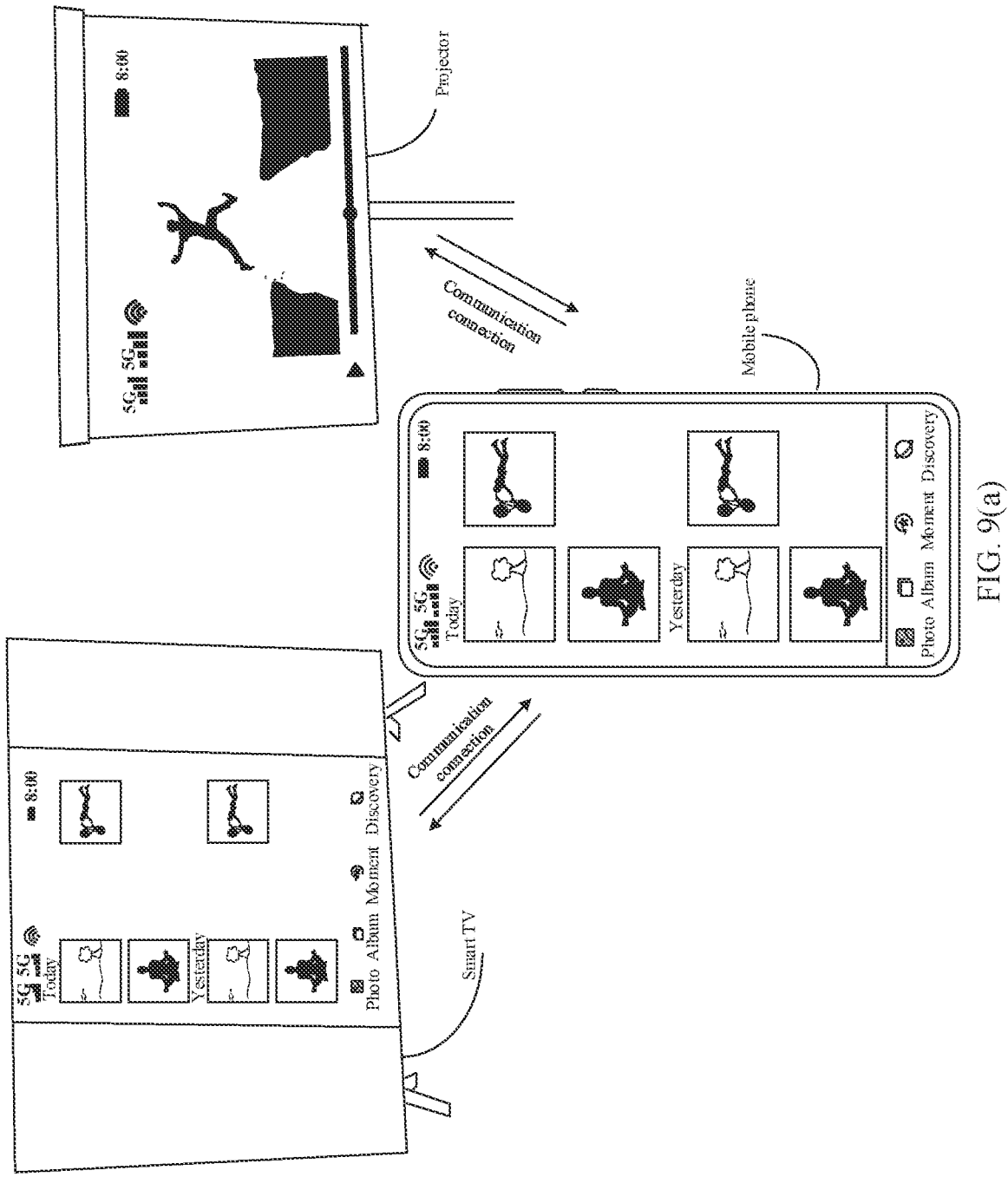
FIG. 9(a) is a schematic diagram of a scenario in which a screen casting device resumes screen mirroring according to an embodiment.
Figure 9B:
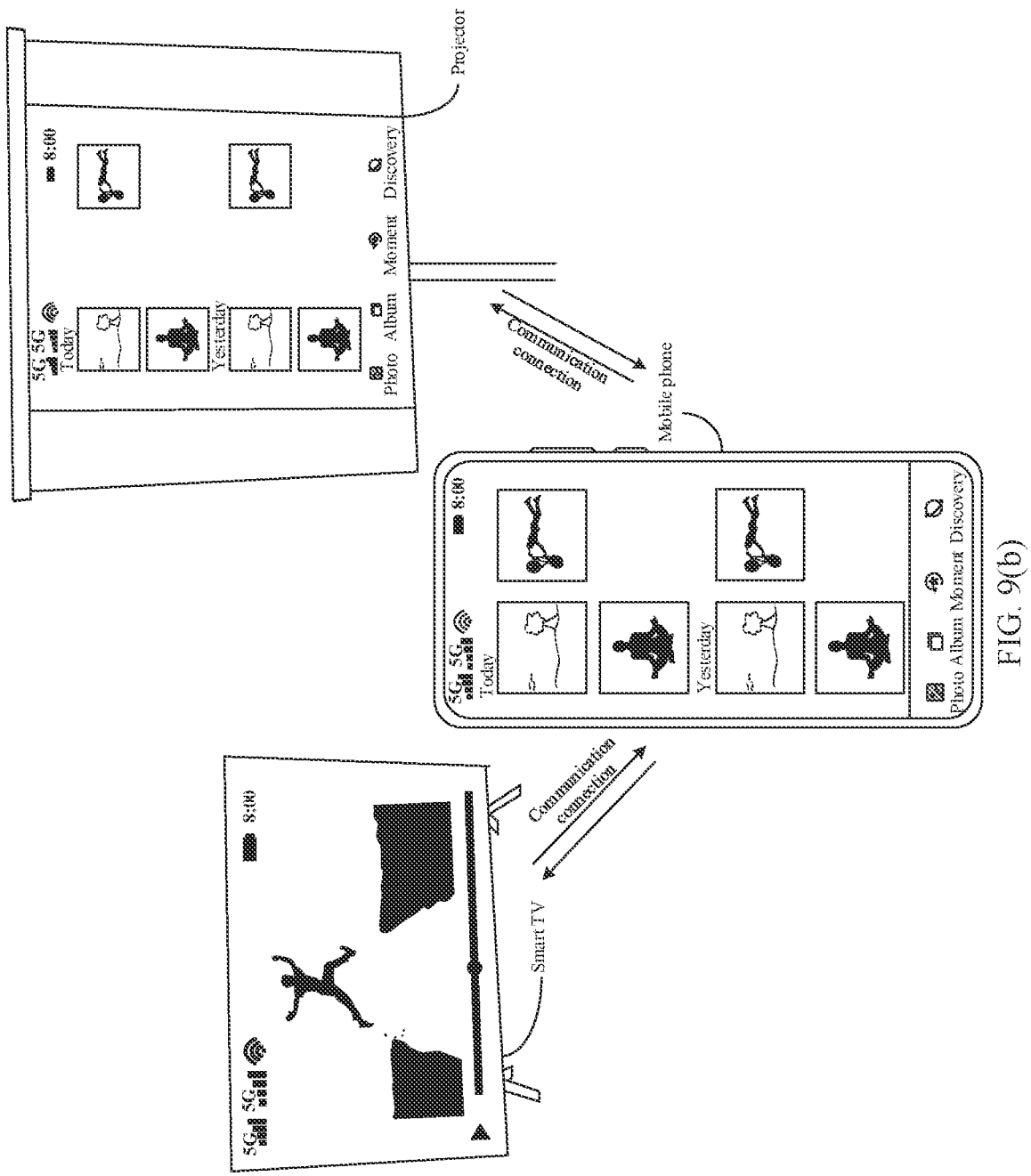
FIG. 9(b) is a schematic diagram of a scenario in casting device resumes screen mirroring according to another embodiment.
Figure 9C:
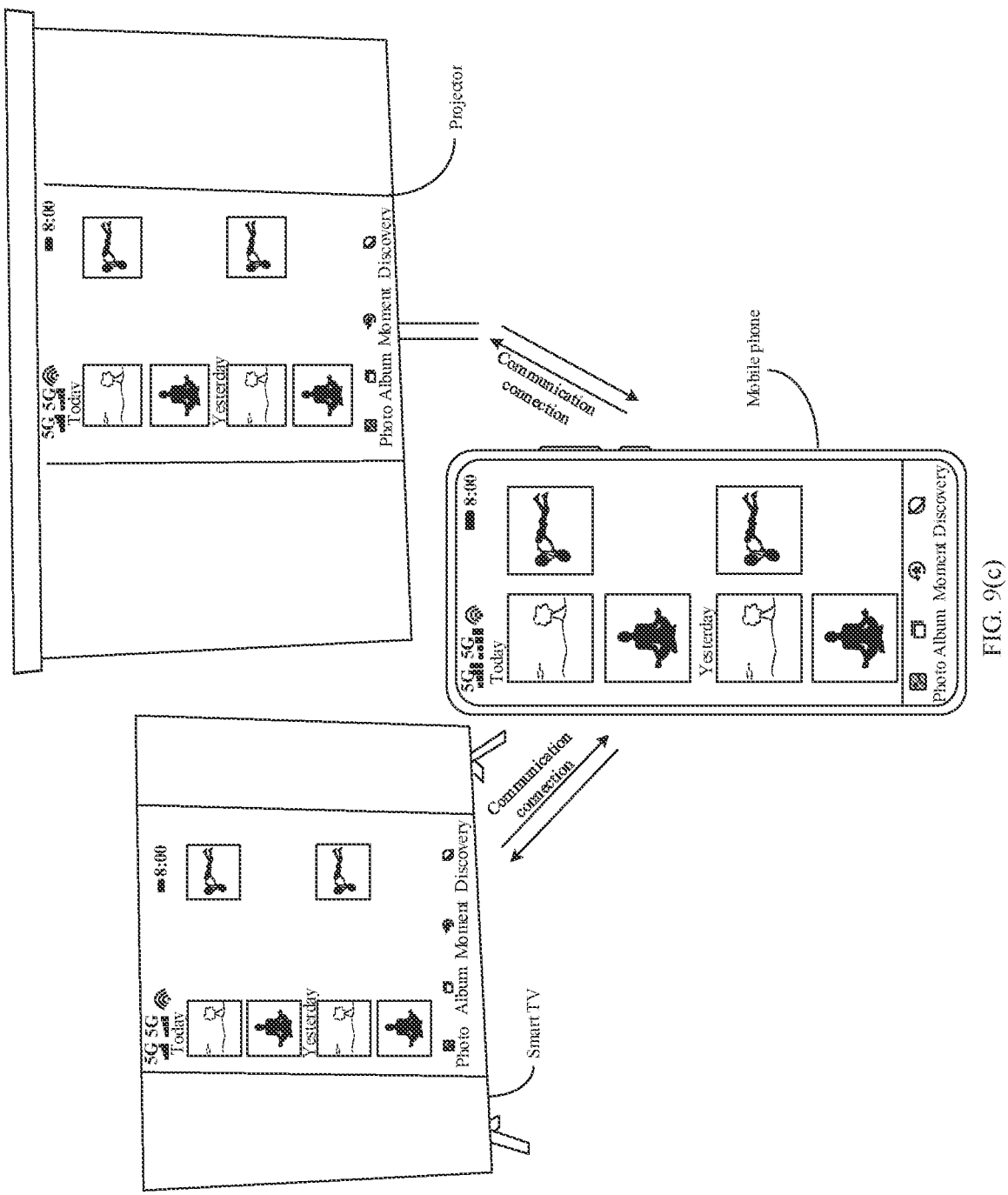
FIG. 9(c) is a schematic diagram of a scenario in which a screen casting device resumes screen mirroring according to another embodiment.

When the user needs to resume the screen mirroring, the user may resume only the screen mirroring service between the mobile phone and the smart TV, or may resume only the screen mirroring service between the mobile phone and the projector, or may resume both the screen mirroring service between the mobile phone and the smart TV and the screen mirroring service between the mobile phone and the projector. When the user tapes a "Resume screen casting" option shown in FIG. 8(a) that is displayed on the interface of the mobile phone, the mobile phone may jump to the mirroring resumption setting interface shown in FIG. 8(b). The mirroring resumption setting interface includes a list that includes a "Smart TV" control and a "Projector" control. A screen mirroring resumption operation is performed on the control corresponding to the smart TV, and/or a screen mirroring resumption operation is performed on the control corresponding to the projector, so that the mobile phone can select to resume the screen mirroring service between the mobile phone and the smart TV, or resume the screen mirroring service between the mobile phone and the projector, or resume both the screen mirroring service between the mobile phone and the smart TV and the screen mirroring service between mobile phone and the projector. For example, if the control corresponding to the smart TV is selected on the mirroring resumption setting interface shown in FIG. 8(b), the screen mirroring service between the mobile phone and the smart TV is resumed, but the screen mirroring service between the mobile phone and the projector is still suspended. A display effect of the screen mirroring is shown in FIG. 9(a). For another example, if the control corresponding to the projector is selected on the mirroring resumption setting interface shown in FIG. 8(c), the screen mirroring service between the mobile phone and the projector is resumed, but the screen mirroring service between the mobile phone and the smart TV is still suspended. A display effect of the screen mirroring is shown in FIG. 9(b). For another example, if both the control corresponding to the projector and control corresponding to the smart TV are selected on the mirroring resumption setting interface shown in FIG. 8(d), both the screen mirroring service between the mobile phone and the projector and the screen mirroring service between the mobile phone and the smart TV are resumed. A display effect of the screen mirroring is shown in FIG. 9(c). In a possible case, the mirroring resumption setting interface may further include a "Select all" control, as shown in FIG. 8(e). The user may tap the "Select all" control to resume both the screen mirroring service between the mobile phone and the projector and the screen mirroring service between the mobile phone and the smart TV.

Figure 10:
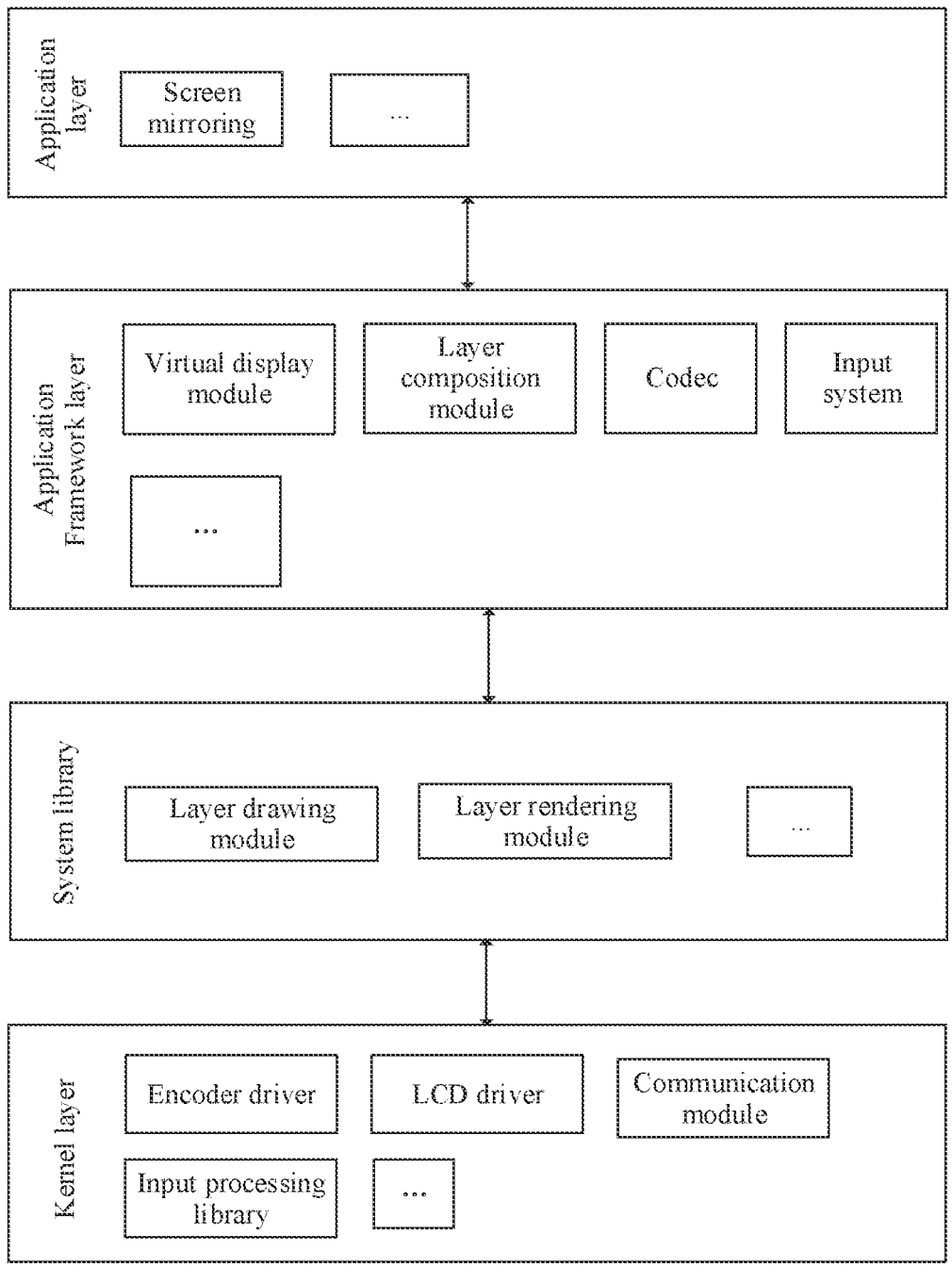
FIG. 10 is a schematic diagram of a software architecture electronic device according to an embodiment of this application.

FIG. 10 is a schematic diagram of an example software architecture of a screen casting device 100, where the screen casting device 100 may be a mobile phone.

The layered architecture of the screen casting device 100 divides software into several layers, and each layer has a clear role and division of labor. The layers communicate with each other through software interfaces. In some embodiments, the Android system is divided into four layers: an application layer, an application framework layer, an Android runtime (Android runtime) and a system library, and a kernel layer from top down.

The application layer may include a series of application packages.

As shown in FIG. 10, the application layer may include a screen mirroring application.

The application framework layer (framework) provides an application programming interface (application programming interface, API) and a programming framework for applications at the application layer. The application framework layer includes some predefined functions.

As shown in FIG. 10, the application framework layer may include a virtual display (display) module, a layer composition (surfaceflinger) module, a Codec, an inputsystem (inputsystem), and the like.

The virtual display module is configured to copy image data displayed on a display.

The surfaceflinger module is configured to perform composition processing on rendered and drawn image data.

The Codec is configured to perform processing such as encoding and decoding on the image data.

The system library layer may include an image drawing module that is configured to draw the image data and an image rendering module that is configured to render the image data.

The core library includes two parts: one part is functions that need to be invoked by a java language, and the other part is the core library of Android.

The application layer and the application framework layer run in a virtual machine. The virtual machine executes java files at the application layer and the application framework layer as binary files. The virtual machine is configured to implement functions such as object lifecycle management, stack management, thread management, security and exception management, and recycling of waste.

The kernel layer is a layer between hardware and software. The kernel layer includes at least an encoder driver, a liquid crystal display (Liquid Crystal Display, LCD) driver, a communication module, and an input processing library (inputevent).

It can be understood that the components included in the system framework layer, the system library and runtime layer shown in FIG. 10 do not constitute a specific limitation on the screen casting device 100. In some other embodiments of this application, the screen casting device 100 may include more or fewer components than those shown in the figure, combine some components, split some components, or have different component arrangements.

The screen mirroring application invokes the image drawing module in the system library to draw the image data, and invokes the image rendering module to render the rendered image data. Then, the screen mirroring application sends the rendered image data to the surfaceflinger module for composition. For example, the surface flinger module may perform image composition based on a fixed period. Using a refresh rate of 60 Hz as an example, the surfaceflinger module performs image composition based on a period of 16.6 ms. After performing the image composition, the surfaceflinger module sends the composited image data to the LCD driver module of the screen casting device, and the LCD driver module drives the display of the screen casting device to display the composited image data.

In an embodiment, when the user taps a screen casting control for screen mirroring, a touch panel (TP) receives the tap operation of the user, the kernel layer processes the tap operation into an original input event (including information such as touch coordinates, a touch strength, and a time stamp of the touch operation), and stores the original input event at the kernel layer. The kernel layer reports the original input event to the inputsystem at the application framework layer by using the inputevent. The inputsystem at the application framework layer parses the information about the original input event (including an operation type, a reported point location, and the like), determines a focus application based on a current focus, and sends the parsed information to the focus application. The focus may be a touch point in the tap operation, and the focus application may be an application running in a foreground of the screen casting device or an application corresponding to a tap position in the tap operation, for example, a screen mirroring application. The focus application determines, based on the parsed information about the original input event (for example, the reported point location), a control corresponding to the original input event, for example, a screen mirroring control in the screen mirroring application.

Figure 11:
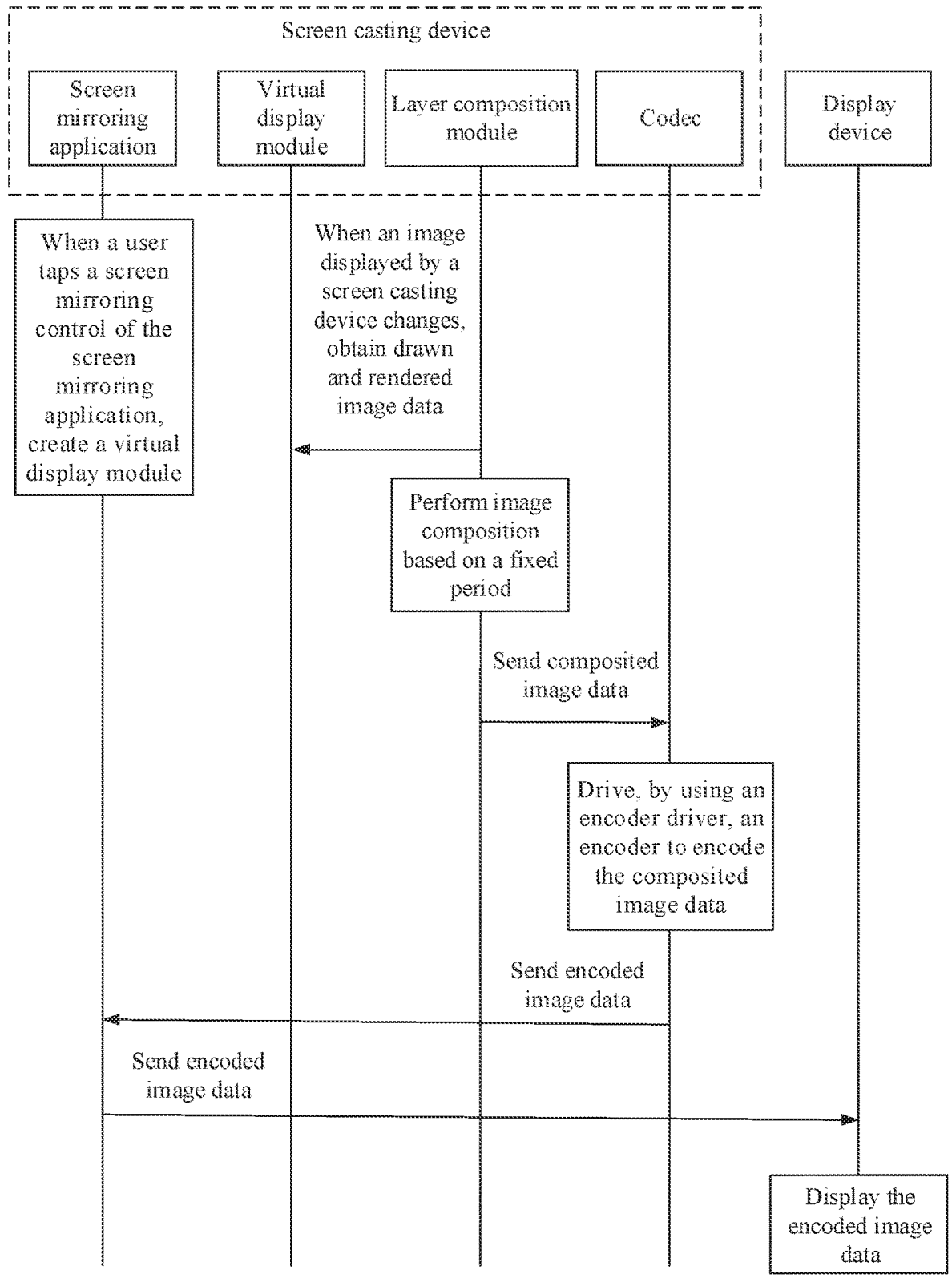
FIG. 11 is a schematic flowchart of a screen mirroring method according to an embodiment of this application.

When the user taps the screen mirroring control of the screen mirroring application, as shown in FIG. 11, the mobile phone establishes a communication connection to the communication module at the kernel layer of the smart TV by using the communication module at the kernel layer. The screen mirroring application creates a virtual display module at the framework layer, and the screen mirroring application sends the rendered image to the virtual display module. When the periodic signal indicating image composition arrives, the surfaceflinger module obtains, by using the virtual display module, the drawn and rendered image data (to-be-composited image data), and performs image composition. Then the surfaceflinger module sends the composited image data to the Codec. The Codec drives, by using an encoder driver, the encoder to encode the composited image data of the frame. After completing encoding of the composited image data, the encoder notifies the Codec, and then the Codec sends the encoded image data to the screen mirroring application. The screen mirroring application may send the encoded image data to the display device, and the display device displays the encoded image data.

Figure 12:
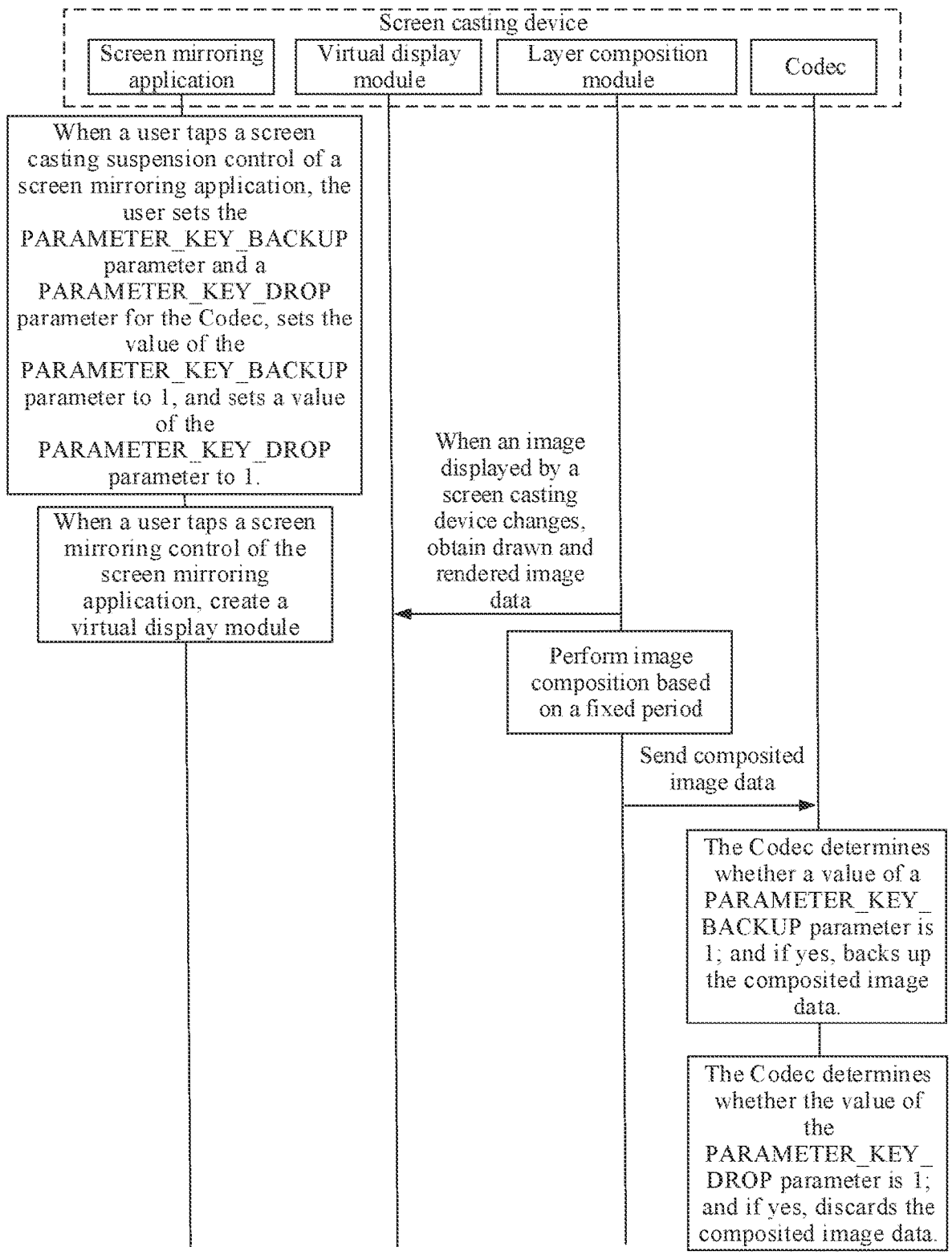
FIG. 12 is a schematic flowchart of a screen mirroring method according to an embodiment of this application.

When the user needs to suspend the screen mirroring service between the screen casting device and the display device, the user may tap the screen casting suspension control of the screen mirroring application. In this case, a connection path between the screen casting device and the display device is still in a connected state. The following describes in detail, based on the embodiment shown in FIG. 12, how to suspend the screen mirroring service between the screen casting device and the display device. As shown in FIG. 12, When the user taps the screen casting suspension control of the screen mirroring application, the screen mirroring application invokes the Codec to set a PARAMETER_KEY_BACKUP parameter and a PARAMETER_KEY_DROP parameter for the Codec. When the value of the PARAMETER_KEY_BACKUP parameter is 1, it indicates the Codec to start to back up data that is sent by the surfaceflinger module to the Codec. The data that is sent by the surfaceflinger module to the Codec may be composited image data that is obtained by the surfaceflinger module by compositing rendered image data. When the value of the PARAMETER_KEY_BACKUP parameter is 0, it indicates the Codec to stop backing up the data that is sent by the surfaceflinger module to the Codec. When the value of the PARAMETER_KEY_DROP parameter is set to 1, it indicates the Codec to discard the data that is sent by the surfaceflinger module to the Codec. When the value of the PARAMETER_KEY_DROP parameter is 0, it indicates that the Codec stops discarding the data that is sent by the surfaceflinger module to the Codec. For example, when the user taps the screen casting suspension control of the screen mirroring application, the screen mirroring application sets the value of the PARAMETER_KEY_BACKUP parameter in the Codec to 1, and sets the value of the PARAMETER_KEY_DROP parameter in the Codec to 1.

When the image displayed on the screen casting device changes, the screen mirroring application sends the rendered image data to the virtual display module. When the periodic signal indicating image composition arrives, the surfaceflinger module obtains, by using the virtual display module, the drawn and rendered image data to perform image composition, so as to obtain composited image data. Then the surfaceflinger module sends the composited image data to the Codec. The Codec determines whether the value of the PARAMETER_KEY_BACKUP parameter is 1, and when the value of the PARAMETER_KEY_BACKUP parameter is 1, the Codec backs up the composited image data sent by the surfaceflinger module to a buffer of the Codec. It should be noted that, when the image displayed on the screen casting device changes next time, the Codec will delete the composited image data that is sent by the surfaceflinger module and that is backed up last time, and back up only the composited image data that is sent by the surfaceflinger module at the current moment. That is, the Codec backs up only the composited image data of the latest frame. In a process of suspending the screen mirroring, if the image displayed on the screen casting device is a still image and does not change, in this case, the screen mirroring application may not send the rendered image data to the virtual display module, the surfaceflinger module cannot obtain the to-be-composited image data by using the virtual display module, and therefore cannot perform image composition, and further, the surfaceflinger module cannot send the composited image data to the Codec.

Further, the Codec determines whether the value of the PARAMETER_KEY_DROP parameter is 1, and discards the composited image sent by the surfaceflinger module when the value of the PARAMETER_KEY_DROP parameter is 1. In this case, the encoder has no to-be encoded data, and the encoder suspends encoding, and does not send encoded image data to the display device. As a result, the display device does not display the image currently displayed on the screen casting device, thereby implementing a function of suspending a screen mirroring service between the screen casting device and the display device.

In a possible case, the screen casting device may perform the screen mirroring service with a plurality of display devices. The PARAMETER_KEY_DROP parameter may have a plurality of values, where some of the values are used to indicate to discard the composited image data, and other values are respectively in a one-to-one correspondence with the composited image data of the display devices. For example, the value of the PARAMETER_KEY_DROP parameter may be 0, 1, 2, 3, and 4. When the value of the PARAMETER_KEY_DROP parameter is 0, it indicates to not discard the composited image data, and values "1", "2", "3", and "4" of the PARAMETER_KEY_DROP parameter are respectively corresponding to the composited image data of the display devices. For example, the value "1" is corresponding to the composited image data of the display device 1, the value "2" is corresponding to the composited image data of the display device 2, the value "3" is corresponding to the composited image data of the display device 3, and the value "4" is corresponding to the composited image data of the display device 4. When the value of the PARAMETER_KEY_DROP parameter is 1, it indicates to discard the composited image data corresponding to the display device 1. When the value of the PARAMETER_KEY_DROP parameter is 2, it indicates to discard the composited image data corresponding to the display device 2. When the value of the PARAMETER_KEY_DROP parameter is 3, it indicates to discard the composited image data corresponding to the display device 3. When the value of the PARAMETER_KEY_DROP parameter is 4, it indicates to discard the composited image data corresponding to the display device 4. A quantity of the values of the PARAMETER_KEY_DROP parameter is not limited in this embodiment of this application.

Similarly, there may be a plurality of values of the PARAMETER_KEY_BACKUP parameter, where some values are used to indicate to back up the composited image data, and other values are respectively in a one-to-one correspondence with the composited image data of the display devices. For example, the value of the PARAMETER_KEY_BACKUP parameter may be 0, 1, 2, 3, and 4. When the value of the PARAMETER_KEY_BACKUP parameter is 0, it indicates to not back up the composited image data, and values "1", "2", "3", and "4" of the PARAMETER_KEY_BACKUP parameter are respectively corresponding to the composited image data of the display devices. For example, the value "1" is corresponding to the composited image data of the display device 1, the value "2" is corresponding to the composited image data of the display device 2, the value "3" is corresponding to the composited image data of the display device 3, and the value "4" is corresponding to the composited image data of the display device 4. When the value of the PARAMETER_KEY_BACKUP parameter is 1, it indicates to back up the composited image data corresponding to the display device 1. When the value of the PARAMETER_KEY_BACKUP parameter is 2, it indicates to hack up the composited image data corresponding to the display device 2. When the value of the PARAMETER_KEY_BACKUP parameter is 3, it indicates to hack up the composited image data corresponding to the display device 3. When the value of the PARAMETER_KEY_BACKUP parameter is 4, it indicates to back up the composited image data corresponding to the display device 4. A quantity of the values of the PARAMETER_KEY_BACKUP parameter is not limited in this embodiment of this application.

In a possible case, the PARAMETER_KEY_DROP parameter includes an Xth bit and a Yth bit, where a parameter value of the Xth bit is used to indicate whether to discard the composited image data, parameter values of the Yth bit are in a one-to-one correspondence with the display devices, and a parameter of the Yth is used to indicate a display device corresponding to the composited image data to be discarded. For example, values "0" and "1" of the Xth bit in the PARAMETER_KEY_DROP parameter are used to indicate whether to discard the to-be-encoded data. When the value of the Xth bit in the PARAMETER_KEY_DROP parameter is 0, it indicates to not discard the to-be-encoded data. When the value of the Xth bit in the PARAMETER_KEY_DROP parameter is 1, it indicates to discard the to-be-encoded data, A value of the Yth bit in the PARAMETER_KEY_DROP parameter may be 1, 2, 3, or 4, and the values are respectively corresponding to the composited image data of the display devices. For example, the value "1" is corresponding to the composited image data of the display device 1, the value "2" is corresponding to the composited image data of the display device 2, the value "3" is corresponding to the composited image data of the display device 3, and the value "4" is corresponding to the composited image data of the display device 4. When the value of the Xth bit in the PARAMETER_KEY_DROP parameter is 0 and the value of the Yth bit in the PARAMETER_KEY_DROP parameter is 1, it indicates to not discard the composited image data corresponding to the display device 1. When the value of the Xth bit in the PARAMETER_KEY_DROP parameter is 0 and the value of the Yth bit in the PARAMETER_KEY_DROP parameter is 2, it indicates to not discard the composited image data corresponding to the display device 2. When the value of the Xth bit in the PARAMETER_KEY_DROP parameter is 0 and the value of the Yth bit in the PARAMETER_KEY_DROP parameter is 3, it indicates to not discard the composited image data corresponding to the display device 3. When the value of the Xth bit in the PARAMETER_KEY_DROP parameter is 0 and the value of the Yth bit in the PARAMETER_KEY_DROP parameter is 4, it indicates to not discard the composited image data corresponding to the display device 4. When the value of the Xth bit in the PARAMETER_KEY_DROP parameter is 1 and the value of the Yth bit in the PARAMETER_KEY_DROP parameter is 1, it indicates to discard the composited image data corresponding to the display device 1. When the value of the Xth bit in the PARAMETER_KEY_DROP parameter is 1 and the value of the Yth bit in the PARAMETER_KEY_DROP parameter is 2, it indicates to discard the composited image data corresponding to the display device 2. When the value of the Xth bit in the PARAMETER_KEY_DROP parameter is 1 and the value of the Yth bit in the PARAMETER_KEY_DROP parameter is 3, it indicates to discard the composited image data corresponding to the display device 3. When the value of the Xth bit in the PARAMETER_KEY_DROP parameter is 1 and the value of the Yth bit in the PARAMETER_KEY_DROP parameter is 4, it indicates to discard the composited image data corresponding to the display device 4.

Similarly, the PARAMETER_KEY_BACKUP parameter includes an Mth bit and an Nth bit, where a parameter value of the Mth bit is used to indicate whether to back up the composited image data, and parameter values of the Nth bit are in a one-to-one correspondence with the display devices, and a parameter value of the Nth bit is used to indicate a display device corresponding to the composited image data to be backed up. For example, values "0" and "1" of the Mth bit in the PARAMETER_KEY_BACKUP parameter are used to indicate whether to back up the to-be-encoded data. When the value of the Mth bit in the PARAMETER_KEY_BACKUP parameter is 0, it indicates to not back up the to-be-encoded data. When the value of the Mth bit in the PARAMETER_KEY_BACKUP parameter is 1, it indicates to back up the to-be-encoded data. A value of the Nth bit in the PARAMETER_KEY_BACKUP parameter may be 1, 2, 3, or 4, and the values are respectively corresponding to the composited image data of the display devices. For example, the value "1" is corresponding to the composited image data of the display device 1, the value "2" is corresponding to the composited image data of the display device 2, the value "3" is corresponding to the composited image data of the display device 3, and the value "4" is corresponding to the composited image data of the display device 4. When the value of the Mth bit in the PARAMETER_KEY_BACKUP parameter is 0 and the value of the Nth bit in the PARAMETER_KEY_BACKUP parameter is 1, it indicates to not back up the composited image data corresponding to the display device 1. When the value of the Mth bit in the PARAMETER_KEY_BACKUP parameter is 0 and the value of the Nth bit in the PARAMETER_KEY_BACKUP parameter is 2, it indicates to not back up the composited image data corresponding to the display device 2. When the value of the Mth bit in the PARAMETER_KEY_BACKUP parameter is 0 and the value of the Nth bit in the PARAMETER_KEY_BACKUP parameter is 3, it indicates to not back up the composited image data corresponding to the display device 3. When the value of the Mth hit in the PARAMETER_KEY_BACKUP parameter is 0 and the value of the Nth bit in the PARAMETER_KEY_BACKUP parameter is 4, it indicates to not back up the composited image data corresponding to the display device 4. When the value of the Mth bit in the PARAMETER_KEY_BACKUP parameter is 1 and the value of the Nth bit in the PARAMETER_KEY_BACKUP parameter is 1, it indicates to back up the composited image data corresponding to the display device 1. When the value of the Mth bit in the PARAMETER_KEY_BACKUP parameter is 1 and the value of the Nth bit in the PARAMETER_KEY_BACKUP parameter is 2, it indicates to back up the composited image data corresponding to the display device 2. When the value of the Mth bit in the PARAMETER_KEY_BACKUP parameter is 1 and the value of the Nth bit in the PARAMETER_KEY_BACKUP parameter is 3, it indicates to back up the composited image data corresponding to the display device 3. When the value of the Mth bit in the PARAMETER_KEY_BACKUP parameter is 1 and the value of the Nth bit in the PARAMETER_KEY_BACKUP parameter is 4, it indicates to back up the composited image data corresponding to the display device 4.

Figure 13:
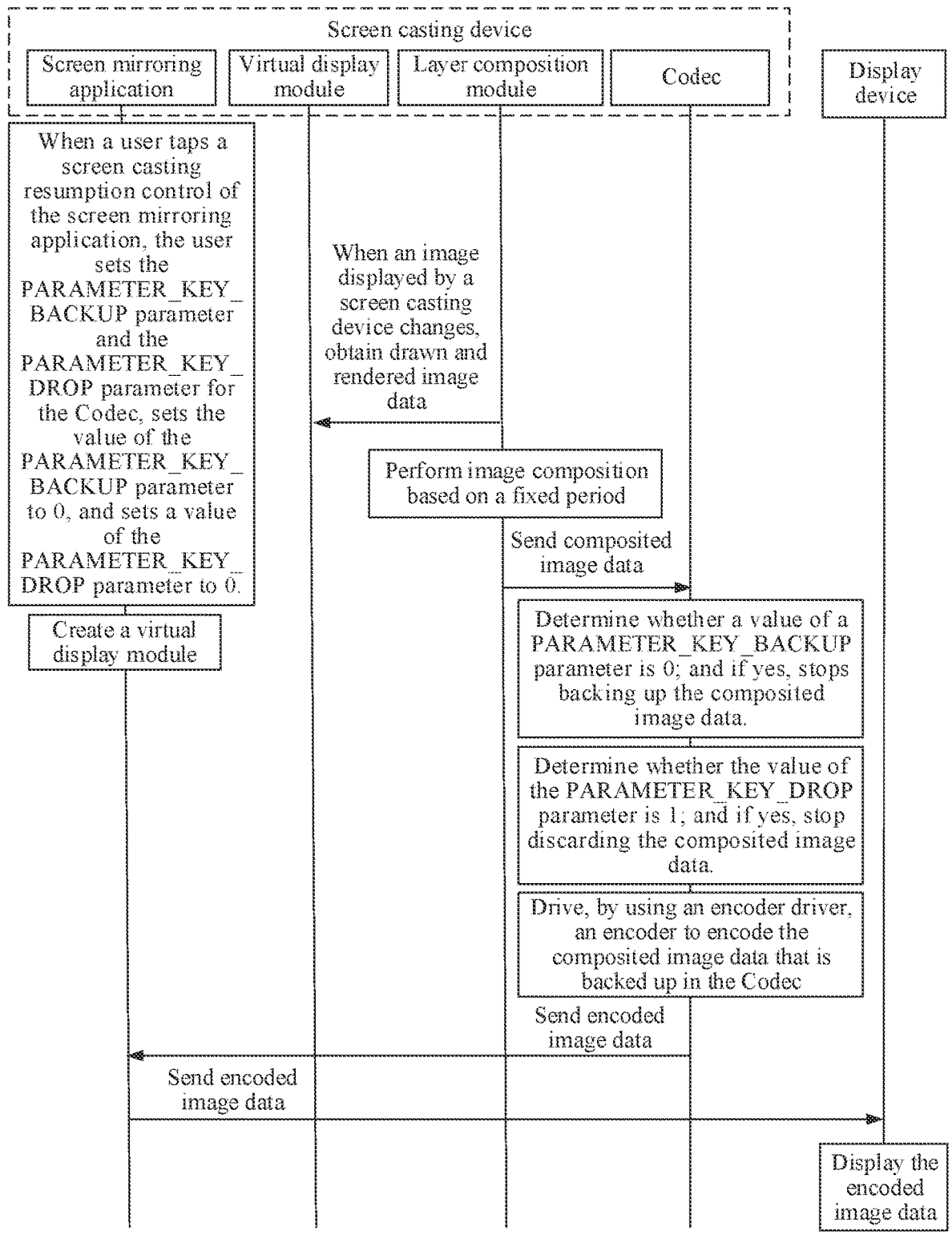
FIG. 13 is a schematic flowchart of a screen mirroring method according to another embodiment of this application.

When the user needs to resume the screen mirroring service between the screen casting device and the display device, the user may tap a screen mirroring resumption control of the screen mirroring application. The following describes in detail, based on the embodiment shown in FIG. 13, how to resume the screen mirroring service between the screen casting device and the display device. As shown in FIG. 13, when the user taps the resumption screen control of the screen mirroring application, the screen mirroring application invokes the Codec and sets the PARAMETER_KEY_BACKUP parameter and the PARAMETER_KEY_DROP parameter for the Codec. In addition, the screen mirroring application sets the value of the PARAMETER_KEY_BACKUP parameter in the Codec to 0, and sets the value of the PARAMETER_KEY_DROP parameter in the Codec to 0.

The Codec determines whether the value of the PARAMETER_KEY_BACKUP parameter is 0, and when the value of the PARAMETER_KEY_BACKUP parameter is 0, the Codec stops backing up the composited image data sent by the surfaceflinger module to the buffer of the Codec. In addition, the Codec determines whether the value of the PARAMETER_KEY_DROP parameter is 0, and when the value of the PARAMETER_KEY_DROP parameter is 0, the Codec stops discarding the composited image data sent by the surfaceflinger module. In this case, the encoder may encode the composited image data that is sent by the surfaceflinger module and that is backed up in the Codec, and send the encoded image data to the display device by using the communication module. As a result, the display device displays the image currently displayed on the screen casting device, thereby implementing a function of resuming a screen mirroring service between the screen casting device and the display device.

Figure 14:
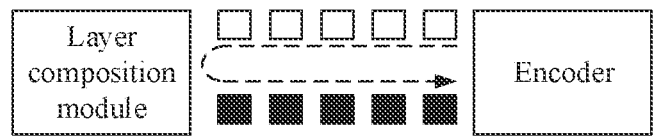
FIG. 14 is a schematic flowchart of encoding by an encoder.

In an embodiment, the encoder may receive, in a manner shown in FIG. 14, the to-be-encoded data output by the surfaceflinger module. The encoder may release an empty input buffer (inputbuffer) to the surfaceflinger module, and the surfaceflinger module stores the to-be-encoded data in the inputbuffer of the encoder, so that the encoder can perform encoding processing. When the screen mirroring needs to be suspended, the to-be-encoded data in the inputbuffer is cleared, so that the encoder does not have to-be-encoded data, and the encoder suspends encoding, and then the to-be-mirrored data cannot be sent to the smart TV, thereby implementing a function of suspending a screen mirroring service.

The technical solutions of this application will be described in detail with reference to specific embodiments below. The following embodiments may be combined with each other, and details about the same or similar concepts or processes may not be repeated in some embodiments.

Figure 15:
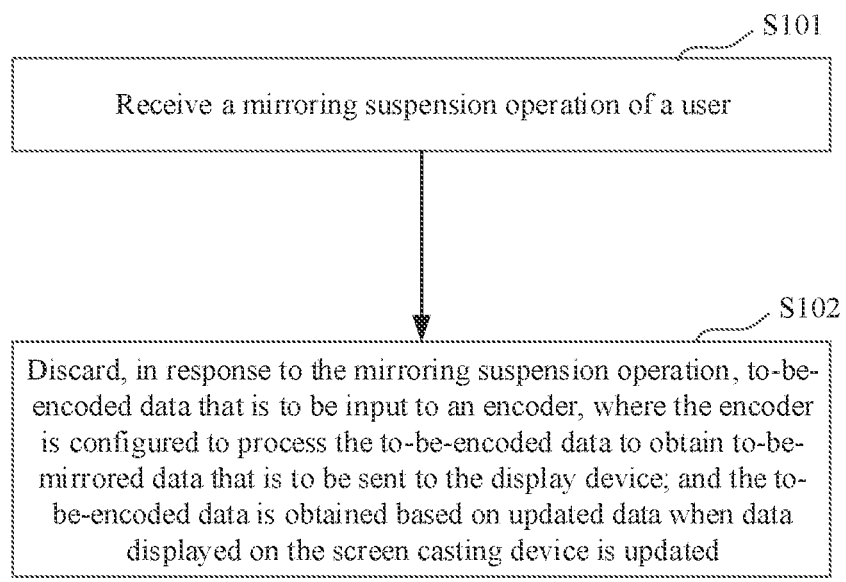
FIG. 15 is a schematic flowchart of a screen mirroring method according to an embodiment of this application.

FIG. 15 is a schematic flowchart of a screen mirroring method according to an embodiment of this application. As shown in FIG. 15, the screen mirroring method provided in this embodiment is applied to a screen casting device, a screen casting device performs a screen mirroring service with a display device, and the method may include:

S101. Receive a mirroring suspension operation of a user.

The mirroring suspension operation may be used to indicate the screen casting device to suspend the screen mirroring service between the screen casting device and the display device. The receiving a mirroring suspension operation of a user may be implemented by receiving a mirroring suspension operation performed by the user on the screen casting device. The mirroring suspension operation may be input to the screen casting device by using a voice instruction, or may be input to the screen casting device by using a touch instruction, or may be input to the screen casting device by using a shortcut operation instruction. This is not limited in this embodiment of this application. For example, the user may perform the mirroring suspension operation by simultaneously tapping a power switch and a volume increase button of the screen casting device, or by simultaneously sliding the screen left and down with two fingers.

In a possible case, optionally, the mirroring suspension operation performed by the user on a first control on a current display interface of the screen casting device is received.

The first control may be a virtual control, or may be a physical control. When the first control is a physical control, the first control may be one physical control, or may be a combination of a plurality of physical controls. This is not limited in this embodiment of this application. For example, the first control may be a power switch on the screen casting device, may be a volume adjustment button on the screen casting device, or may be a combination of a power switch and a volume adjustment button. The first control may alternatively be a virtual control "Suspend screen casting" that is displayed on the interface shown in FIG. 3(*a*). In a possible case, the first control may include a plurality of sub-controls.

S102. Discard, in response to the mirroring suspension operation, to-be-encoded data that is to be input to an encoder, where the encoder is configured to perform encoding processing on the to-be-encoded data; and the to-beencoded data is obtained based on the updated data when the data displayed on the screen casting device is updated.

When receiving the mirroring suspension operation input by the user, the to-be-encoded data that is to be input to the encoder may be discarded, so that the encoder has no to-be-encoded data, and the encoder suspends encoding, and then the encoded to-be-mirrored data cannot be sent to the display device, thereby implementing a function of not displaying a current display image on the screen casting device. As shown in FIG. 14, the encoder receives, by using the inputbuffers, the to-be-encoded data sent by the surfaceflinger module. Therefore, the data in the inputbuffers may be cleared, so as to discard the to-be-encoded data that is to be input to the encoder.

In the foregoing screen mirroring method, the mirroring suspension operation of the user is received, and the to-be-encoded data that is to be input to the encoder is discarded in response to the mirroring suspension operation, so that when the user needs to suspend the screen mirroring service between the screen casting device and the display device, the to-be-encoded data that is to be input to the encoder can be discarded by simply performing the mirroring suspension operation on the screen casting device. This avoids a case, in a conventional method, in which a connection between the display device and the screen casting device needs to be disconnected, then an operation is performed on the screen casting device, and then the connection between the display device and the screen casting device is re-established after the operation is completed. In this way, a mirroring suspension function for the screen mirroring service between the screen casting device and the display device is provided through a simple mirroring suspension operation while maintaining the connection between the screen casting device and the display device. In addition, the process of mirroring suspension is simple and easy for the user to operate, thereby improving user experience.

On the basis of the embodiment shown in FIG. 15, before the to-be-encoded data of the to-be-input encoder is discarded, the to-be-encoded data may be further backed up, so that at a moment at which the screen casting of the display device is resumed, the display device can display an image displayed by the screen casting device at the moment. The following provides a detailed description based on the embodiment shown in FIG. 16.

Figure 16:
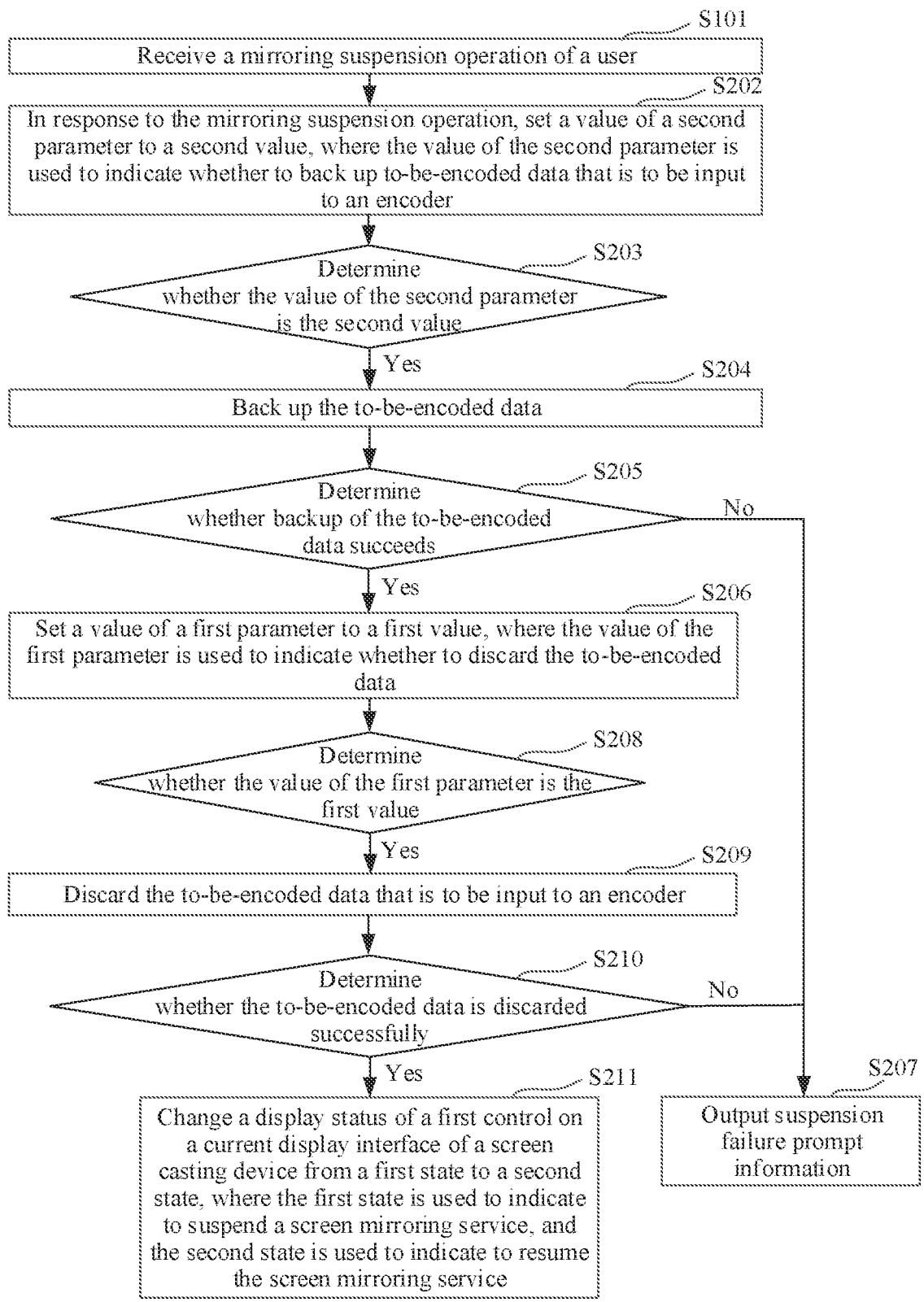
FIG. 16 is a schematic flowchart of a screen mirroring method according to another embodiment of this application.

FIG. 16 is a schematic flowchart of a screen mirroring method according to another embodiment of this application. As shown in FIG. 16, the method includes the following steps.

S101. Receive a mirroring suspension operation of a user.

S202. In response to the mirroring suspension operation, set a value of a second parameter to a second value, where the value of the second parameter is used to indicate whether to back up to-be-encoded data that is to be input to an encoder.

The second parameter may be a parameter newly added by the encoder, and is used to indicate to back up the to-be-encoded data in the inputbuffer of a Codec. For example, the second parameter may be a PARAMETER_KEY_BACKUP parameter, which may be stored in the Codec module at the application framework layer shown in FIG. 10. When the mirroring suspension operation of the user is received, in response to the mirroring suspension operation, the screen mirroring application may set the PARAMETER_KEY_BACKUP parameter to the second value that indicates to back up the to-be-encoded data. When the value of the second parameter is the second value, the to-be-encoded data is backed up. For example, the second value is 1, that is, in response to the mirroring suspension operation, the screen mirroring application sets the value of the PARAMETER_KEY_BACKUP parameter to 1, and starts to indicate to back up the to-be-encoded data.

The value of the second parameter may be two different values, for example, 0 and 1. The two different values are respectively used to indicate to back up the to-be-encoded data and indicate to not back up the to-be-encoded data. For example, when the value of the second parameter is 0, it indicates to not back up the to-be-encoded data; or when the value of the second parameter is 1, it indicates to back up the to-be-encoded data. It can be understood that a screen mirroring service may be performed between the screen casting device and the plurality of display devices. In this case, a quantity of the values of the second parameter may be greater than 2, one value indicates to not back up the to-be-encoded data, and another value indicates to back up the to-be-encoded data corresponding to each display device. For example, the values of the second parameter may be 0, 1, 2, 3, and 4. When the value of the second parameter is 0, it indicates to not back up the to-be-encoded data, and values "1", "2", "3", and "4" of the second parameter are respectively corresponding to the to-be-encoded data of the display devices. For example, the value "1" is corresponding to the to-be-encoded data of the display device 1, the value "2" is corresponding to the to-be-encoded data of the display device 2, the value "3" is corresponding to the to-be-encoded data of the display device 3, and the value "4" is corresponding to the to-be-encoded data of the display device 4. When the value of the second parameter is 1, it indicates to back up the to-be-encoded data corresponding to the display device 1. When the value of the second parameter is 2, it indicates to back up the to-be-encoded data corresponding to the display device 2. When the value of the second parameter is 3, it indicates to back up the to-be-encoded data corresponding to the display device 3. When the value of the second parameter is 4, it indicates to back up the to-be-encoded data corresponding to the display device 4. A quantity of the values of the second value is not limited in this embodiment of this application.

In response to the mirroring suspension operation, the value of the second parameter that indicates whether to back up the to-be-encoded data is set to the second value, so that it can be automatically determined, based on the value of the second parameter, whether to back up the to-be-encoded data thereby improving intelligence of backing up the to-be-encoded data.

S203. Determine whether the value of the second parameter is the second value.

When the screen casting suspension operation of the user is received, that is, the value of the second parameter is set to the second value, the value of the second parameter is queried to determine whether the value of the second parameter is the second value. When the value of the second parameter is the second value, it indicates to back up the to-be-encoded data. When the value of the second parameter is not the second value, it does not indicate to back up the to-be-encoded data.

S204. Back up the to-be-encoded data.

In a process of suspending the screen mirroring, data displayed on the screen casting device continues to be updated. When the data displayed on the screen casting device is updated, the virtual display module copies the updated data, and inputs the updated to the surfaceflinger module at the application framework layer for rendering, drawing, and composition processing, so as to obtain the to-be-encoded data. In this case, because the to-be-encoded data in the input buffer of the encoder needs to be cleared when the screen mirroring needs to be suspended, at a moment at which the screen mirroring needs to be resumed, if an image displayed on the screen casting device is still for a long time before the moment, the encoder has discarded the to-be-encoded data. In this case, the encoder has no to-be-encoded data, so that at a moment at which the screen mirroring is resumed, the to-be-encoded data at a current moment cannot be encoded, and therefore, the to-be-mirrored data al the current moment cannot be sent to the display device. That is, at a moment at which the screen mirroring is resumed, the display device cannot display the image displayed by the screen casting device at the current moment. Therefore, the to-be-encoded data may be backed up while the to-be-encoded data is discarded. At a moment at which the screen mirroring needs to be resumed, the to-be-encoded data that is backed up at the current moment may be encoded to obtain to-be-mirrored data, and then the to-be-mirrored data at the current moment may be sent to the display device for displaying. The to-be-encoded data that is backed up may be stored in a buffer of the encoder.

It should be noted that backing up the to-be-encoded data may be backing up the to-be-encoded data that is obtained each time the data displayed on the screen casting device is updated; alternatively, after the current to-be-encoded data is backed up, the to-be-encoded data backed up last time may be cleared. This is not limited in this embodiment of this application. After the current to-be-encoded data is backed up, the to-be-encoded data backed up last time is cleared, thereby reducing memory space occupied in the encoder for storing the to-be-encoded data.

By backing up the to-be-encoded data, it can be avoided that the encoder has no to-be-encoded data to encode to obtain the to-be-mirrored data at the moment of resuming the screen casting, no to-be-mirrored data at the current moment is sent to the display device for displaying, and then the display device cannot display the data at the current moment of the screen casting device when screen casting is resumed.

S205. Determine whether backup of the to-be-encoded data succeeds.

When performing backup of the to-be-encoded data, the screen casting device may return, after performing backup of the to-be-encoded data, a value of a parameter used to indicate whether the backup succeeds, and may determine, based on the returned parameter value, whether the backup of the to-be-encoded data succeeds. If it is determined that the backup succeeds, step S206 is performed. If the backup fails, step S207 is performed.

S206. Set a value of a first parameter to a first value, where the value of the first parameter is used to indicate whether to discard the to-be-encoded data.

The first parameter may be a parameter newly added to the encoder, and the value of the first parameter may be used to indicate whether to clear data in the inputbuffer to discard to-be-encoded data that is to be input to the encoder. For example, the first parameter may be a PARAMETER_KEY_DROP parameter, and may be stored in a Codec module at the application framework layer shown in FIG. 10. When the parameter value of the first parameter is set to the first value, the to-be-encoded data is to be discarded. For example, if the first value is 1, and the value of the PARAMETER_KEY_DROP parameter is set to 1, it indicates to discard the to-be-encoded data.

The value of the first parameter may be 0 or 1. The two different values are respectively used to indicate to discard the to-be-encoded data and indicate to not discard the to-be-encoded data. For example, when the value of the first parameter is 0, it indicates to not discard the to-be-encoded data; or when the value of the first parameter is 1, it indicates to discard the to-be-encoded data. It can be understood that a screen mirroring service may be performed between the screen casting device and the plurality of display devices. In this case, a quantity of the values of the first parameter may be greater than 2, one value indicates to not discard the to-be-encoded data, and another value indicates to discard the to-be-encoded data corresponding to each display device. For example, the values of the first parameter may be 0, 1, 2, 3, and 4. When the value of the first parameter is 0, it indicates to not discard the to-be-encoded data, and values "1", "2", "3", and "4" of the second parameter are respectively corresponding to the to-be-encoded data of the display devices. For example, the value "1" is corresponding to the to-be-encoded data of the display device 1, the value "2" is corresponding to the to-be-encoded data of the display device 2, the value "3" is corresponding to the to-be-encoded data of the display device 3, and the value "4" is corresponding to the to-be-encoded data of the display device 4. When the value of the first parameter is 1, it indicates to discard the to-be-encoded data corresponding to the display device 1. When the value of the first parameter is 2, it indicates to discard the to-be-encoded data corresponding to the display device 2. When the value of the first parameter is 3, it indicates to discard the to-be-encoded data corresponding to the display device 3. When the value of the first parameter is 4, it indicates to discard the to-be-encoded data corresponding to the display device 4. A quantity of the values of the first value is not limited in this embodiment of this application. After step S206 is performed, step S208 is performed.

The value of the first parameter that indicates whether to discard the to-be-encoded data is set to the first value, so that it can be automatically determined, based on the value of the first parameter, whether to discard the to-be-encoded data, thereby improving intelligence of discarding the to-be-encoded data.

S207. Output Suspension Failure Prompt Information.

The suspension failure prompt information is used to indicate that the screen mirroring fails to be suspended, and the screen casting device may display the suspension failure prompt information on the current display interface; or the suspension failure prompt information may be output in a voice playback manner; or the suspension failure prompt information may be output in a manner of vibrating the screen casting device. This is not limited in this embodiment of this application. For example, when the suspension failure prompt information is output in the manner of vibrating the screen casting device, the screen casting device may vibrate the screen casting device for three times, and an interval between vibrations is the same.

S208. Determine whether the value of the first parameter is the second value.

The value of the first parameter may be queried to determine whether the value of the first parameter is the first value. When the value of the first parameter is the first value, it indicates to discard the to-be-encoded data. When the value of the first parameter is not the first value, it indicates to not discard the to-be-encoded data.

S209, Discard the to-be-encoded data.

The to-be-encoded data is discarded, so that the encoder has no to-be-encoded data, and then the encoder suspends encoding, and suspends sending a data stream including the to-be-mirrored data to the display device, so that in a screen mirroring suspension service, a function of suspending the screen mirroring service can be implemented only by using the screen casting device, and no processing needs to be performed by the display device, thereby reducing a requirement on a processing capability of the display device. In addition, because the encoder suspends encoding, in a process of suspending the screen mirroring, to-be-mirrored data that needs to be sent to the display device is not generated, and there is no need for a large quantity of data interactions between the screen casting device and the display device, thereby reducing power consumption of the screen casting device and the display device in the process of suspending the screen mirroring.

S210. Determine whether the to-be-encoded data is discarded successfully.

If the discarding succeeds, step S211 is performed. If the discarding fails, step S207 is performed.

When the to-be-encoded data fails to be discarded, the to-be-encoded data that can be encoded by the encoder still exists. Therefore, the encoder continues to encode to obtain the to-be-mirrored data. Further, the to-be-mirrored data may be sent to the display device. The display device continues to receive the to-be-mirrored data, decodes the to-be-mirrored data, and further continues to refresh displayed content, so that the display device may continue to display a picture currently displayed by the screen casting device. That is, the screen mirroring service is still performed between the screen casting device and the display device, and the mirroring service fails to be suspended.

When the to-be-encoded data fails to be discarded or the to-be-encoded fails to be backed up, that is, the screen mirroring service fails to be suspended, and the suspension failure prompt information is output to alert the user, thereby avoiding a case in which the display device displays content that the user does not want to display, thereby further protecting privacy of the user.

S211. Change a display status of the first control on the current display interface of the screen casting device from a first state to a second state, where the first state is used to indicate to suspend the screen mirroring service, and the second state is used to indicate to resume the screen mirroring service.

Figure 3A:
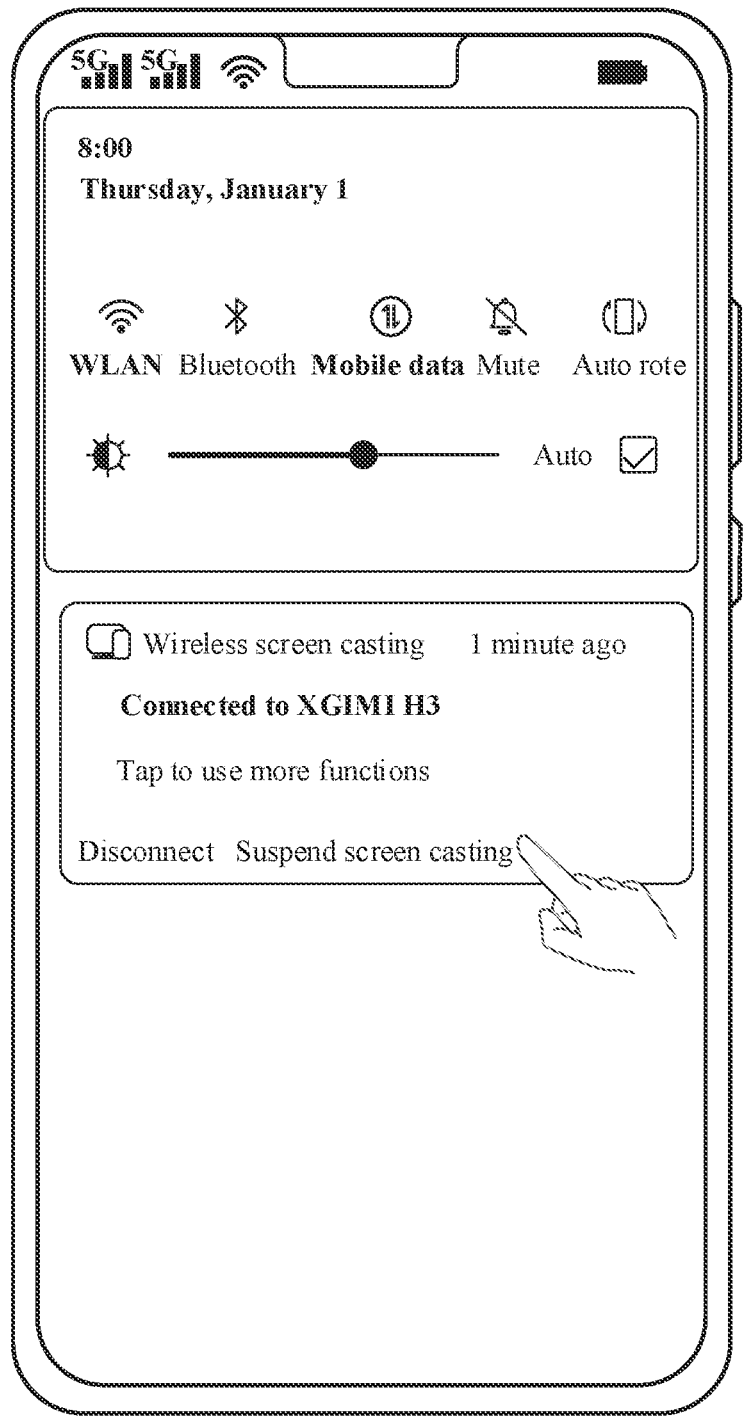
FIG. 3 is a schematic diagram of an interface and a scenario in which a screen casting device suspends screen mirroring according to an embodiment of this application.
Figure 3B:
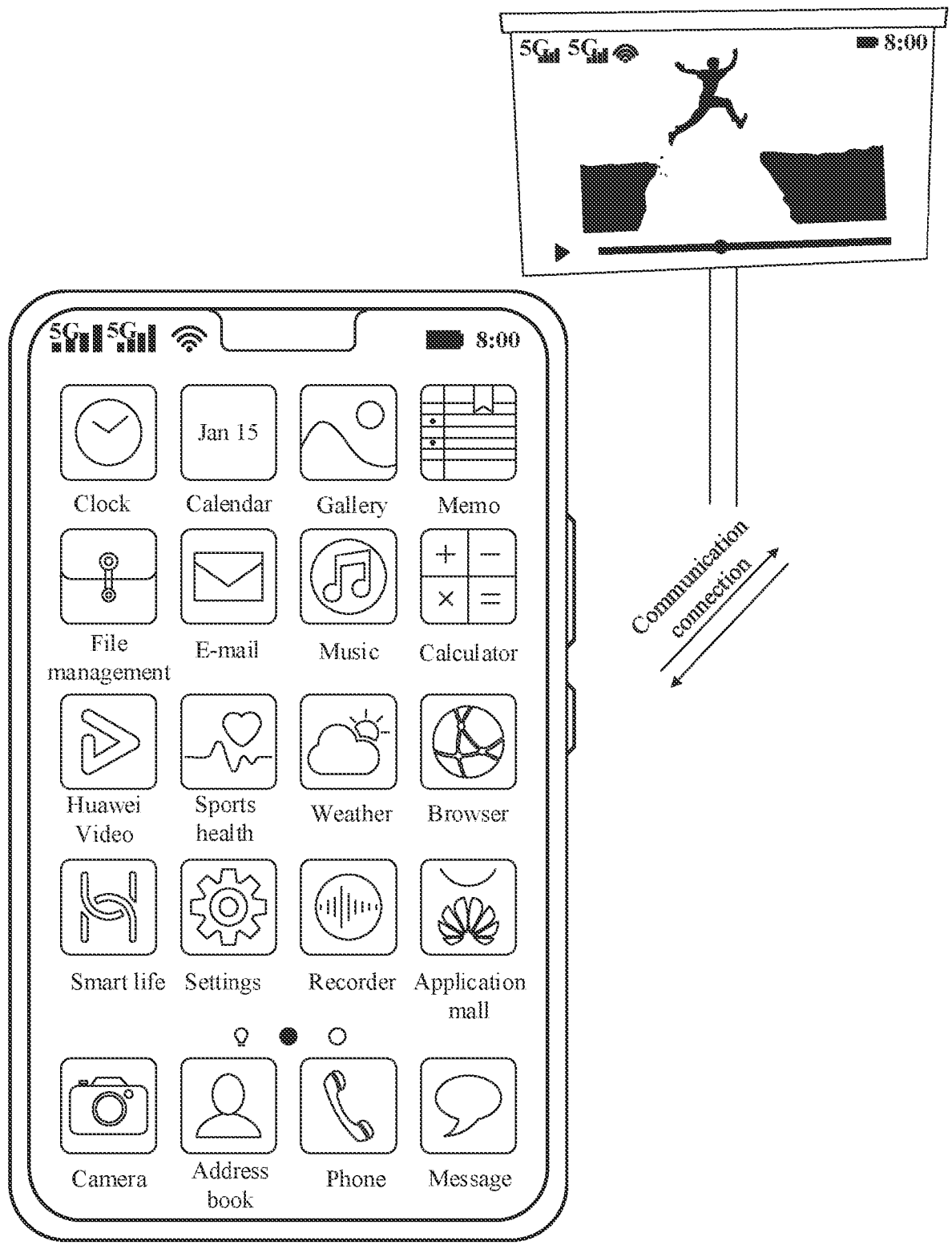
Figure 4A:
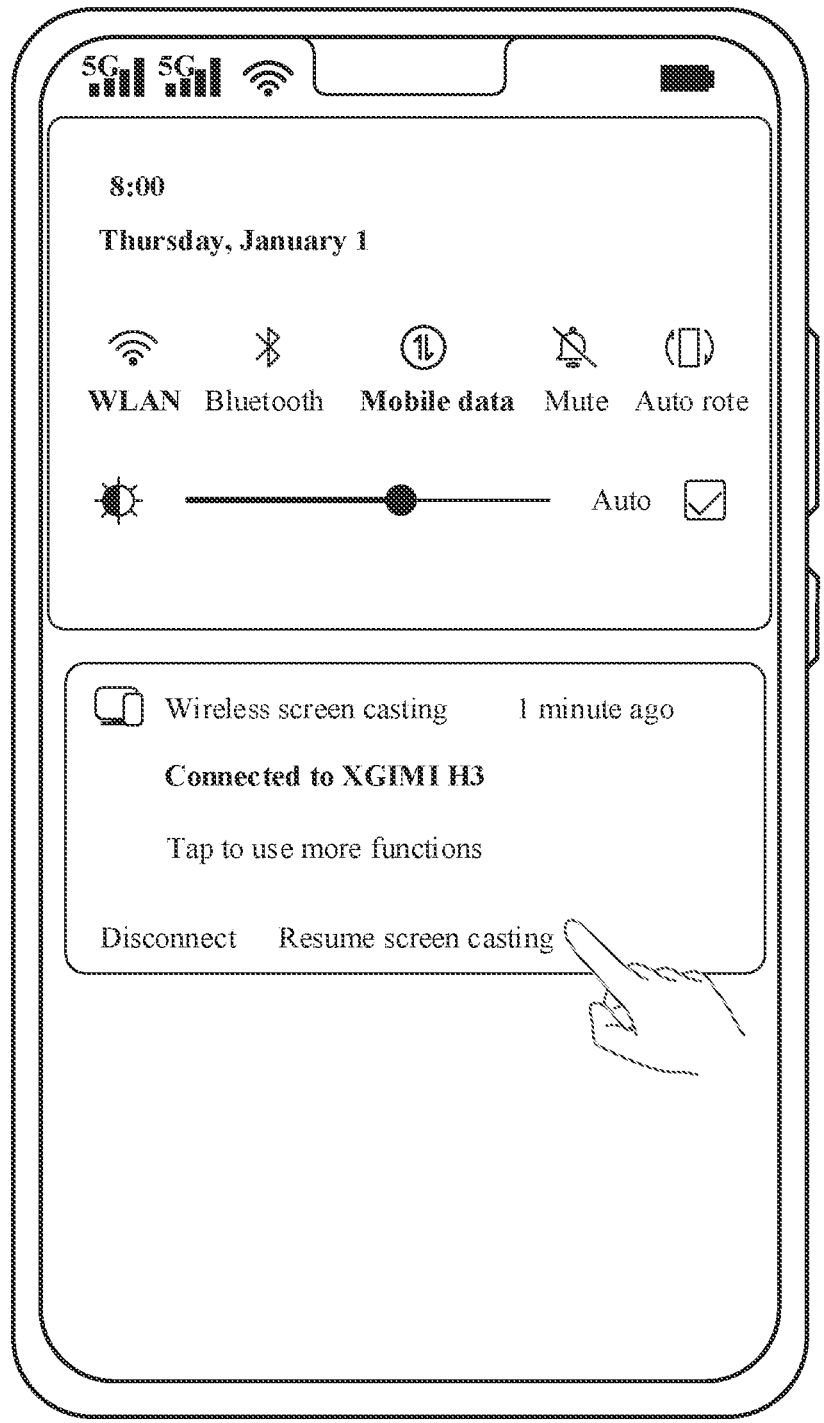
FIG. 4 is a schematic diagram of an interface and a scenario in which a screen casting device resumes screen mirroring according to an embodiment of this application.
Figure 4B:
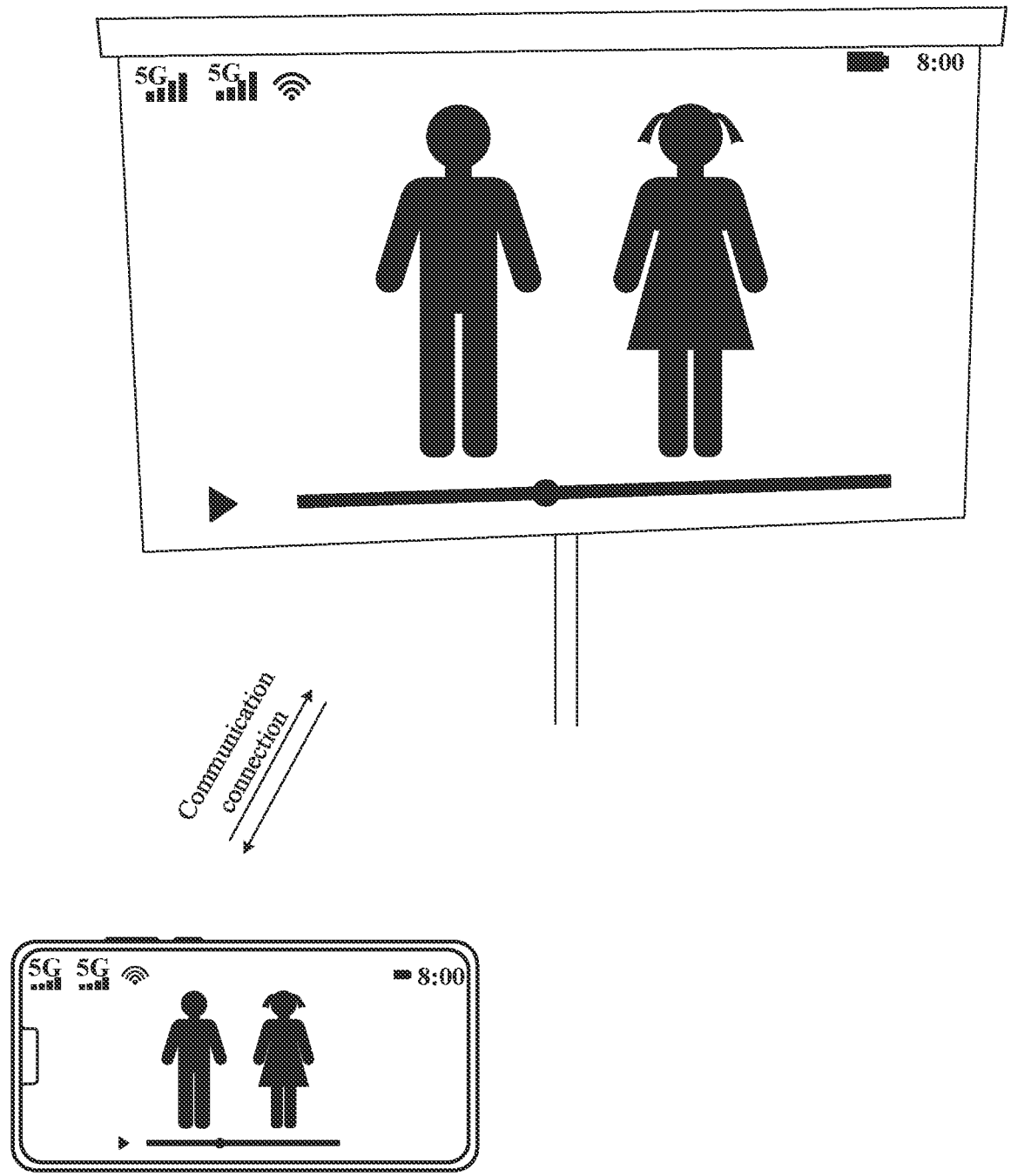
Figure 5A:
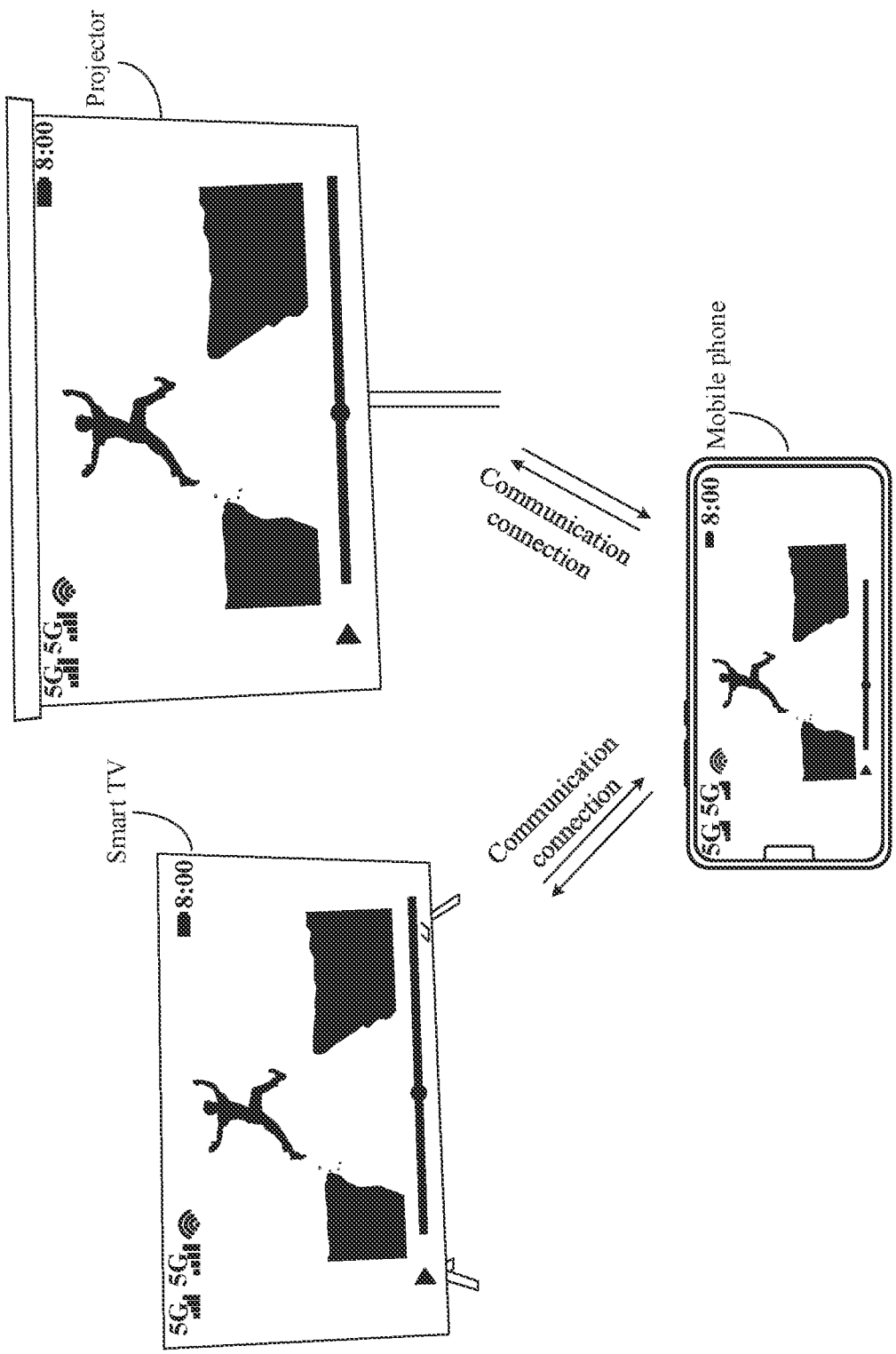
FIG. 5 is a schematic diagram of an interface and a scenario in which a screen casting device sets screen mirroring according to an embodiment of this application.
Figure 5B:
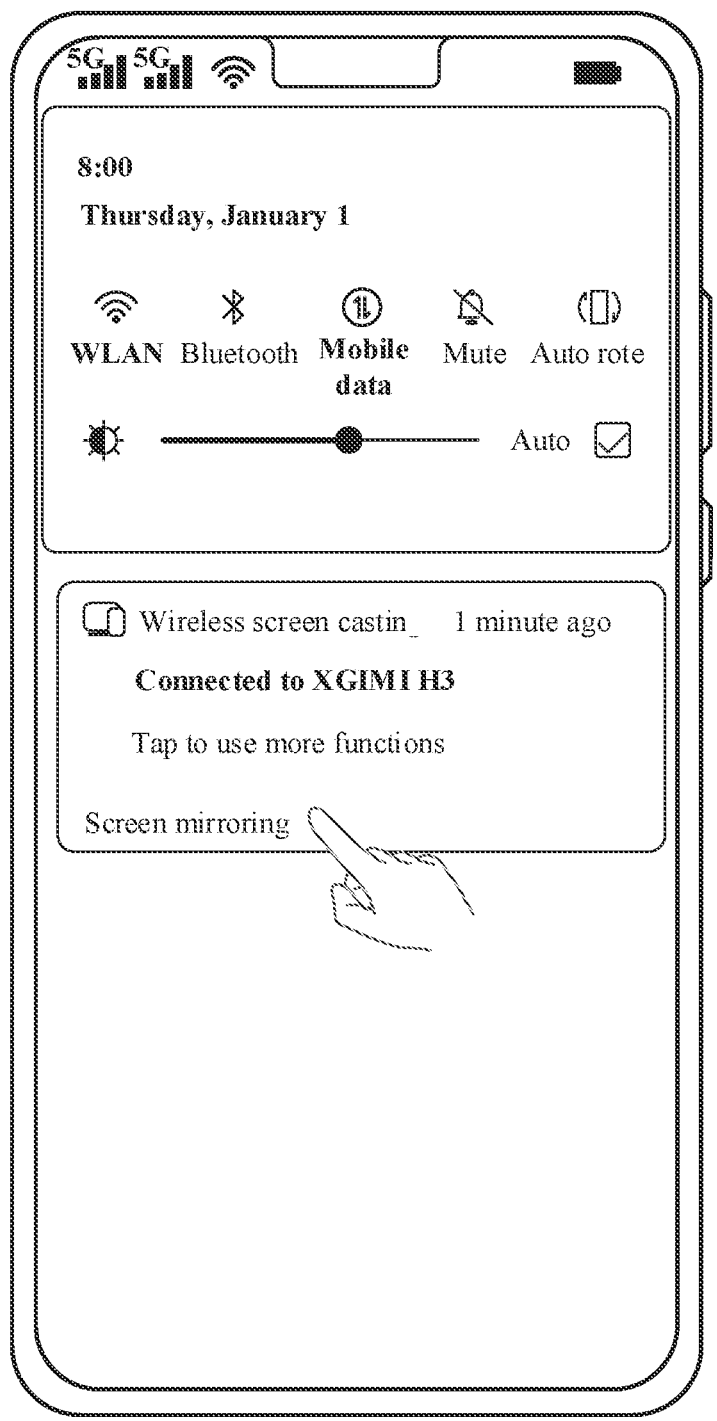
Figure 5C:
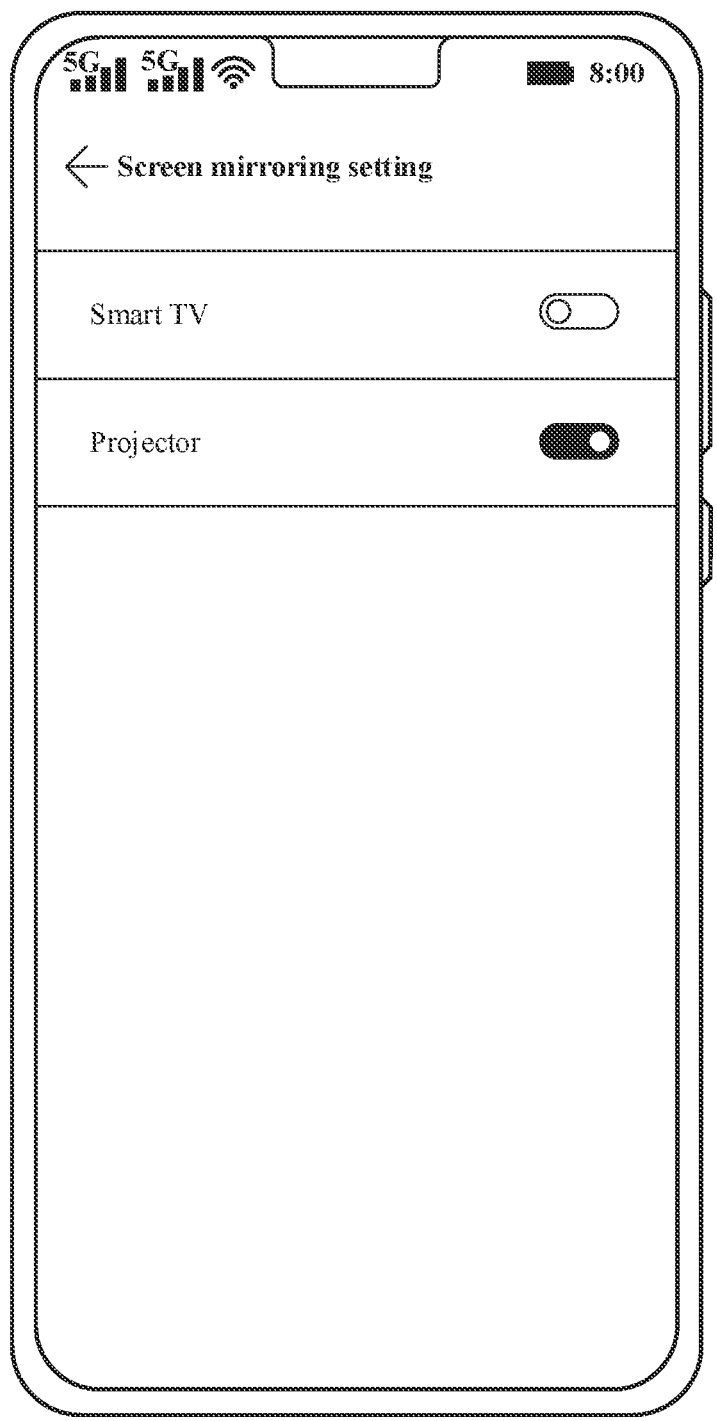
Figure 5D:
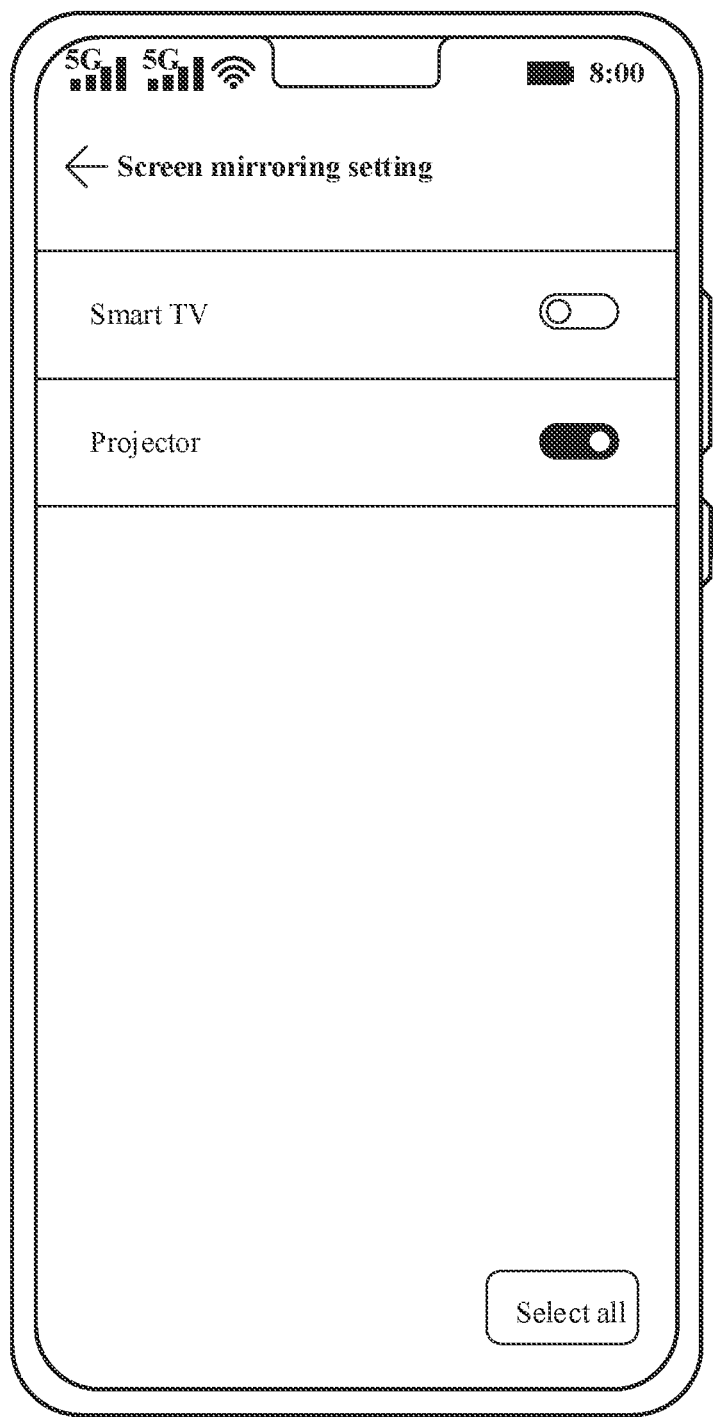

The first state is used to indicate to suspend the screen mirroring service, which may be displayed as "Suspend screen casting" on the interface shown in FIG. 3(a). The second state is used to indicate to resume the screen mirroring service, which may be displayed as "Resume screen casting" on the interface shown in FIG. 4(a). When the to-be-encoded data is discarded successfully, the encoder stops encoding, that is, the encoder cannot obtain the to-be-mirrored data, and therefore, a data stream including the to-be-mirrored data cannot be sent to the display device. The display device can only temporarily stop receiving the data stream including the to-be-mirrored data, and cannot decode the to-be-mirrored data. As a result, the display device temporarily stops refreshing the displayed content, so that the display device can only display a picture displayed at a moment at which the screen mirroring is suspended. When the screen mirroring service between the display device and the screen casting device is suspended, in this case, the display status of the first control on the current display interface of the screen casting device changes from the first state to the second state, so that the user performs a mirroring resumption operation on the first control. For example, when the to-be-encoded data is discarded successfully, the encoder stops encoding, and the display status of the first control on the current display interface of the screen casting device changes from "Suspend screen casting" to "Resume screen casting", so that the user can perform the mirroring resumption operation on the first control.

In an embodiment, when the user needs to end the mirroring suspension service, the user can perform the mirroring resumption operation, so that the encoder stops discarding the to-be-encoded data, and then the encoder can continue encoding to obtain the to-be-mirrored data to be sent to the display device. The following provides a detailed description based on the embodiment shown in FIG. 17.

Figure 17:
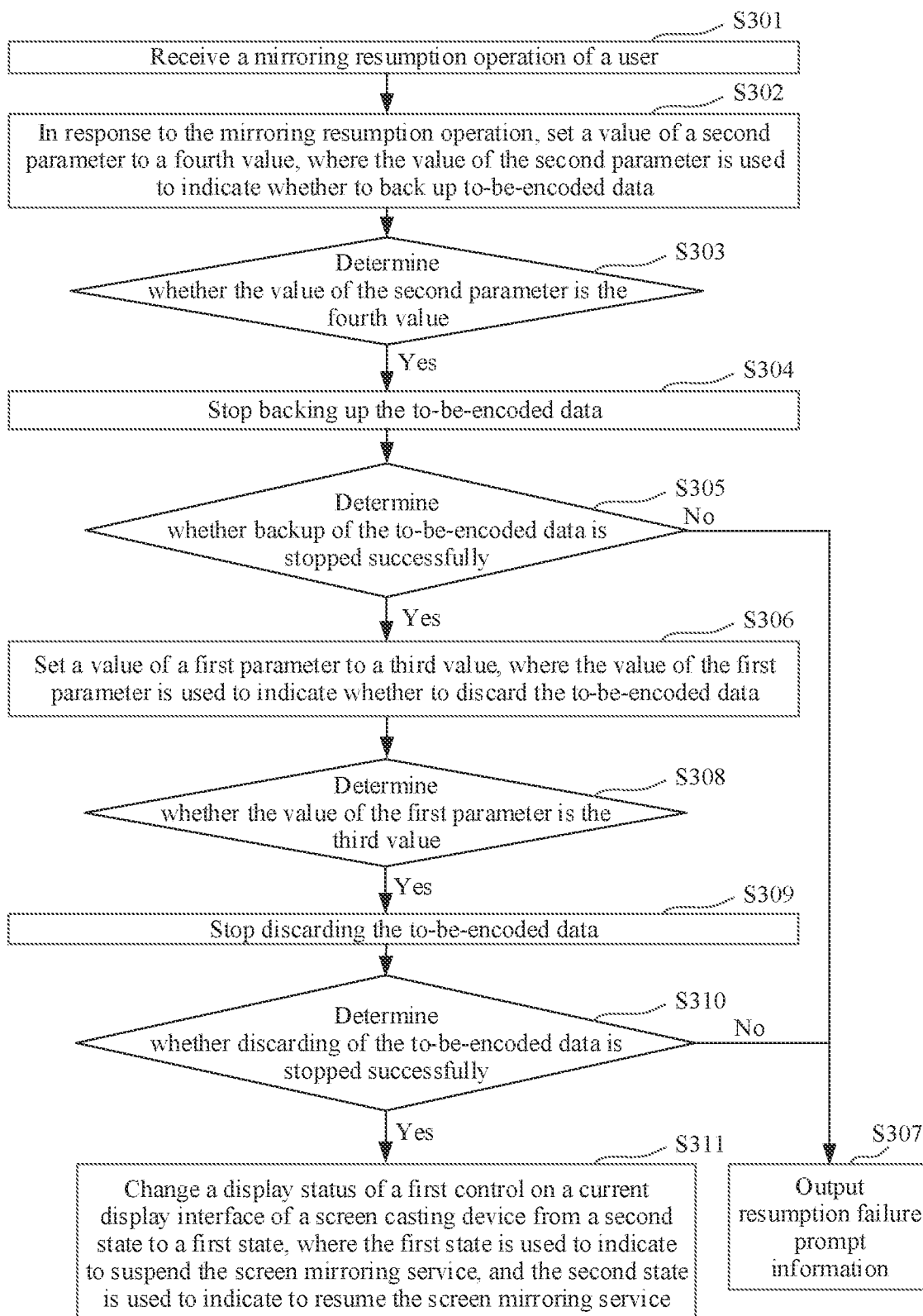
FIG. 17 is a schematic flowchart of a screen mirroring method according to another embodiment of this application.

FIG. 17 is a schematic flowchart of a screen mirroring method according to another embodiment of this application. As shown in FIG. 17, the method includes the following steps.

S301. Receive a mirroring resumption operation of a user.

The mirroring resumption operation may be used to indicate the screen casting device to resume the screen mirroring service between the screen casting device and the display device after the screen mirroring service between the screen casting device and the display device is suspended. The mirroring resumption operation may be input to the screen casting device by using a voice instruction, or may be input to the screen casting device by using a touch instruction, or may be input to the screen casting device by using a shortcut operation instruction. This is not limited in this embodiment of this application. For example, the user may perform the mirroring resumption operation by simultaneously tapping a power switch and a volume reduction button of the screen casting device, or by simultaneously sliding the screen right and upward with two fingers.

Optionally, the mirroring resumption operation performed by the user on the first control on the current display interface of the screen casting device is received.

S302. In response to the mirroring resumption operation, set a value of a second parameter to a fourth value, where the value of the second parameter is used to indicate whether to back up to-be-encoded data.

The value of the second parameter is used to indicate whether to back up the to-be-encoded data. When the value of the second parameter is the fourth value, it indicates to not back up the to-be-encoded data.

In response to the mirroring resumption operation, the value of the second parameter that indicates whether to back up the to-be-encoded data is se to the fourth value, so that it can be automatically determined, based on the value of the second parameter, whether to stop backing up the to-be-encoded data, thereby improving intelligence of stopping backing up the to-be-encoded data.

S303. Determine whether the value of the second parameter is the fourth value.

When the second parameter is the fourth value, it indicates to stop backing up the to-be-encoded data; or when the second parameter is not the fourth value, it indicates to not stop backing up the to-be-encoded data.

S304. Stop backing up the to-be-encoded data.

In a process of suspending the screen mirroring, because the to-be-encoded data has been backed up, when the user performs the mirroring resumption operation on the first control on the current display interface of the screen casting device, it indicates that the user needs to resume the screen mirroring service between the display device and the screen casting device, and at a moment of resuming the screen mirroring, the to-be-encoded data used for encoding already exists, and therefore, backup of the to-be-encoded data may be stopped.

Backup of the to-be-encoded data is stopped, so that after the mirroring resumption operation input by the user is received, the encoder does not need to continue to back up the to-be-encoded data, thereby reducing a requirement of memory space that is used by the encoder to store data during the screen mirroring.

S305. Determine whether backup of the to-be-encoded data is stopped successfully.

If the backup succeeds, step S306 is performed. If the backup fails, step S307 is performed.

S306. Set a value of the first parameter to a third value, where the value of the first parameter is used to indicate whether to discard the to-be-encoded data.

After step S306 is performed, step S308 is performed.

The value of the first parameter that indicates whether to discard the to-be-encoded data is set to the third value, so that it can be automatically determined, based on the value of the first parameter, whether to discard the to-be-encoded data, thereby improving intelligence of stopping discarding the to-be-encoded data.

S307. Output resumption failure prompt information.

The resumption failure prompt information may be used to indicate that resumption of the screen mirroring fails to be resumed, and the screen casting device may display the resumption failure prompt information on the current display interface; or the resumption failure prompt information may be output in a voice playback manner; or the resumption failure prompt information may be output in a manner of vibrating the screen casting device. This is not limited in this embodiment of this application.

S308. Determine whether the value of the first parameter is the third value.

The value of the first parameter is used to indicate whether to discard the to-be-encoded data. When the value of the first parameter is the third value, it indicates to not discard the to-be-encoded data.

S309. Stop discarding the to-be-encoded data.

Discarding of the to-be-encoded data is stopped, so that the encoder can encode the to-be-encoded data to obtain a data stream that includes the to-be-mirrored data and that is sent to the display device; and further, after the screen mirroring service is suspended, a suspended screen mirroring service between the screen casting device and the display device can be resumed by performing a simple mirroring resumption operation, and a mirroring resumption process is simple, thereby improving user experience.

S310. Determine whether discarding of the to-be-encoded data is stopped successfully.

If the discarding succeeds, step S311 is performed. If the discarding fails, step S307 is performed.

S311. Change a display status of the first control on the current display interface of the screen casting device from a second state to a first state, where the first state is used to indicate to suspend the screen mirroring service, and the second state is used to indicate to resume the screen mirroring service.

When discarding of the to-be-encoded data is stopped successfully, the encoder resumes encoding, and the screen mirroring service between the display device and the screen casting device is resumed. In this case, the display status of the first control on the current display, interface of the screen casting device may be changed from the second state to the first state, so that the user can perform the mirroring suspension operation on the first control again. For example, when discarding the to-be-encoded data succeeds, the encoder resumes encoding, and the display status of the first control on the current display interface of the screen casting device changes from "Resume screen casting" shown in FIG. 4(a) to "Suspend screen casting" shown in FIG. 3(a).

Figure 18:
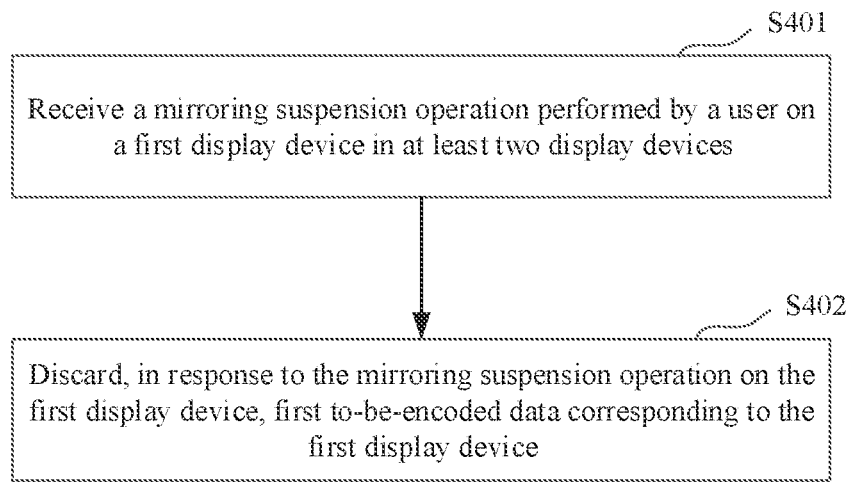
FIG. 18 is a schematic floe chart of a screen mirroring method according to another embodiment of this application.

In an embodiment, there are at least two display devices, there are at least two groups of to-be-encoded data, and the at least two groups of to-be-encoded data are in a one-to-one correspondence with the at least two display devices. When the screen mirroring service between the display device and the screen casting device needs to be suspended, a screen mirroring method shown in FIG. 18 may be used. As shown in FIG. 18, the method further includes:

S401. Receive a mirroring suspension operation performed by a user on a first display device in the at least two display devices.

For ease of description, a display device that needs to suspend the screen mirroring service in the at least two display devices is referred to as the first display device. A quantity of the first display devices is not limited in this embodiment. The first display device may be one of the at least two display devices, or may be a plurality of display devices in the at least two display devices. In a possible case, the first display device may be all display devices in the at least two display devices. This is not limited in this embodiment of this application. The mirroring suspension operation performed by the user on the first display device in the at least two display devices is received. After the user performs the mirroring suspension operation, the user may enter a mirroring suspension setting interface, and select the first display device, so as to implement the mirroring suspension operation on the first display device.

In a possible case, the receiving a mirroring suspension operation performed by the user on the first display device in the at least two display devices may include: receiving a mirroring suspension operation performed by a user on a first sub-control in a first control on a current display interface of a screen casting device, where the first control includes at least two sub-controls, and the at least two sub-controls are in a one-to-one correspondence with the at least two display devices.

That the at least two display devices are two display devices, and correspondingly, the at least two sub-controls are two sub-controls is used as an example, where the two display devices are respectively a smart TV and a projector. Correspondingly, the two sub-controls may be respectively the "Smart TV" control and the "Projector" control shown in FIG. 6(b). When the user needs to suspend the screen mirroring service between the screen casting device and the first display device (for example, the smart TV), the user may tap the "Smart TV" control shown in FIG. 6(b) to complete the mirroring suspension operation on the smart TV.

In a possible case, the first display device may be all display devices in the at least two display devices. That the at least two display devices are a smart TV and a projector is still used as an example. The mirroring suspension setting interface may further include a "Select all" control, as shown in FIG. 6(e). The user may tap the "Select all" control to complete the mirroring suspension operation on both the smart TV and the projector.

S402: Discard, in response to the mirroring suspension operation on the first display device, the first to-be-encoded data corresponding to the first display device.

Because the at least two groups of to-be-encoded data are in a one-to-one correspondence with the at least two display devices, that is, the first to-be-encoded data is the to-be-encoded data corresponding to the display device that needs to suspend the screen mirroring service. The first display device may be one of the at least two display devices, or may be a plurality of display devices in the at least two display devices. In a possible case, the first display device may be all display devices in the at least two display devices. Therefore, the first display device may be corresponding to one or more pieces of the first to-be-encoded data, or may be all to-be-encoded data in the at least two groups of to-be-encoded data. When a quantity of pieces of the first to-be-encoded data is greater than one, two pieces of the first to-be-encoded data are used as an example, and the encoder may carry the two pieces of first to-be-encoded data by using two inputbuffers. When the first to-be-encoded data is discarded in response to the mirroring suspension operation on the first display device, the data in the inputbuffer corresponding to the first to-be-encoded data is cleared to discard the first to-be-encoded data. In a specific process of clearing the first to-be-encoded data, the first value of the first parameter may include a plurality of values, and each value is in a one-to-one correspondence with each piece of first to-be-encoded data. For example, the first value includes 1 and 2, where the first value "1" is corresponding to first to-be-encoded data 1, and the first value "2" is corresponding to first to-be-encoded data 2. In response to the mirroring suspension operation on the first display device, the value of the first parameter is set to 1 and 2, the data in the inputbuffer that carries the first to-be-encoded data 1 is cleared, so that the first to-be-encoded data 1 is discarded, and the data in the inputbuffer that carries the first to-be-encoded data 2 is cleared, so that the first to-be-encoded data 2 is discarded.

The mirroring suspension operation performed by the user on the first display device in the at least two display devices is received, and the first to-be-encoded data corresponding to the first display device is discarded in response to the mirroring suspension operation on the first display device, so that a screen mirroring service between the screen casting device and the first display device can be suspended. That is, this embodiment of this application may further provide a function of suspending mirroring between the screen casting device and some display devices.

It can be understood that, for each first display device, the screen casting device may perform the method steps in the embodiment shown in FIG. 16. Implementation principles and beneficial effects of the method steps are similar to those of the embodiment shown in FIG. 16, and details are not described herein again.

Figure 19:
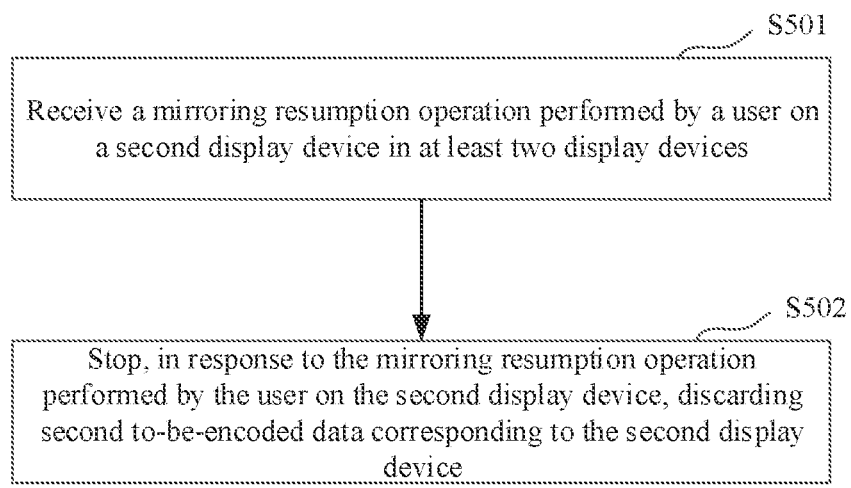
FIG. 19 is a schematic floe chart of a screen mirroring method according to another embodiment of this application.

Correspondingly, when the screen mirroring between the display device and the screen casting device needs to be resumed after being suspended, a screen mirroring method provided in FIG. 19 may be used. As shown in FIG. 19, the screen mirroring method includes the following steps.

S501. Receive a mirroring resumption operation performed by a user on a second display device in the at least two display devices.

For ease of description, a display device that needs to resume the screen mirroring service in the at least two display devices is referred to as the second display device. A quantity of the second display devices is not limited in this embodiment. The second display device may be one of the at least two display devices, or may be a plurality of display devices in the at least two display devices. In a possible case, the second display device may be all display devices in the at least two display devices. This is not limited in this embodiment of this application. The mirroring resumption operation performed by the user on the second display device in the at least two display devices is received. After the user performs the mirroring resumption operation, the user may enter a mirroring resumption setting interface, and select the second display device, so as to implement the mirroring suspension operation on the second display device.

In a possible case, the receiving a mirroring resumption operation performed by the user on the second display device in the at least two display devices may include: receiving the mirroring suspension operation performed by the user on a second sub-control in the first control on the current display interface of the screen casting device, where the first control includes at least two sub-controls, and the at least two sub-controls are in a one-to-one correspondence with the at least two display devices.

That the at least two display devices are two display devices, and correspondingly, the at least two sub-controls are two sub-controls is used as an example. An interface shown in FIG. 8(*b*) may be displayed on the screen casting device, and the two display devices are respectively a smart TV and a projector. Correspondingly, the two sub-controls are respectively the "Smart TV" control and the "Projector" control shown in FIG. 8(*b*). When the user needs to resume the screen mirroring service between the screen casting device and the second display device (that is, the mobile phone and the smart TV), the user may complete the mirroring resumption operation on the smart TV by tapping the "Smart TV" control shown in FIG. 8(*b*).

In a possible case, the second display device may be all display devices in the at least two display devices. That the at least two display devices are a smart TV and a projector is still used as an example. The mirroring resumption setting interface may further include a "Select all" control, as shown in FIG. 8(*e*). The user may tap the "Select all" control to complete the mirroring suspension operation on both the smart TV and the projector.

S502. In response to the mirroring resumption operation performed by the user on the second display device, stop discarding the second to-be-encoded data corresponding to the second display device.

Because the at least two groups of to-be-encoded data are in a one-to-one correspondence with the at least two display devices, that is, the second to-be-encoded data is the to-be-encoded data corresponding to the display device that needs to resume the screen mirroring service. The second display device may be one of the at least two display devices, or may be a plurality of display devices in the at least two display devices. In a possible case, the second display device may be all display devices in the at least two display devices. Correspondingly, the second display device may be corresponding to one or more pieces of the second to-be-encoded data, or may be all to-be-encoded data in the at least two groups of to-be-encoded data. When a quantity of pieces of the second to-be-encoded data is greater than one, two pieces of the second to-be-encoded data are used as an example, and the encoder may carry the two pieces of second to-be-encoded data by using two inputbuffers. When discarding of the second to-be-encoded data is stopped in response to the mirroring resumption operation on the second display device, clearing of the data in the inputbuffer corresponding to the second to-be-encoded data is stopped to stop discarding the second to-be-encoded data. In a specific process of stopping clearing the second to-be-encoded data, the second value of the second parameter may include a plurality of values, and each value is in a one-to-one correspondence with each piece of second to-be-encoded data. For example, the second value includes 1 and 2, where the second value "1" is corresponding to the second to-be-encoded data 1, and the second value "2" is corresponding to the second to-be-encoded data 2. In response to the mirroring resumption operation on the second display device, if the value of the second parameter is set to 1 and 2, clearing of the data in the inputbuffer that carries the second to-be-encoded data 1 is stopped, so that discarding of the second to-be-encoded data 1 is stopped, and clearing of the data in the inputbuffer that carries the second to-be-encoded data 2 is stopped, so that discarding of the second to-be-encoded data 2 is stopped.

The mirroring resumption operation performed by the user on the second display device in the at least two display devices is received, and discarding of the second to-be-encoded data corresponding to the second display device is stopped in response to the mirroring resumption operation performed by the user on the second display device, so that a screen mirroring function between the screen casting device and the second display device can be resumed. That is, this embodiment of this application may further provide a function of resuming mirroring between the screen casting device and some display devices.

It can be understood that, for each second display device, the screen casting device may perform the method steps in the embodiment shown in FIG. 17. Implementation principles and beneficial effects of the method steps are similar to those of the embodiment shown in FIG. 17, and details are not described herein again.

It should be understood that, although steps in the flowchart in the foregoing embodiment are sequentially displayed according to indications of the arrows, these steps are not necessarily sequentially performed in the order indicated by the arrows. Unless expressly stated in this specification, these steps are not performed in a strict order, and these steps may be performed in another order. In addition, at least some of the steps in the flowchart may include a plurality of sub-steps or a plurality of phases. These sub-steps or phases are not necessarily performed at a same moment, but may be performed at different moments. These sub-steps or phases are not necessarily performed sequentially, but may be performed alternately with another step, a sub-step of another step, or at least a part of a phase.

It can be understood that, to implement the foregoing functions, the screen casting device includes corresponding hardware and/or software modules for performing the functions. With reference to the algorithm steps described in the embodiments disclosed in this specification, this application can be implemented in a form of hardware or hardware and computer software. Whether a function is performed by hardware or hardware driven by computer software depends on particular applications and design constraints of the technical solutions. A person skilled in the art may use different methods to implement the described functions for each particular application with reference to the embodiments, but it should not be considered that the implementation goes beyond the scope of this application.

In the embodiments of this application, the foregoing screen casting device may be divided into functional modules based on the foregoing method examples. For example, each functional module may be obtained through division for a corresponding function, or two or more functions may be integrated into one processing module. It should be noted that the module division in this embodiment of this application is an example and is merely logical function division, and there may be another division manner during actual implementation. It should be noted that a name of a module in this embodiment of this application is an example, and the name of the module is not limited in actual implementation.

Figure 20:
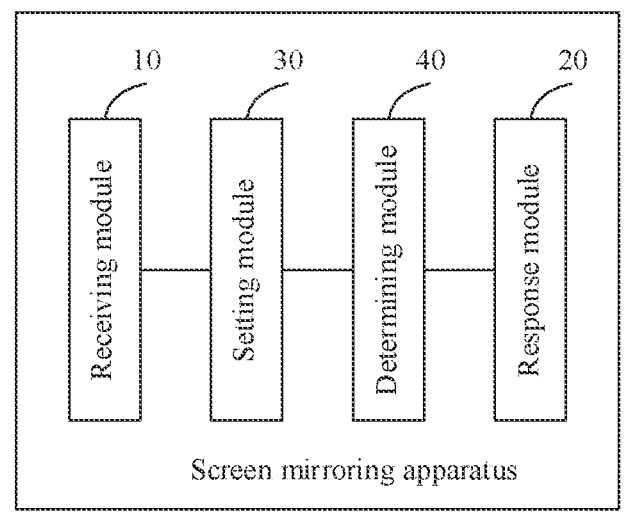
FIG. 20 is a schematic diagram of a structure of a screen mirroring apparatus according to an embodiment of this application.

FIG. 20 is a schematic diagram of a structure of a screen mirroring apparatus according to an embodiment of this application. The screen mirroring apparatus may be applied to a screen casting device, and the screen casting device performs a screen mirroring service with a display device. As shown in FIG. 20, the screen mirroring apparatus includes:

a receiving module 10, configured to receive a mirroring suspension operation of a user; and a response module 20, configured to discard, in response to the mirroring suspension operation, to-be-encoded data that is to be input to an encoder, where the encoder is configured to process the to-be-encoded data to obtain to-be-mirrored data that is to be sent to the display device; and the to-be-encoded data is obtained based on updated data when data displayed on the screen casting device is updated.

In an embodiment, the screen mirroring apparatus further includes a setting module 30 and a determining module 40, where the setting module 30 is configured to set a value of a first parameter to a first value, and the value of the first parameter is used to indicate whether to discard to-be-encoded data; and the determining module 40 is configured to determine that the value of the first parameter is the first value.

In an embodiment, the receiving module 10 is specifically configured to receive the mirroring suspension operation performed by the user on a first control on a current display interface of the screen casting device.

In an embodiment, the determining module 40 is further configured to: determine whether the to-be-encoded data is discarded successfully; if it is determined that the discarding succeeds, change a display status of the first control on the current display interface of the screen casting device from a first state to a second state, where the first state is used to indicate to suspend the screen mirroring service, and the second state is used to indicate to resume the screen mirroring service; and if it is determined that the discarding fails, output suspension failure prompt information.

In an embodiment, the response module 20 is further configured to back up the to-be-encoded data.

In an embodiment, the setting module 30 is further configured to set a value of a second parameter to a second value, where the value of the second parameter is used to indicate whether to back up the to-be-encoded data; and the determining module 40 is further configured to determine that the value of the second parameter is the second value.

In an embodiment, the response module 20 is specifically configured to: determine whether backup of the to-be-encoded data succeeds; and if it is determined that the backup succeeds, discard the to-be-encoded data.

In an embodiment, the response module 20 is further configured to: if it is determined that the backup fails, output suspension failure prompt information.

In an embodiment, the receiving module 10 is further configured to receive a mirroring resumption operation of the user; and the response module 20 is further configured to stop, in response to the mirroring resumption operation, discarding the to-be-encoded data.

In an embodiment, the setting module 30 is further configured to set a value of the first parameter to a third value, where the value of the first parameter is used to indicate whether to discard the to-be-encoded data; and the determining module 40 is further configured to determine that the value of the first parameter is the third value.

In an embodiment, the receiving module 10 is specifically configured to receive the mirroring resumption operation performed by the user on a first control on a current display interface of the screen casting device.

In an embodiment, the determining module 40 is further configured to: determine whether discarding of the to-beencoded data is stopped successfully; and if the discarding is stopped successfully, change a display status of the first control on the current display interface of the screen casting device from a second state to a first state, where the first state is used to indicate to suspend the screen mirroring service, and the second state is used to indicate to resume the screen mirroring service; and if the discarding fails to be stopped, output resumption failure prompt information.

In an embodiment, the response module 20 is further configured to stop backing up the to-be-encoded data.

In an embodiment, the setting module 30 is further configured to set a value of a second parameter to a fourth value, where the value of the second parameter is used to indicate whether to back up the to-be-encoded data that is to be input to an encoder; and the determining module 40 is further configured to determine that the value of the second parameter is the fourth value.

In an embodiment, the response module 20 is specifically configured to: determine whether backup of the to-be-encoded data is stopped successfully; and if the backup is stopped successfully, stop discarding the to-be-encoded data.

In an embodiment, the response module 20 is further configured to: if the backup fails to be stopped, output resumption failure prompt information.

In an embodiment, there are at least two display devices, there are at least two groups of to-be-encoded data, and the at least two groups of to-be-encoded data are in a one-to-one correspondence with the at least two display devices; the receiving module 10 is specifically configured to receive a mirroring suspension operation performed by the user on the first display device in the at least two display devices; and the response module 20 is specifically configured to discard, in response to the mirroring suspension operation on the first display device, the first to-be-encoded data corresponding to the first display device.

In an embodiment, the receiving module 10 is specifically configured to receive the mirroring suspension operation performed by the user on a first sub-control in the first control on the current display interface of the screen casting device, where the first control includes at least two sub-controls, and the at least two sub-controls are in a one-to-one correspondence with the at least two display devices.

In an embodiment, there are at least two display devices, there are at least two groups of to-be-encoded data, and the at least two groups of to-be-encoded data are in a one-to-one correspondence with the at least two display devices; the receiving module 10 is specifically configured to receive a mirroring resumption operation performed by the user on the second display device in the at least two display devices; and the response module 20 is specifically configured to stop, in response to the mirroring suspension operation performed by the user on the second display device, discarding the second to-be-encoded data corresponding to the second display device.

In an embodiment, the receiving the mirroring resumption operation performed by the user on the second display device in the at least two display devices includes: receiving the mirroring suspension operation performed by the user on a second sub-control in the first control on the current display interface of the screen casting device, where the first control includes at least two sub-controls, and the at least two sub-controls are in a one-to-one correspondence with the at least two display devices.

The screen mirroring apparatus provided in this embodiment is configured to perform an operation performed by the screen casting device in the foregoing method embodiments. Technical principles and technical effects of the screen mirroring apparatus are similar to those of the foregoing method embodiments, and details are not described herein again.

An embodiment of this application further provides an electronic device, where the electronic device may be a screen casting device. It should be noted that the electronic device in this embodiment of this application may be of any type. For example, the electronic device may be but is not limited to a mobile phone, a tablet computer, a smart sound box, a smart large screen (also referred to as a smart TV), a wearable device, or the like.

Figure 21:
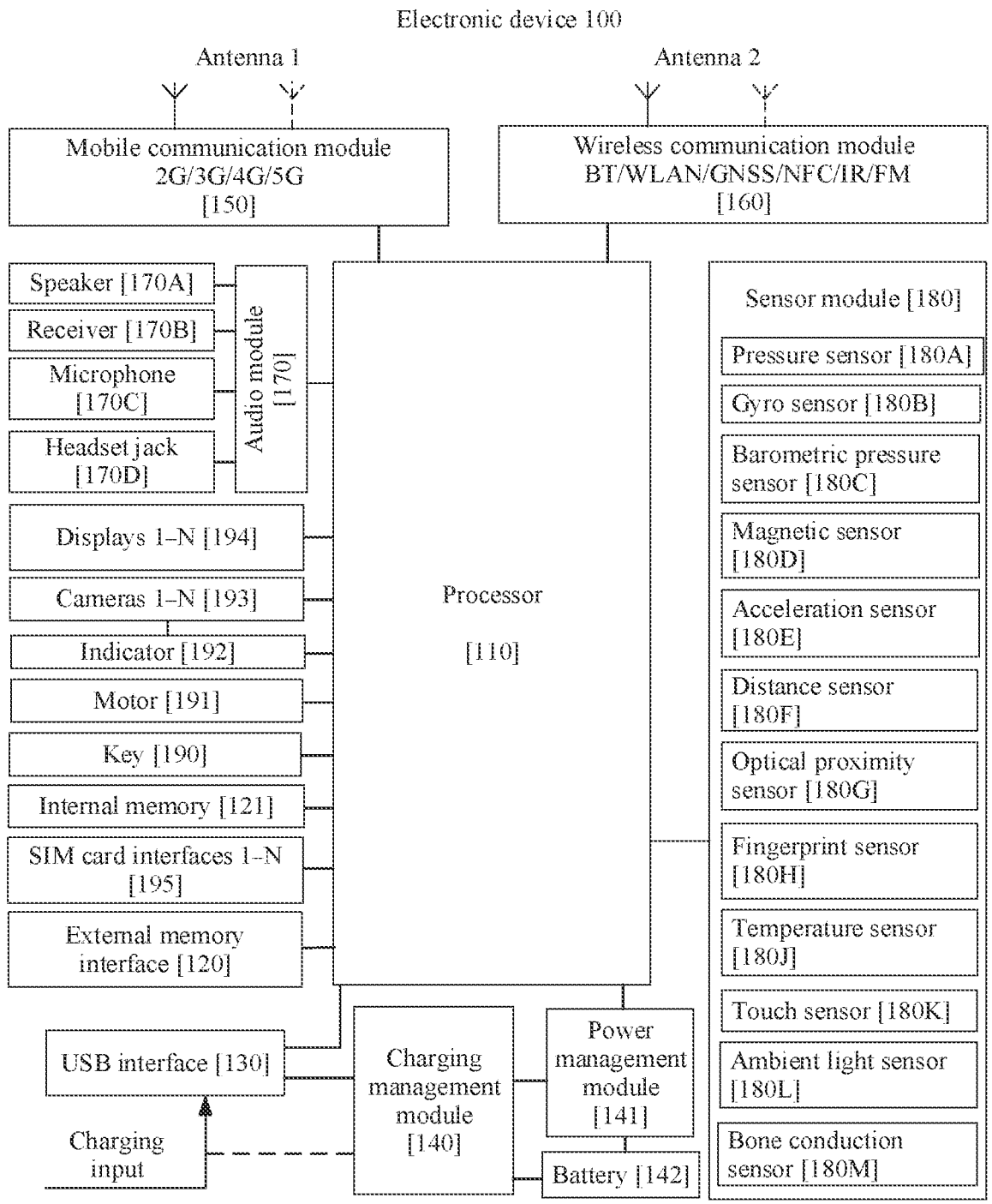
FIG. 21 is a schematic diagram of a structure of an electronic device according to an embodiment of this application.

As an example rather than a limitation, a specific structure of the electronic device may be shown in FIG. 21. FIG. 21 is a schematic diagram of a hardware structure of an electronic device according to an embodiment of this application.

As shown in FIG. 21, the electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a key 190, a motor 191, an indicator 192, a camera 193, a display 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It can be understood that a structure shown in this embodiment of this application does not constitute a specific limitation on the electronic device 100. In some other embodiments of this application, the electronic device 100 may include more or fewer components than those shown in the figure, combine some components, split some components, or have different component arrangements. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent devices, or may be integrated into one or more processors.

The controller may be a nerve center and a command center of the electronic device 100. The controller may generate an operation control signal based on an instruction operation code and a time sequence signal, so as to control instruction retrieval and instruction execution.

A memory may be further disposed in the processor 110 to store an instruction and data. In some embodiments, the memory in the processor 110 is a cache memory. The memory can store an instruction or data that the processor 110 has just used or used cyclically. If the processor 110 needs to use the instruction or data again, the instruction or data can be directly invoked from the memory. Repeated access is avoided, and a waiting time of the processor 110 is reduced, thereby improving system efficiency.

In some embodiments, the processor 110 may include one or more interfaces. The interface may be an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI) interface, a general-purpose input/output (general-purpose input/output, GPIO) interface, a subscriber identity module (subscriber identity module, SIM) interface, a universal serial bus (universal serial bus, USB) interface, and/or the like.

The I2C interface is a bidirectional synchronous serial bus, and includes a serial data line (serial data line, SDA) and a serial clock line (serial clock line, SCL). In some embodiments, the processor 110 may include a plurality of groups of I2C buses. The processor 110 may be coupled to the touch sensor 180K, a charger, a flash, the camera 193 and the like by using different I2C bus interfaces. For example, the processor 110 may be coupled to the touch sensor 180K by using an I2C interface, so that the processor 110 communicates with the touch sensor 180K by using the I2C bus interface, thereby implementing a touch function of the electronic device 100.

The I2S interface can be used for audio communication. In some embodiments, the processor 110 may include a plurality of groups of I2S buses. The processor 110 may be coupled to the audio module 170 by using the I2S bus to implement communication between the processor 110 and the audio module 170. In some embodiments, the audio module 170 can transmit an audio signal to the wireless communication module 160 by using the I2S interface, so as to implement a function of answering calls by using a Bluetooth headset.

The PCM interface can also be used for audio communication to sample, quantize and encode analog signals. In some embodiments, the audio module 170 may be coupled to the wireless communication module 160 by using a PCM bus interface. In some embodiments, the audio module 170 can also transmit an audio signal to the wireless communication module 160 by using the PCM interface, so as to implement a function of answering calls by using a Bluetooth headset. Both the I2S interface and the PCM interface can be used fix audio communication.

The UART interface is a universal serial data bus used for asynchronous communication. The bus may be a bidirectional communication bus. The bus converts to-be-transmitted data between serial communication and parallel communication. In some embodiments, the UART interface is usually configured to connect the processor 110 to the wireless communication module 160. For example, the processor 110 communicates with a Bluetooth module in the wireless communication module 160 by using the UART interface to implement a Bluetooth function. In some embodiments, the audio module 170 can transmit an audio signal to the wireless communication module 160 by using the UART interface, so as to implement a function of playing music by using a Bluetooth headset.

The MIPI interface may be configured to connect the processor 110 to the display 194, the camera 193 and other peripheral devices. The MIPI interface includes a camera serial interface (camera serial interface, CSI), a display serial interface (display serial interface, DSI), and the like.

In some embodiments, the processor 110 and the camera 193 communicate by using the CSI to implement a photographing function of the electronic device 100, The processor 110 and the display 194 communicate by using the DSI to implement a display function of the electronic device 100.

The GPIO interface may be configured by using software. The GPIO interface may be configured as a control signal interface, or may be configured as a data signal interface. In some embodiments, the GPIO interface may be configured to connect the processor 110 to the camera 193, the display 194, the wireless communication module 160, the audio module 170, the sensor module 180, and the like. The GPIO interface may be alternatively configured as an I2C interface, an I2S interface, a UART interface, an MIPI interface, or the like.

The USB interface 130 is an interface that complies with USB standard specifications, and may be specifically a Mini USB interface, a Micro USB interface, a USB Type C interface, or the like. The USB interface 130 may be configured to connect to the charger to charge the electronic device 100, or may be configured to transmit data between the electronic device 100 and peripheral devices. The USB interface 130 may be further configured to connect a headset and play audio by using the headset. The interface may be further configured to connect to another electronic device, such as an AR device.

It can be understood that the interface connection relationship between the modules illustrated in the embodiments of this application is merely an example for description, and does not constitute a limitation on the structure of the electronic device 100. In some other embodiments of this application, the electronic device 100 may alternatively use an interface connection mode that is different from those in the foregoing embodiments, or use a combination of a plurality of interface connection modes.

The charging management module 140 is configured to receive an charging input from a charger. The charger may be a wireless charger, or may be a wired charger. In some wired charging embodiments, the charging management module 140 may receive an charging input of the wired charger by using the USB interface 130. In some embodiments of wireless charging, the charging management module 140 can receive a wireless charging input by using a wireless charging coil of the electronic device 100. In addition to charging the battery 142, the charging management module 140 may further supply power to the electronic device 100 by using the power management module 141.

The power management module 141 is configured to connect the battery 142, the charging management module 140, and the processor 110. The power management module 141 receives an input of the battery 142 and/or an input of the charging management module 140, and supplies power to the processor 110, the internal memory 121, the display 194, the mobile communication module 193, the wireless communication module 160, and the like. The power management module 141 may be further configured to monitor parameters such as a battery capacity, a quantity of battery cycles, and a battery health status (leakage or impedance). In some other embodiments, the power management module 141 may alternatively be disposed in the processor 110. In some other embodiments, the power management module 141 and the charging management module 140 may alternatively be disposed in the same device.

The wireless communication function of the electronic device 100 may be implemented by using the antenna 1, the antenna 2, the mobile communication module 150, the wireless communication module 160, the modem processor, the baseband processor, and the like.

The antenna 1 and the antenna 2 are configured to transmit and receive electromagnetic wave signals. Each antenna in the electronic device 100 may be configured to cover one or more communication frequency bands. Different antennas may further be multiplexed to improve antenna utilization. For example, the antenna 1 may be multiplexed into a diversity antenna of a wireless local area network. In some other embodiments, the antenna may be used in combination with a tuning switch.

The mobile communication module 150 can provide a wireless communication solution that is applied to the electronic device 100, including 2G/3G/4G/5G and the like. The mobile communication module 150 may include at least one filter, a switch, a power amplifier, a low noise amplifier (low noise amplifier, LNA), and the like. The mobile communication module 150 can receive an electromagnetic wave by using the antenna 1, perform processing such as filtering and amplification on the received electromagnetic wave, and transmit the processed electromagnetic wave to the modem processor for demodulation. The mobile communication module 150 can further amplify a signal that is modulated by the modem processor, and the signal is converted into an electromagnetic wave and radiated by the antenna 1. In some embodiments, at least some functional modules of the mobile communication module 150 may be disposed in the processor 110, in some embodiments, at least some functional modules of the mobile communication module 150 and at least some modules of the processor 110 may be disposed in the same device.

The modem processor may include a modulator and a demodulator. The modulator is configured to modulate a to-be-sent low-frequency baseband signal into a medium-high-frequency signal. The demodulator is configured to demodulate a received electromagnetic wave signal into a low-frequency baseband signal. The demodulator then transmits the demodulated low-frequency baseband signal to a baseband processor fir processing. After being processed by the baseband processor, the low-frequency baseband signal is transmitted to the application processor. The application processor outputs a sound signal by using an audio device (not limited to the speaker 170A, the receiver 170B, and the like), or displays an image or video by using the display 194. In some embodiments, the modem processor may be an independent device. In some other embodiments, the modem processor may be independent of the processor 110 and be disposed in the same device as the mobile communication module 150 or another functional module.

The wireless communication module 160 may provide a wireless communication solution that is applied to the electronic device 100, including wireless local area network (wireless local area network, WLAN) (such as a wireless fidelity (wireless fidelity, Wi-Fi) network), Bluetooth (Bluetooth, BT), global navigation satellite system (global navigation satellite system, GNSS), frequency modulation (frequency modulation, FM), near field communication (near field communication, NIT), infrared (infrared, IR), and the like. The wireless communication module 160 may be one or more devices integrating at least one communication processing module. The wireless communication module 160 receives an electromagnetic wave by using the antenna 2, performs processing such as frequency modulation and filtering on the electromagnetic wave signal, and sends the processed signal to the processor 110. The wireless communication module 160 can further receive a to-be-sent signal from the processor 110, and perform frequency modulation and amplification on the signal, and the signal is converted into an electromagnetic wave and radiated by the antenna 2.

In some embodiments, the antenna 1 of the electronic device 100 is coupled to the mobile communication module 150, and the antenna 2 is coupled to the wireless communication module 160, so that the electronic device 100 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), the 5th Generation of wireless communication system (5G, the 5th Generation of wireless communication system), BT, GNSS, WLAN, NFC, FM, an IR technology, and/or the like. The GNSS may include a global positioning system (global positioning system, GPS), a global navigation satellite system (global navigation satellite system, GLONASS), a Beidou navigation satellite system (Beidou navigation satellite system, BDS), a quasi-zenith satellite system (quasi-zenith satellite system, QZSS), and/or a satellite based augmentation system (satellite based augmentation system, SBAS).

The electronic device 100 implements a display function by using the GPU, the display 194, the application processor, and the like. The GPU is an image processing microprocessor, which is connected to the display 194 and the application processor. The GPU is configured to perform mathematical and geometric calculations to render graphics. The processor 110 may include one or more GPUs that execute program instructions to generate or change display information.

The display 194 is configured to display an image, a video, and the like. The display 194 includes a display panel. The display panel may be a liquid crystal display (liquid crystal display, LCD), an organic light emitting diode (organic light-emitting diode, OLED), an active matrix organic light emitting diode (active-matrix organic light emitting diode, AMOLED), a flex light emitting diode (flex light-emitting diode, FLED), a Miniled, a MicroLed, a MicrooLed, quantum dot light emitting diodes (quantum dot light emitting diodes, QLED), or the like. In some embodiments, the electronic device 100 may include 1 or N displays 194, and N is a positive integer greater than 1.

The electronic device 100 can implement a photographing function by using the ISP, the camera 193, the video codec, the GPU, the display 194, the application processor, and the like.

The ISP is configured to process data fed back by the camera 193. For example, during photographing, a shutter is opened, light is transmitted to a photosensitive element of the camera through a lens, an optical signal is converted into an electrical signal, and the photosensitive element of the camera transfers the electrical signal to the ISP for processing, so that the electrical signal is converted into an image visible to a naked eye. The ISP can further optimize algorithms for noise, brightness, and a skin color of the image. The ISP can further optimize parameters such as exposure and color temperature in a photographing scenario. In some embodiments, the ISP may be disposed in the camera 193.

The camera 193 is configured to capture a still image or a video. An optical image is generated for an object through the lens and is projected to the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transfers the electrical signal to the ISP. The ISP converts the electrical signal into a digital image signal. The ISP outputs the digital image signal to the DSP for processing. The DSP converts the digital image signal into an image signal in a standard format of RGB, YUV, or the like. In some embodiments, the electronic device 100 may include 1 or N cameras 193, and N is a positive integer greater than 1.

The digital signal processor is configured to process a digital signal. In addition to processing a digital image signal, the digital signal processor can further process another digital signal. For example, when the electronic device 100 selects a frequency, the digital signal processor is configured to perform Fourier transform or the like on energy of the frequency.

The video codec is configured to compress or decompress a digital video. The electronic device 100 can support one or more video codecs. In this way, the electronic device 100 may play or record videos in a plurality of encoding formats, such as moving picture experts group (moving picture experts group, MPEG) 1, MPEG 2, MPEG3, and MPEG4.

The NPU is a neural-network (neural-network, NN) computing processor. By referring to a structure of a biological neural network, such as a transfer mode between human brain neurons, the NPU quickly processes input information, and can further perform continuous self-learning. Applications such as intelligent cognition of the electronic device 100 may be implemented by using the NPU, such as image recognition, face recognition, voice recognition, and text understanding.

The external memory interface 120 may be configured to connect to an external memory card such as a Micro SD card, so as to expand a storage capacity of the electronic device 100. The external memory card communicates with the processor 110 by using the external storage interface 120, so as to implement a data storage function. For example, music, video, and other files are stored in the external memory card.

The internal memory 121 may be configured to store computer executable program code, where the executable program code includes an instruction. The processor 110 executes various function applications and data processing of the electronic device 100 by running an instruction stored in the internal memory 121. The internal memory 121 may include a program storage area and a data storage area. The program storage area may store an operating system, an application program required by at least one function (for example, a sound play function or an image play function), or the like. The data storage area may store data (such as audio data or a phone book) created during use of the electronic device 100. In addition, the internal memory 121 may include a high-speed random access memory, and may further include a non-volatile memory, such as at least one magnetic disk storage device, a flash memory device, or a universal flash storage (universal flash storage, UFS).

The electronic device 100 can implement audio functions (such as music playing and sound recording) by using the audio module 170, the speaker 170A, the receiver 170B, the microphone 170C, the headset jack 170D, the application processor, and the like.

The audio module 170 is configured to convert digital audio information into an analog audio signal for output, and is further configured to convert an analog audio input into a digital audio signal. The audio module 170 may be further configured to encode and decode audio signals. In some embodiments, the audio module 170 may be disposed in the processor 110, or some of the functional modules of the audio module 170 may be disposed in the processor 110.

The speaker 170A is configured to convert an audio electrical signal into a sound signal. The electronic device 100 can listen to music by using the speaker 170A, or listen to a hands-free call.

The receiver 170B is configured to convert an audio electrical signal into a sound signal. When the electronic device 100 receives a call or voice message, the receiver 170B can be placed close to an ear to receive the voice.

The microphone 170C, also referred to as a "loudspeaker", is configured to convert a sound signal into an electrical signal. When making a call or sending a voice message, the user can make the mouth approach the microphone 170C and emit a sound, so as to input a sound signal to the microphone 170C. The electronic device 100 may be provided with at least one microphone 170C. In some other embodiments, the electronic device 100 may be provided with two microphones 170C, which can implement noise reduction function in addition to collecting sound signals. In some other embodiments, the electronic device 100 may alternatively be provided with three, four, or more microphones 170C to implement sound signal collection, noise reduction, sound source recognition, directional recording, and the like functions.

The headset jack 170D is configured to connect a wired headset. The headset jack 170D may be a USB interface 130, or may be a 3.5 mm open electronic device platform (open mobile terminal platform, OMTP) standard interface, or a cellular telecommunication industry association of the USA (cellular telecommunication industry association of the USA, CTIA) standard interface.

The pressure sensor 180A is configured to sense a pressure signal and can convert the pressure signal into an electrical signal. In some embodiments, the pressure sensor 180A may be disposed on the display 194. There are many types of pressure sensors 180A, such as a resistive pressure sensor, an inductive pressure sensor, and a capacitive pressure sensor. The capacitive pressure sensor may include at least two parallel plates with conductive material. When a force is applied to the pressure sensor 180A, capacitance between electrodes changes. The electronic device 100 determines intensity of the pressure based on the change in capacitance. When a touch operation is applied to the display 194, the electronic device 100 detects intensity of the touch operation based on the pressure sensor 180A. The electronic device 100 can further calculate a touch position based on the detection signal of the pressure sensor 180A. In some embodiments, touch operations that are applied to the same touch position but have different touch operation intensity may be corresponding to different operation instructions. For example, when a touch operation whose touch operation intensity is less than a first pressure threshold is applied to a short message application icon, an instruction for viewing a short message is executed. When a touch operation Whose touch operation intensity is greater than or equal to the first pressure threshold is applied to the short message application icon, an instruction for creating a short message is executed.

The gyro sensor 180B may be configured to determine a movement posture of the electronic device 100. In some embodiments, the gyro sensor 180B may be configured to determine angular velocities of the electronic device 100 around three axes (that is, x, y, and z axes). The gyro sensor 180B can be used for image stabilization. For example, when the shutter is pressed, the gyro sensor 180B detects a shake angle of the electronic device 100, calculates a distance that a lens module needs to compensate based on the angle, and allows the lens to counteract the shake of the electronic device 100 through reverse movement to implement image stabilization. The gyro sensor 180B can further be used in navigation and somatosensory gaming scenarios.

The barometric pressure sensor 180O is configured to measure barometric pressure. In some embodiments, the electronic device 100 calculates the altitude by using a barometric pressure value measured by the barometric pressure sensor 180O, to assist in positioning and navigation.

The magnetic sensor 180D includes a Hall sensor. The electronic device 100 can use the magnetic sensor 180D to detect the opening and closing of a flip holster. In some embodiments, when the electronic device 100 is a flip phone, the electronic device 100 can detect the opening and closing of a flip based on the magnetic sensor 180D, so as to set features such as automatic unlocking of the flip based on the detected opening and closing state of the holster or the opening and closing state of the flip.

The acceleration sensor 180E can detect magnitudes of acceleration of the electronic device 100 in various directions (generally three axes). When the electronic device 100 is still, a value and a direction of gravity may be detected. The acceleration sensor 180E may be further configured to identify the posture of the electronic device, and be used in applications such as switching between a landscape screen and a portrait screen, and a pedometer.

The distance sensor 180E is configured to measure a distance. The electronic device 100 can measure the distance by using infrared or laser. In some embodiments, in a photographing scenario, the electronic device 100 can use the distance sensor 180F to measure a distance to implement quick focusing.

The optical proximity sensor 180E may include, for example, a light-emitting diode (LED) and an optical detector such as a photodiode. The light-emitting diode may be an infrared light-emitting diode. The electronic device 100 emits infrared light outward by using the light-emitting diode. The electronic device 100 uses the photodiode to detect infrared reflected light from a nearby object. When sufficient reflected light is detected, it can be determined that there is an object near the electronic device 100. When insufficient reflected light is detected, the electronic device 100 can determine that there is no object near the electronic device 100. The electronic device 100 can use the optical proximity sensor 180G to detect that the user holds the electronic device 100 close to the ear, so as to automatically turn off the screen to save power. The optical proximity sensor 180G may alternatively be used in a holster mode or a pocket mode to automatically unlock or lock the screen.

The ambient light sensor 180L is configured to sense brightness of ambient light. The electronic device 100 can adaptively adjust brightness of the display 194 based on the sensed brightness of the ambient light. The ambient light sensor 180L may be further configured to automatically adjust white balance during photographing. The ambient light sensor 180L can further cooperate with the optical proximity sensor 180G to detect whether the electronic device 100 is in a pocket, so as to prevent accidental touch.

The fingerprint sensor 180H is configured to collect a fingerprint. The electronic device 100 can use the collected fingerprint characteristics to implement fingerprint-based unlocking, application lock accessing, fingerprint-based photographing, fingerprint-based incoming call receiving, and the like.

The temperature sensor 180J is configured to detect a temperature. In some embodiments, the electronic device 100 executes a temperature processing policy by using the temperature detected by the temperature sensor 180J. For example, when the temperature reported by the temperature sensor 180J exceeds a threshold, the electronic device 100 degrades performance of a processor located near the temperature sensor 180J, so as to reduce power consumption and implement thermal protection. In some other embodiments, when the temperature is lower than another threshold, the electronic device 100 heats the battery 142 to avoid abnormal shutdown of the electronic device 100 caused by low temperature. In some other embodiments, when the temperature is lower than still another threshold, the electronic device 100 boosts an output voltage of the battery 142 to avoid abnormal shutdown caused by low temperature.

The touch sensor 180K is also referred to as a "touch panel". The touch sensor 180K may be disposed on the display 194, and the touch sensor 180K and the display 194 form a touchscreen, which is also referred to as a "touch-controlled screen". The touch sensor 180K is configured to detect a touch operation performed on or near the touch sensor 180K. The touch sensor can transmit a detected touch operation to the application processor to determine a type of a touch event. The display 194 may be configured to provide a visual output related to the touch operation. In some other embodiments, the touch sensor 180K may alternatively be disposed on a surface of the electronic device 100, which is different from the position of the display 194.

The bone conduction sensor 180M can obtain a vibration signal. In some embodiments, the bone conduction sensor 180M can obtain a vibration signal obtained from bone mass vibration by a human voice part. The bone conduction sensor 180M can be further in contact with the human pulse to receive a blood pressure and pulse signal. In some embodiments, the bone conduction sensor 180M may alternatively be disposed a headset to be combined into a bone conduction headset. The audio module 170 can obtain a speech signal through parsing based on the vibration signal that is obtained by the bone conduction sensor 180M from bone mass vibration by the voice part, to implement a speech function. The application processor can parse heart rate information based on the blood pressure and pulse signal obtained by the bone conduction sensor 180M, to implement a heart rate detection function.

The key 190 includes a power-on key, a volume key, or the like. The key 190 may be a mechanical key, or may be a touch key. The electronic device 100 can receive a key input, and generate a key signal input related to user setting and function control of the electronic device 100.

The motor 191 can generate a vibration prompt. The motor 191 may be configured to provide an incoming call vibration prompt, or may be configured to provide a touch vibration feedback. For example, touch operations that act on different applications (such as photographing and audio playback) may be corresponding to different vibration feedback effects. In response to touch operations that act on different areas of the display 194, the motor 191 may also be corresponding to different vibration feedback effects. Different application scenarios (such as time reminding, receiving information, alarm clock, and gaming) may also be corresponding to different vibration feedback effects. Touch vibration feedback effects can also support customization.

The indicator 192 may be an indicator light, which may be configured to indicate a charging state and a power change, or to indicate a message, a missed call, a notification, or the like.

The SIM card interface 195 is configured to connect to an SIM card. An SIM card can be inserted into the SIM card interface 195 or pulled out from the SIM card interface 195 to implement contact with or separation from the electronic device 100. The electronic device 100 can support 1 or N SIM card interfaces, where N is a positive integer greater than 1. The SIM card interface 195 can support a Nano SIM card, a Micro SIM card, an SIM card, and the like. The same SIM card interface 195 allows a plurality of cards to be inserted simultaneously. The plurality of cards may be of the same type or different types. The SIM card interface 195 can also be compatible with different types of SIM cards. The SIM card interface 195 can also be compatible with an external memory card. The electronic device 100 interacts with the network by using the SIM card to implement functions such as call and data communication. In some embodiments, the electronic device 100 uses an eSIM, that is, an embedded SIM card. The eSIM card can be embedded in the electronic device 100 and cannot be separated from the electronic device 100.

It should be noted that any electronic device mentioned in this embodiment of this application may include more or fewer modules than those in the electronic device 100.

The electronic device provided in this embodiment of this application may include a memory, a processor, and a computer program that is stored in the memory and can run on the processor. When executing the computer program, the processor implements the method according to any one of the foregoing method embodiments.

An embodiment of this application further provides a computer readable storage medium, where the computer readable storage medium stores a computer program, and the computer program, when executed by a processor, may implement the steps in the foregoing method embodiments.

An embodiment of this application provides a computer program product. When the computer program product runs on an electronic device, the electronic device is enabled to perform the steps in the foregoing method embodiments.

An embodiment of this application further provides a chip system, where the chip system includes a processor, the processor is coupled to a memory, and the processor executes a computer program stored in a memory to implement the methods according to the foregoing method embodiments. The chip system may be a single chip or a chip module including a plurality of chips.

In the foregoing embodiments, descriptions of the embodiments have respective focuses. For a part that is not detailed or described in an embodiment, refer to related descriptions in other embodiments. It should be understood that sequence numbers of the foregoing steps do not mean execution sequences in the embodiments. The execution sequences of the processes should be determined based on functions and internal logic of the processes, and should not be construed as any limitation on the implementation processes of the embodiments of this application. In addition, as used herein, the terms such as "first", "second", and "third" are used only for the purpose of description, and should not be understood as indicating or implying relative importance, Referring to "one embodiment" or "some embodiments" or the like described in the specification of this application means that one or more embodiments of this application include a specific feature, structure, or characteristic described with reference to the embodiment. Therefore, the statements "in one embodiment", "in some embodiments", "in some other embodiments", and the like appearing at different locations in the specification do not mean that these embodiments are all necessarily referred to, but mean "one or more but not all embodiments", unless otherwise specifically emphasized in other ways.

Finally, it should be noted that the foregoing descriptions are merely specific implementations of this application, but are not intended to limit the protection scope of this application. Any variation or replacement made within the technical scope disclosed in this application shall fall within the protection scope of this application. Therefore, the protection scope of this application shall be subject to the protection scope of the claims.

What is claimed is:

1. A screen mirroring method, wherein the method is applied to a screen casting device, the screen casting device is communicatively connected to a display device, and the method comprises:

receiving a mirroring suspension operation of a user;

discarding, in response to the mirroring suspension operation, to-be-encoded data that is to be input to an encoder, wherein the encoder is configured to perform encoding processing on the to-be-encoded data, and the to-be-encoded data is obtained based on updated data when data displayed on the screen casting device is updated;

determining whether the to-be-encoded data is discarded successfully; and if it is determined that the discarding succeeds, changing a display status of a first control on a current display interface of the screen casting device from a first state to a second state, wherein the first state is used to indicate to suspend screen mirroring service, and the second state is used to indicate to resume the screen mirroring service; or if it is determined that the discarding fails, outputting suspension failure prompt information.

2. The method according to claim 1, wherein after the foregoing response to the mirroring suspension operation, the method further comprises:

setting a value of a first parameter to a first value, wherein the value of the first parameter is used to indicate whether to discard the to-be-encoded data; and before the discarding to-be-encoded data that is to be input to an encoder, the method further comprises:

determining that the value of the first parameter is the first value.

3. The method according to claim 1, wherein after the foregoing response to the mirroring suspension operation, the method further comprises:

setting a value of a second parameter to a second value, wherein the value of the second parameter is used to indicate whether to back up the to-be-encoded data; and before the backing up to-be-encoded data, the method further comprises:

determining that the value of the second parameter is the second value; and backing up the to-be-encoded data.

4. The method according to claim 3, wherein the discarding to-be-encoded data that is to be input to an encoder comprises:

determining whether backup of the to-be-encoded data succeeds; and if it is determined that the backup succeeds, discarding the to-be-encoded data; or if it is determined that the backup fails, outputting suspension failure prompt information.

5. The method according to claim 4, wherein the method further comprises:
receiving a mirroring resumption operation of the user; and
stopping, in response to the mirroring resumption operation, discarding the to-be-encoded data.

6. The method according to claim 5, wherein after the foregoing response to the mirroring resumption operation, the method further comprises:
setting the value of the first parameter to a third value, wherein the value of the first parameter is used to indicate whether to discard the to-be-encoded data; and
before the stopping discarding the to-be-encoded data, the method further comprises:
determining that the value of the first parameter is the third value.

7. The method according to claim 5, wherein the receiving a mirroring resumption operation of the user comprises:
receiving the mirroring resumption operation performed by the user on the first control on the current display interface of the screen casting device.

8. The method according to claim 5, wherein the method further comprises:
determining whether discarding of the to-be-encoded data is stopped successfully; and
if the discarding is stopped successfully, changing a display status of the first control on the current display interface of the screen casting device from a second state to a first state, wherein the first state is used to indicate to suspend the screen mirroring service, and the second state is used to indicate to resume the screen mirroring service; or
if the discarding fails to be stopped, outputting resumption failure prompt information.

9. The method according to claim 5, before the stopping discarding the to-be-encoded data that is to be input to an encoder, the method further comprises:
stopping backing up the to-be-encoded data.

10. The method according to claim 9, wherein after the foregoing response to the mirroring resumption operation, the method further comprises:
setting the value of the second parameter to a fourth value, wherein the value of the second parameter is used to indicate whether to back up the to-be-encoded data that is to be input to an encoder; and
before the stopping backing up the to-be-encoded data, the method further comprises:
determining that the value of the second parameter is the fourth value.

11. The method according to claim 9, wherein the stopping, in response to the mirroring resumption operation, discarding the to-be-encoded data that is to be input to the encoder comprises:
determining whether the backup of the to-be-encoded data is stopped successfully; and
if the backup is stopped successfully, stopping discarding the to-be-encoded data; or
if the backup fails to be stopped, outputting resumption failure prompt information.

12. The method according to claim 11, wherein there are at least two display devices, there are at least two groups of to-be-encoded data, and the at least two groups of to-be-encoded data are in a one-to-one correspondence with the at least two display devices; and the receiving a mirroring suspension operation of a user comprises:
receiving a mirroring suspension operation performed by the user on a first display device in the at least two display devices; and
the discarding, in response to the mirroring suspension operation, to-be-encoded data that is to be input to an encoder comprises:
discarding, in response to the mirroring suspension operation on the first display device, first to-be-encoded data corresponding to the first display device.

13. The method according to claim 12, wherein the receiving the mirroring suspension operation performed by the user on the first display device in the at least two display devices comprises:
receiving the mirroring suspension operation performed by the user on a first sub-control in the first control on the current display interface of the screen casting device, wherein the first control comprises at least two sub-controls, and the at least two sub-controls are in a one-to-one correspondence with the at least two display devices.

14. The method according to claim 5, wherein there are at least two display devices, there are at least two groups of to-be-encoded data, and the at least two groups of to-be-encoded data are in a one-to-one correspondence with the at least two display devices; and
the receiving a mirroring resumption operation of a user comprises:
receiving the mirroring resumption operation performed by the user on a second display device in the at least two display devices; and
the stopping, in response to the mirroring resumption operation, discarding the to-be-encoded data comprises:
stopping, in response to the mirroring resumption operation performed by the user on the second display device, discarding second to-be-encoded data corresponding to the second display device.

15. The method according to claim 14, wherein the receiving the mirroring resumption operation performed by the user on the second display device in the at least two display devices comprises:
receiving the mirroring suspension operation performed by the user on a second sub-control in the first control on the current display interface of the screen casting device, wherein the first control comprises at least two sub-controls, and the at least two sub-controls are in a one-to-one correspondence with the at least two display devices.

16. The method according to claim 1, wherein the method is applied to an electronic device, and the electronic device comprises a screen mirroring application, a virtual display module, a layer composition module, a Codec module, and an encoder;
when receiving the mirroring suspension operation of the user, the screen mirroring application sets the value of a first parameter to a first value, sets the value of a second parameter to a second value, and creates the virtual display module, wherein the value of the first parameter is used to indicate whether to discard the to-be-encoded data, and the value of the second parameter is used to indicate whether to back up the to-be-encoded data;
when an image displayed by the screen casting device changes, the layer composition module obtains drawn and rendered image data from the virtual display module, and performs image composition based on a fixed period; and the Codec module determines whether the value of the first parameter is the first value and whether the value of the second parameter is the second value; and when the value of the first parameter is the first value, discards the to-be-encoded data; or when the value of the second parameter is the second value, backs up the to-be-encoded data.

17. The method according to claim 16, further comprising:

when the screen mirroring application receives the mirroring resumption operation of the user, setting the value of the first parameter to a third value, and setting the value of the second parameter to a fourth value;

when an image displayed by the screen casting device changes, the layer composition module obtains drawn and rendered image data from the virtual display module, and performs image composition based on a fixed period; and determining, by the Codec module, whether the value of the first parameter is the third value and whether the value of the second parameter is the fourth value; and when the value of the first parameter is the third value, stopping discarding the to-be-encoded data; or when the value of the second parameter is the fourth value, stopping backing up the to-be-encoded data.

18. An electronic device, comprising: one or more processors; a memory; a module on which a plurality of applications are installed; and one or more programs, wherein the one or more programs are stored in the memory, and when the one or more programs are executed by the processor, the electronic device is enabled to perform the following operations:

receiving a mirroring suspension operation of a user;

discarding, in response to the mirroring suspension operation, to-be-encoded data that is to be input to an encoder, wherein the encoder is configured to perform encoding processing on the to-be-encoded data, and the to-be-encoded data is obtained based on updated data when data displayed on a screen casting device is updated;

determining whether the to-be-encoded data is discarded successfully; and if it is determined that the discarding succeeds, changing a display status of the first control on a current display interface of the screen casting device from a first state to a second state, wherein the first state is used to indicate to suspend the screen mirroring service, and the second state is used to indicate to resume the screen mirroring service; or if it is determined that the discarding fails, outputting suspension failure prompt information.

19. A non-transitory computer readable storage medium, wherein the computer readable storage medium stores a computer instruction, and when the computer instruction is run on an electronic device, the electronic device is enabled to perform the following operations:

receiving a mirroring suspension operation of a user; and discarding, in response to the mirroring suspension operation, to-be-encoded data that is to be input to an encoder, wherein the encoder is configured to perform encoding processing on the to-be-encoded data, and the to-be-encoded data is obtained based on updated data when data displayed on the screen casting device is updated;

determining whether the to-be-encoded data is discarded successfully; and if it is determined that the discarding succeeds, changing a display status of the first control on a current display interface of the screen casting device from a first state to a second state, wherein the first state is used to indicate to suspend the screen mirroring service, and the second state is used to indicate to resume the screen mirroring service; or if it is determined that the discarding fails, outputting suspension failure prompt information.

* * * * *